(12) United States Patent
Hughston

(10) Patent No.: US 8,498,290 B2
(45) Date of Patent: Jul. 30, 2013

(54) SYSTEMS AND METHOD FOR INTERACTING WITH A PLURALITY OF NODES

(75) Inventor: Donald Thomas Hughston, London (GB)

(73) Assignee: Sage Connex, LLC, Atlanta, GA (US)

(*) Notice: Subject to any disclaimer, the term of this patent is extended or adjusted under 35 U.S.C. 154(b) by 489 days.

(21) Appl. No.: 12/391,146

(22) Filed: Feb. 23, 2009

(65) Prior Publication Data

US 2009/0213844 A1     Aug. 27, 2009

Related U.S. Application Data

(60) Provisional application No. 61/030,837, filed on Feb. 22, 2008, provisional application No. 61/082,354, filed on Jul. 21, 2008, provisional application No. 61/119,473, filed on Dec. 3, 2008.

(51) Int. Cl.
*H04L 12/66* (2006.01)
*H04M 11/00* (2006.01)

(52) U.S. Cl.
USPC .................. 370/352; 370/271; 379/93.09

(58) Field of Classification Search
USPC .............. 370/271, 351–353, 400, 338, 252; 379/93.01, 201.01, 93.09; 455/412.2, 466
See application file for complete search history.

(56) References Cited

U.S. PATENT DOCUMENTS

| | | | |
|---|---|---|---|
| 6,275,574 B1 | 8/2001 | Oran | |
| 6,697,357 B2 | 2/2004 | Emerson, III | |
| 6,704,714 B1 | 3/2004 | O'Leary et al. | |
| 6,745,021 B1 | 6/2004 | Stevens | |
| 7,092,370 B2 | 8/2006 | Jiang et al. | |
| 7,693,953 B2* | 4/2010 | Middleton et al. | 709/207 |
| 2002/0034177 A1* | 3/2002 | Herrmann et al. | 370/352 |
| 2004/0132431 A1* | 7/2004 | Vandermeijden et al. | 455/412.2 |
| 2005/0074109 A1 | 4/2005 | Hanson et al. | |
| 2005/0169283 A1* | 8/2005 | Jindal | 370/401 |
| 2006/0285532 A1* | 12/2006 | Radziewicz et al. | 370/352 |
| 2007/0192486 A1 | 8/2007 | Wilson et al. | |
| 2008/0189391 A1* | 8/2008 | Koberstein et al. | 709/218 |

OTHER PUBLICATIONS

Lyman et al.; "How Much Information? 2003"; School of Information Management and Systems, University of California at Berkeley; Oct. 27, 2003; pp. 1-14.

* cited by examiner

*Primary Examiner* — Hassan Phillips
*Assistant Examiner* — Saba Tsegaye
(74) *Attorney, Agent, or Firm* — Patton Boggs LLP

(57) ABSTRACT

In one embodiment of an improvement to telephony, a solution to the problem of communicating to "the many" is made by enabling telecommunications service providers to: accept digital dialog as well as conventional dialog, enable augmented phone service to be added to conventional phone services, handle non-calls in addition to calls, and turn content into content-of-interest.

1 Claim, 33 Drawing Sheets pAlert Authentication
Version1.0 pAlert Flowchart
Version1.1

Telco Interaction
Version 1.0

SYSTEMS AND METHOD FOR INTERACTING WITH A PLURALITY OF NODES

CROSS-REFERENCE TO RELATED APPLICATIONS

This application claims the benefit of U.S. Provisional Application No. 61/030,837 filed Feb. 22, 2008; U.S. Provisional Application No. 61/082,354 filed Jul. 21, 2008; and U.S. Provisional Application No. 61/119,473 filed Dec. 3, 2008, all of which applications are incorporated herein by reference.

BACKGROUND OF THE INVENTION

Despite advances in telecommunications, there is still no practical way to deliver individualized and personalized messages to "the many":
one-to-many,
many-to-one, and
many-to-many.

There have been three great migrations in human history: the migration from hunting to growing (the Agricultural Age), the migration from growing to the city (the Industrial Age), and the migration from the factory floor to the office (the Information Age). Each migration was made on the backs of new technologies and new inventions. While the move into the Information Age rests on a base of ever-increasing amounts of processing capacity and available bandwidth, the widespread assimilation of more and more information first moved on layers of analog inventions and technologies—hearing and seeing from far away (telegraph, telephone, radio and television). Today, the Information Age is moving on wired and wireless digital technologies—being able to process what we see, hear, and know (computing). However, whether analog or digital, wired or wireless, deep down, it must be pointed out that the information revolution is not about technology working with data but about people working with knowledge; and people's minds can only make use of as much knowledge as their brains can absorb.

The history of inventions in telegraphy and telephony is a path and process of continually improving the manner and method of transmitting "dialog"—first human-to-human and then computer-to-computer. "Dialog" is the discourse or exchange of information between people and/or computers. First there were the mechanical devices like megaphones, followed later by electronic devices to amplify sound and transmit pictures. Then telegraph and telephone "lines" were strung to transmit "dispatches" (dots and dashes) and "calls" (varying amplitudes on an electric current) encoded and decoded with microphones and speakers and more recently with "modems" on either end of the line connection. With the introduction of less expensive microprocessors into telephone exchanges (carriers can cut their capital investment by 50% and the costs of running their network by 30%), the direction of this development path has changed, and the type of problems encountered on this new digital path are fundamentally different from those previously encountered.
Dialog to Digital Dialog The obstacles to upgrade dialog to digital dialog, however, are moored not only in the vast depths of communications technology and the limitations of existing infrastructure, but also in our imperfect understanding of ourselves and our impulse to communicate. Because it's not natural, to engage in digital dialog must be made to seem natural.

Certainly it is the superior performance and economy of digital technologies that underlie the massive migration to digitally-processed information, digital tools, and digital devices. People have long valued processed information.

Digital computing enables us to do traditional things in a new way: word processors have replaced typewriters, spreadsheets have replaced ledger sheets, databases have replaced filing cabinets, and the computer screen has replaced the wooden desktop. However, it takes a deep understanding of the past and current state of telecommunications, the technologies involved, the forces at work, and the issues which must be addressed during this digital migration before it is possible to integrate onto a single platform the convenience and reach of telephony to the exponential increase of digital information. It is precisely because digital technologies and information can be interconnected in an almost limitless number of ways that the way forward depends on locking in to a common process, locking in to a universal method of matching people to content, and locking in to a single platform on which digital dialog is processed.

The stakes are high. Indications abound that digital dialog—the kind of communication that exists where phones and the Internet converge—will continue to reorganize the way people do ordinary things. As the two worlds converge, the "infosphere"—the world of connected information—expands. The part of the infosphere which is reachable by phone, personal digital device (PDA), or personal computer (PC) represents a potentially rich source of digital dialog. In this "telesphere" (the successor to telegraphy and telephony) is the opportunity to communicate differently (inform, sell, promote, update), shop differently, study differently, work differently, bank differently, or just browse differently. While telecommunications firms have enabled us to reach the Internet from anywhere—from home, from the office, at school, or on the move—for many things and for many reasons, we use less time, less energy, and less money if we could use the phone system and the Internet to handle digital dialog.

On the whole, digital dialog is synchronous—you say something then somebody else says something—but asynchronous dialog in the form of voice messaging, faxing, and text messaging has significantly increased traffic. Email is the biggest form of two-way asynchronous dialog used on a mass scale. The trouble is that, in using it, users are exposed to undifferentiated junk communication—the inbox is too full. The Web is asynchronous, and its use as a carrier of information is growing. The transfer of information is triggered by a visit, a click, or beginning an online session. Choices are saved so information can be personalized and delivered in the form of interesting views (information you can see) and messages (information you can read or hear).

With the three forms of communication and the many modes of dialog converging onto a common digitally-based packet-switched platform—and the capability of capturing more kinds of dialog—a need has emerged for a more efficient way to sort, deliver, manage, and store the traffic entering the system.

The opportunity to make improvements in telephony comes because of the migration to a digital platform. Like analog signals, digital signals are a representational notation. In other words, signals in the circuit are analogous to signals outside the circuit which act on a transferring membrane (in the case of digital signals, the digital circuit can be made to be analogous). Unlike analog signals, which are analogous to the forces impressed on it, a digital signal—like all digitized data—is a defined state, meaning that it can be assigned any meaning making it available for processing in ways only limited by the imagination, the capacities of the system, and the programming tools to process it.

A new method for handling digitally-based traffic is needed in the digital world because the content isn't transmitted as patterns in the frequency of the circuit like they are in the analog world. In the digital world, information in the circuit is packaged and described, making it possible to manipulate not only the content but the context before it is decoded and delivered to the receiver. The response from a digital dialog system can be significantly enriched and enhanced.

However, the migration to digital comes with as much complexity as opportunity. Digital dialog is a spectacularly complex feat—the equivalent of inserting a rudimentary brain between the eyes/ears and the mouth—where solutions must be found for the full range of digital complexity:

baseline complexity—our seeing/hearing, brain and speech circuits are biological mechanisms evolved to deal with images carried by light vibrations and sound carried by air vibrations. In order to transmit dialog, telecommunications inventions have, on the whole, focused on improving the reliability and fidelity in reproducing sounds and images at some remote location.

detail complexity—there are more details in the system than can be held in the "brain" at one time, so a structure, an order, and a process must be implemented to keep the details from overwhelming the system.

dynamic complexity—the fact that something affecting one part of the system is designed to (or unintentionally) affect other parts of the system even though they are separated in space and time creates dynamic complications which can overwhelm the system.

essential complexity—some components, factors, and forces that operate in and on the system are essential—they cannot be removed without the system failing—and so they cannot be ignored.

It is because digital dialog is a multi-level, multi-platform, multi-media exchange of information that a full-service, turnkey digital dialog management system is the hairball of complexities that it is. At the moment, digital life is a bit uncivilized. The phone system lacks an underlying process to allow it to be used for calls and non-calls alike. Because people want access to increasing amounts of processed information, the phone system should and can respond—people shouldn't feel like nomads, stranded in a digital world.

To understand the place the disclosed systems and methods occupies in the evolution of telecommunications, a brief background is helpful.

The evolution of dialog to digital dialog is rather well known, but migrating from one communication platform to the next proceeded on inventions fashioned from emerging technologies. Michael Faraday's electromagnet split person-to-person speech and sight—which was until then processed by our one brain—into two paths of development (telegraphy and telephony) were developed to carry messages and sound, and television was later developed to carry images. It wasn't until the development of the World Wide Web by Tim Berners-Lee that sound and images would be joined again (but without a "brain" to connect them). So in the beginning, sound was directly perceived: sound—using air vibrations.

At a distance, sound can only be "heard" indirectly (tele+phone, or sound) using wires (or "lines") and electricity. The "sound" was carried in and by:

code—dots and dashes in a connected circuit,
frequencies—modulating audio frequencies, or
logic—addresses in header registers.

Working from Faraday's invention, Samuel F. B. Morse developed the electromagnetic telegraph and his system of dots and dashes in 1832. This system was improved upon by Alexander Graham Bell with his invention of the telephone, patented in 1876, and improved yet again in 2007 by the substance of the present disclosure.

Information has always been a part of our world but, until recently, it has been tied too tightly to the material world to process it externally. Over time, however, nature has developed a biological process of seeing and talking to process information. The ears, brain, and voice circuit has been created biologically to process objective notions (what's "out there") into a "projection" (a reflection of our internal state outwardly expressed) or into feedback and response.

Before Morse, messages and information were conveyed visually, using "semaphore" systems of flags or lights. The government offered a prize of $30,000 for a workable proposal to link the Atlantic coast by "telegraph", never anticipating electricity's role. Princeton's Joseph Henry had, in 1831, rang a bell at a distance by opening and closing an electric circuit, suggesting the idea of an electric telegraph. It took twelve years, but Morse persevered until the government was won over with his "astonishing invention".

During his work on the telegraph, Morse needed political help to obtain support from Congress as much as he required technical and financial assistance. By sharing ownership of sixteen shares in a future telegraph system with a congressman (four shares), technician (two shares), and professor of science—Joseph Henry's protégé—(one share), Morse (nine shares) forged an alliance that would allow him eventually to succeed in claiming the $30,000 government prize.

What makes these technologies valuable is that they solve a problem that is important to other people by nudging then-existing resources into one bucket. In other words, in these worlds, monopoly works. Morse secured his monopoly by enlisting the support of politicians and government in a way impossible to do just 40 years later when Alexander Graham Bell was granted a patent-monopoly for his "harmonic telegraph". Once the government had strung lines everywhere for the telegraph, Alexander Graham Bell out-maneuvered Western Union, Thomas Edison, and Joshua Grey to put his "harmonic" or "talking" telegraphs at either end of a telegraph line. He survived 800 challenges to his 14 Mar. 1876 patent primarily because his well-to-do and well-connected father-in-law-cum-investor hated the Western Union monopoly and set out with Bell to establish their own.

The 29-year-old Bell already held two patents financed by his father-in-law: one for a method of multiple telegraphy, and another for two ways to produce the intermittent current necessary to carry telegraphic signals (by actually making and breaking contact or by alternately increasing and diminishing the intensity of the current without actually breaking the circuit). Knowing how to modulate the current in a closed circuit, it was a relatively small step to modulate the frequency instead; and when he succeeded, Bell abandoned his efforts to improve code-based telegraphy and pushed ahead to use electricity to carry voice dialog and, in the process, turned telegraphy into telephony.

Following the divorce of sound and image processing technologies in 1876, the convergence of voice and image onto a single platform wouldn't be made possible until 1991, when Tim Berners-Lee developed the World Wide Web (WWW) and it was released by CERN, an event many consider to be the most important development to date in the Internet world. The Web was originally developed to provide a distributed hypermedia system to provide easy access to any form of information anywhere in the world, and it has revolutionized modern communications and even our way of life (according to many).

The impact the Internet has made on telephony—and will continue to make in interactive communications—is so great that a whole new type of communications is emerging. The world of telephony is becoming the telesphere, a single place where calls and non-calls can be resolved. The implications of migrating from natural to analog to digital devices and abstract representations or "digital" information is what enables the transmission of calls and non-calls. It is the exponential explosion of information that is driving up non-call traffic.

It is likely that trade and commerce are the primary forces that separate information from its material or objective side, creating a world solely of information. In computer processing, Moore's Law, a formula put forward by Gordon Moore, one of the founders of Intel, has driven the computer industry for over 20 years: every 18 months, processing power doubles and costs drop in half. This technological/commercial maxim has led businesses to "go digital", and there is no reversing this trend.

The use of web pages in business has its own drivers. In its simple form, business uses web pages to store and transport information because moving information over the Internet is, by the Internet's very design, the least expensive way to move information across the desktops in an office or across the world. The reason this is so is based on the well-known principles of Information Theory which explain the huge increase in information flows as being the natural consequence of globalization, or the tendency of increasing production to be located further and further away from ultimate customers. The so-called Knowledge Formula, developed by Boeing in the late 1940's to explain how it doubled its production of aircraft wings for the war until it reached 35,000 per year, is 2× volume leads to ⅓rd the costs, and vice versa. Because most of what constitutes business is merely information (set-up, capitalization of equipment and activities, information about products for sales and marketing uses, and payment itself) in different forms, and because globalization requires commerce to move information to customers at the lowest possible costs, businesses are simply forced into adopting the Internet as a medium for communication (websites, email, and e-commerce).

Web pages are expected to carry the bulk of information in the Information Age. For every $5 spent in production in 1880, only $1 was spent handling information (mostly for sales and marketing materials). In 1984, the ratio of spending in production to information was 1:1; in 1997, it was 1:2; and in 2005 it was 1:5.

With the development of digital computers, increases in bandwidth and processing speed have been used by software developers—using program instructions and data—to deliver useful applications to home and office, increasing convenience and efficiencies.

This growth in the infosphere is outpacing the growth of telephony. Non-calls are bypassing the phone system because there is no place in the telephone system to route, display, playback, manage, and store even a portion of available (connected) information pouring into the infosphere.

So, as we produce and consume ever more information, the communications platform supporting this transfer of content must be upgraded to meet demand. At first, language and the graphic arts were employed to process this freed information. Artwork led to advertising which (crossing the digital divide) led to brochureware and then to websites. Even in the digital age, the production and use of paper has skyrocketed. Gradually, however, technology is taking over the amplification, distribution, and processing of information. Notions once processed directly by biological components are now processed indirectly by technological components instead. This trend from paper to paperless is being carried out in the marketplace, workplaces, and classrooms around the world. In addition to capturing written information, the Internet is also the platform for interactive "chat" and social networks—what the dotcom industry calls Web 2.0.

It's not just the Internet that is benefiting from the surge in non-call traffic. The phone system is capturing some of that non-call dialog as well. Phone companies directly capture fax, paging, and texting and indirectly capture email and web traffic by providing "backbone" capacity for dotcom customers.

Today, even as the phone system and the Internet are converging, perhaps the biggest source of non-call traffic is just beginning to enter the marketplace: personalized information. Computer, software, and dotcom companies all have a stake in the rush for personalized information. Some are putting out phone-like devices; one is starting its own phone network. Phone companies are pushing back too. They're adding new phone services: voice messaging, Internet calling, caller-ID, call-blocking, conferencing, call forwarding, text-to-voice, picture-taking, photo-swapping, downloading (music), group alerts, global positioning (GPS), and map services.

While all of the above computer, Internet, and telephone services have greatly added to the ability to communicate, only the most electronically literate persons can utilize their power. For many people, the electronic options are overwhelming and add a complexity to life that is at the least stressful, and at sometimes destabilizing. Therefore, it would be highly desirable if an apparatus and method were available that allowed the average person to make sense of all of this technology and utilize its full power. If this method and apparatus also reduced stress levels and even enhanced the individual's security, it would be an important advance in the art.

SUMMARY OF THE INVENTION

In one embodiment of an improvement to telephony, herein known as "Device Independent Unified Contact System", a solution to the problem of communicating to "the many" is made by enabling telecommunications service providers to: accept digital dialog as well as conventional dialog, enable augmented phone service to be added to conventional phone services, handle non-calls in addition to calls, and turn content into content-of-interest.

One embodiment the improvement to telephony provides modules, switches, and components that uses phone numbers as online addresses which can be accessed by any device connected to the Internet; by using the * and # keys (or other keys and/or key combinations) on the phone keypad to access locations within the phone system and activate specific behaviors and functions; using three real-world metaphors-made-into-user-interfaces placed on top of a specially-modified phone-and-Internet browser as navigational and organizational tools form matching incoming notions to outgoing feedback stored within the phone system.

Through these modules, switches, and components, secure, private, protected, protectable; device-independent; and phone and Internet accessible, convergent "spaces" (or virtual environments) within the phone system are provided, which allow users to receive, send, manage, and store non-calls, digital information, and personalized content not currently handled in the telephony system.

A system and procedure to match notions is employed that enter a branded telecommunications network with appropriate feedback by: converting numbers as proxies for people and things into phone-accessible addresses. The system converts incoming notions into digital instructions carried to a point in the system where the instructions are processed. All content entering the system or having content outside the system is tagged and indexed by system agents by inserting header registers into each of the data strands of instructions and content. Header registers are populated with pointers to the content. The instructions and pointers are transported as parameters and values to locations within the system where "rules" are applied. Notions are matched to feedback using the instructions, rules, pointers, and indexes, and values in the header registers are converted back to pointers to feedback content. Pointers linked to content (now content-of-interest) are assembled into views and messages and finally delivered to a location within the network for immediate display or playback, for delivery to a device connected to the network, for further processing, and/or to be organized and/or stored and/or transferred to other addresses within the network.

The system foresees and accelerates the growth of the "infosphere" within the telephony system, a virtual world held together by user-connected information. In one embodiment of a method of connecting users and information, the method includes moving in and out of a "dialog space" within the non-call network where all types of synchronous, asynchronous, and intermittent dialog can take place. The method further includes using notions and feedback during a session connection to move around in and manipulate the dialog space. The method further includes amplifying content not only by increasing or targeting the number and type of addressees or recipients but by "contextualizing" the content. Additionally, the method includes adjusting the context of the dialog space by embedding content into various customizable and linked environments.

The system derives many benefits from the use of an address-matching method to resolve non-calls in the telephone systems, including but not limited to that the system:
- provides high-speed and high-volume, low-cost digital dialog transmission,
- transmits a larger number of user dialogs simultaneously in the same call or non-call session,
- diverts non-call traffic to excess capacities in the phone system,
- delivers information quickly (the number one reason that 169.7 million people in the USA say they use the Internet),
- uses the universal and interconnected phone system to scale up interactive processes (as opposed to routine processes which are well-handled by data processing technologies),
- repurposes the phone system to "push" calls and non-calls to locations in the network where feedback can be "pulled" from the system by users as personalized information,
- gives users a short channel (measured in time, access, effort, and convenience) of communication for one-way or interactive dialog between person-to-person, person-to-people, people-to-person, or any combination of person, people, and machine or computing device,
- allows users to personalize the look and feel of their digital space, customize contextual components of outgoing and incoming messages, and specify how outgoing and incoming content is delivered,
- enables users to control how content is organized and stored (by activity, topic, or macro, for example, rather than by subject),
- presents users with a practical way to mass deliver individualized and personalized views and messages,
- makes dialog more effective, giving addressors the ability to contextualize digital dialog in order to effect a better response from addressees, and
- replaces paper-based media with address-based digital content assembly, promoting "paperless" solutions for a wide variety of personal, business, organizational, work, and educational activities.

In one embodiment, a method of communicating non-call messages over a telephone network includes receiving a coded signal at a switch in said telephone network, said coded signal comprising a plurality of individual code signals, said plurality of individual code signals including a plurality of alphanumeric signals, each said alphanumeric signal corresponding to an alphanumeric symbol associated with a selected telephone number. In other words, each phone number is associated with its twin e-number. The method further includes electronically analyzing said coded signal, and connecting said switch to a predetermined digital circuit if said coded signal comprises a signal selected from the group consisting of: a # signal or a * signal interspersed between two of said alphanumeric signals corresponding to said alphanumeric telephone number symbols; an Internet protocol address; a preprogrammed speed dial signal; and a signal indicating that any key has been held down. In other words, the system looks for a coded signal (* or # key) in a number entered by a user and in response opens a predetermined digital circuit.

An additional feature includes that the coded signal is followed by a non-call information signal and said connecting directs said non-call information signal to said predetermined digital circuit.

In one embodiment, a non-call processing system configured to handle non-calls originating from a voice telephone network includes a signal analysis module within the voice telephone network configured to identify a non-call in the voice telephone network, based on the occurrence of an indicator and based on the identification, and route the non-call to a distribution circuit. The system further includes a distribution circuit, configured to receive the non-call and transmit the non-call to a node, and a node, configured to receive and store non-calls for retrieval. In one alternative, the system further includes a filtering and interaction module, located at the node, for filtering the non-call according to a rule set. In another alternative, the system further includes the filtering and interaction module which is configured to respond to voice commands of the user. In another alternative, the filtering and interaction module is configured to process user speech, compare to known characteristics and history of the user, and determine an action based on the user speech and the known characteristics and history. In another alternative, the node is accessible via the Internet. In another alternative, the node is accessible via a PSTN telephone. In another alternative, the node is accessible via a VoIP system. In another alternative, the indicator is a * key added to any point of a standard telephone number.

In yet another alternative, the indicator is a # key added to any point of a standard telephone number. Alternatively, the node is a pHome node, and the pHome node includes modules for creation of a personalized environment for the user, accessible by the user and others individuals via the Internet. In yet another alternative, the pHome node is accessible via a PSTN system as an entry point for the user and the other individuals.

In yet another alternative, the pHome node is accessible via a wireless phone system as an entry point for the user and the other individuals. In another alternative, the personalized environment includes a virtual room.

Alternatively, the personalized environment includes virtual objects and content placed by the user. In yet another alternative, the content is a feed from a content source. Alternatively, the user receives targeted content at the pHome node. Alternatively, the system further includes a filtering and interaction module, located at the node, for filtering the non-call according to a rule set. In another alternative, the filtering and interaction module limits the access of the other individuals to the pHome node. In another alternative, the filtering and interaction module limits the access of content providers to the pHome node. In another alternative, the filtering and interaction module limits the access of vendors to the pHome node.

In one alternative, the signal analysis module is located in a PSTN switch. In another alternative, a non-call is a call originating from a person that is asynchronous with the access to the non-call by the intended recipient. In another alternative, the node stores the non-call. In another alternative, the filtering and interaction module is configured to resolve a notion expressed in the non-call. Alternatively, the notion is an indication by a user for desired action. In another alternative, the desired action is the provision of content. In another alternative, the desired action is access to the node. In another alternative, the desired action is the receipt of content from the user. In yet another alternative, the filtering and interaction module is configured to provide prompts to the user to resolve the notion. In another alternative, the filtering and interaction module is configured to store content at the node provided by the user.

In another embodiment, a device independent contact system, configured to handle access from a plurality of access networks including voice telephone networks, cable television, wireless telephone, and the Internet, includes a voice telephone signal analysis module within a voice telephone network configured to identify a first non-call in the voice telephone network, based on the occurrence of a first indicator and, based on the identification, route the first non-call to a distribution circuit. The system further includes a distribution circuit, configured to receive the first non-call and transmit the first non-call to a node, and a node, configured to receive and store non-calls for retrieval. Alternatively, the system further includes a wireless telephone signal analysis module within a wireless telephone network configured to identify a second non-call in the wireless telephone network, based on the occurrence of a second indicator and, based on the identification, route the non-call to the distribution circuit, wherein the distribution circuit is configured to receive the second non-call and transmit the second non-call to the storage node. Alternatively, the system further includes a cable television signal analysis module within a cable television network configured to identify a second non-call in the cable television network, based on the occurrence of a second indicator and, based on the identification, route the non-call to the distribution circuit, wherein the distribution circuit is configured to receive the second non-call and transmit the second non-call to the storage node.

In one embodiment of a method for processing non-calls originating from a voice telephone network, the method includes identifying non-calls in the voice telephone network based on the occurrence of an indicator at a signal analysis module within the voice telephone. The method further includes, based on the identifying, routing the non-call to a distribution circuit. The method additionally includes receiving the non-call at the distribution circuit, transmitting the non-call from the distribution circuit to a node, and receiving the non-call at the node. In one alternative, the node is one of a plurality of nodes. In another alternative, the method further includes identifying the node of the plurality of nodes based on a unique identifier. In another alternative, the unique identifier is a telephone number. In another alternative, the indicator is a * key added to any point of a standard telephone number. In yet another alternative, the indicator is a # key added to any point of a standard telephone number. In another alternative, the method also includes interacting with a user originating the non-call at a filtering and interaction module, located at the node. In another alternative, the filtering and interaction module is configured to respond to voice commands of the user. In yet another alternative, the filtering and interaction module is configured to process user speech, compare to known characteristics and history of the user, and determine an action based on the user speech and the known characteristics and history.

In another alternative, the method also includes creating a record of interactions of the user with the filtering and interaction module. In another alternative, the method also includes receiving a notion expressed in the non-call from the user, and resolving the notion according to rules in the filtering and interaction module. In another alternative, the rules are updated based on a record of interactions of the user with the filtering and interaction module. In yet another alternative, the notion is an indication by the user for desired action. In yet another alternative, the desired action is the provision of content. In yet another alternative, the desired action is access to the node. In another alternative, the desired action is the receipt of content from the user. Alternatively, the filtering and interaction module is configured to provide prompts to the user to resolve the notion. Alternatively, the filtering and interaction module is configured to store content at the node provided by the user.

In another embodiment, a method for providing an online home for a user, the online home presented to the user and visitors via a plurality of interfaces, includes presenting to the user a plurality of virtual rooms, each room having predefined characteristics and functions. The method further includes presenting a plurality of virtual objects, each object having predefined functions and characteristics. The method also includes providing access to the online home to the user via a variety of access networking including the Internet and a voice telephone network. The method additionally includes receiving inputs from the user and activating functions of the plurality of virtual rooms and the plurality of virtual objects. In one alternative, the inputs are text inputs by the user. In another alternative, the inputs are click stream data input by the user. In yet another alternative, the inputs are verbal commands of the user. In another alternative, the inputs are received via a PSTN. In yet another alternative, the inputs are received via a voice telephone network. Alternatively, the presenting is realized by spoken word. Alternatively, the spoken word is computer generated. In another alternative, the presenting is realized by a GUI. Alternatively, the user may modify the predefined characteristics and functions of the plurality of virtual rooms and the plurality of virtual objects.

In another alternative, the method further includes processing the inputs using an interaction and filtering module. In another alternative, the method further includes limiting access to the plurality of virtual rooms to the visitors, according to the inputs. Alternatively, the plurality of objects include a to-do list. Alternatively, the plurality of objects include a virtual checkbook that allows the user access to bank account information. In yet another alternative, the virtual checkbook allows for the payment of bills. Alternatively, the plurality of objects include a virtual bulletin board where the user and the visitors may leave messages. In another alternative, the user may limit the access of visitors who are related to commercial entities. In another alternative, a default setting includes disallowing the access of commercial entities.

In another embodiment, a system for providing an online home for a user, the online home presented to the user and visitors via a plurality of interfaces, includes a plurality of virtual rooms, each room of the plurality having predefined characteristics and functions. The system further includes a plurality of virtual objects, located in the plurality of virtual rooms, the virtual objects having predefined functions and characteristics. The system also includes an interaction and filtering module configured to receive inputs from the user and activate functions of the plurality of virtual rooms and the plurality of virtual objects.

In another embodiment, a system for resolving non-calls includes a first module, configured to mark non-calls and route the non-calls into a telesphere to be resolved, wherein the non-calls are determined by the occurrence of an indicator consisting of a group including: a * key on the phone keypad, a # key on the phone keypad, and a www.[number] in an Internet browser. The system further includes a second module, configured to pre-link content in the Internet to a plurality of digital voice and visual interfaces by indexing pointers to each location associated with the content. The system further includes a third module, configured to convert incoming clicks, interactive voice functions (IVF), and keypad sequences into notions. The system further includes a fourth module, being an assembly point where tokens are processed using data analytics into notion header registers, wherein each notion has a notion header register, and each of the tokens is inserted into a corresponding notion. The system further includes a fifth module, configured to direct content-of-interest to a first digital voice and visual interface responsive to the notions. In one alternative, the pre-linked content includes address pointers of an activity matrix. In another alternative, the pre-linked content is encoded into digital loops embedded into a header register of all content-of-potential-interest. Alternatively, notions are augmented with tendencies retrieved from user profiles. In another alternative, notions are augmented with tendencies retrieved from past activity. Alternatively, notions are augmented with tendencies retrieved from data mining. In another alternative, the tendencies are embedded into the notion header registers. In yet another alternative, the content-of-interest is determined by correlating the digital loops and the tendencies to the first digital voice and visual interface. Alternatively, the content-of-interest is stored in a user's activity matrix to be delivered later.

In one embodiment, a method for resolving non-calls includes marking and routing non-calls into a telesphere to be resolved using a first module, wherein the non-calls are determined by the occurrence of an indicator consisting of a group including: a * key on the phone keypad, a # key on the phone keypad, and a www.[number] in an Internet browser. The method further includes pre-linking content in the Internet to a plurality of digital voice and visual interfaces by indexing pointers to each location associated with the content using a second module. The method further includes converting incoming clicks, interactive voice functions (IVF), and keypad sequences into notions using a third module. Additionally, the method includes assembling tokens using a fourth module, the assembling using data analytics. The method also includes inserting the tokens into a plurality of notion header registers using the fourth module, wherein each notion has a notion header register and each of the tokens is inserted into a corresponding notion. The method further includes directing content-of-interest to a first digital voice and visual interface responsive to the notions. In one alternative, the pre-linked content includes address pointers of an activity matrix. In another alternative, the method further includes encoding the pre-linked content into digital loops embedded into a header register of all content-of-potential-interest. In another alternative, the method further includes augmenting the notions with tendencies retrieved from user profiles. In another alternative, the method further includes augmenting the notions with tendencies retrieved from past activity. In another alternative, the method further includes augmenting the notions with tendencies retrieved from data mining. In another alternative, the method further includes embedding the tendencies into the notion header registers. In another alternative, the method further includes correlating the digital loops and the tendencies to the first digital voice and visual interface to determine the content-of-interest. In yet another alternative, the content-of-interest is stored in a user's activity matrix to be delivered later.

These embodiments are mentioned not to limit or define the systems and methods disclosed but to provide examples of embodiments of the systems and methods to aid understanding thereof. Embodiments are discussed in the Detailed Description, and advantages offered by various embodiments of the systems and methods may be further understood by examining the Detailed Description and Drawings.

DETAILED DESCRIPTION OF THE DRAWINGS

Figure 1:
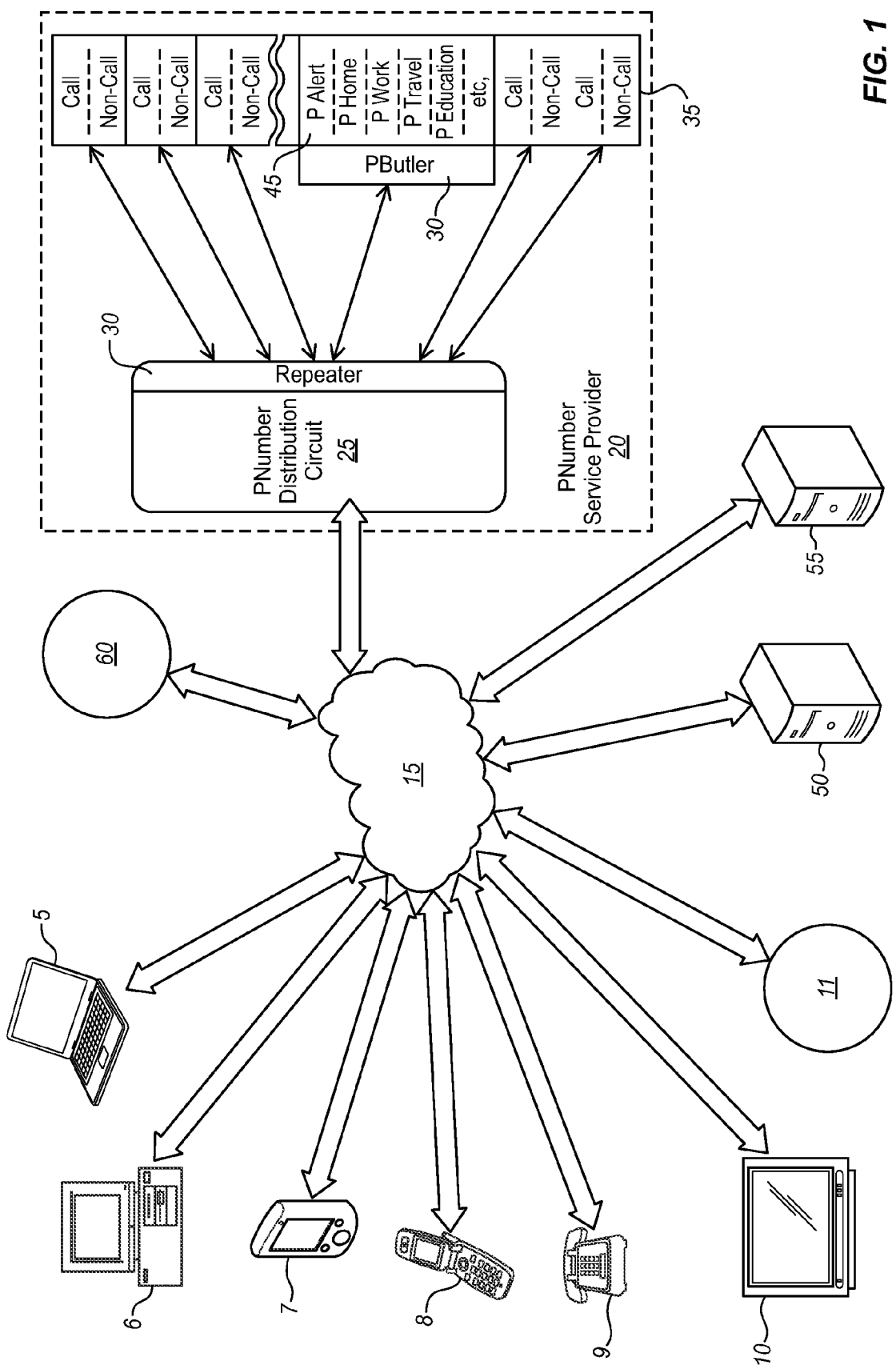
FIG. 1 is a diagram of one embodiment of the Device Independent Unified Contact System.

True digital dialog is an interactive process that is as effective and emotionally satisfying as having a conversation. Like its real world counterpart, "dialog" (from dia+logos, or the meaning that exists between two), digital dialog must be built from an accessible place in the middle: a "teleplace". The improvement in telephony is not about what people can do with a phone or on the Internet—e.g., stream video and audio, make long-distance calls, email, share files, get news, messages, etc.—it is a way to put a centerpoint in the phone system to connect better with our children, our employees and bosses, our market, our teachers, our friends, and would-be customers. This centerpoint, this telesite, is a convenient place to have digital content-of-interest (COI) delivered anytime day or night. Based on voice and data IP, a telespace links broadcast and interactive media into a single low-cost COI media where people and companies who have information they want to distribute can also collect information or feedback, in other words, a digital dialog.

Digital dialog is designed to combine the best features of the telephone (the king of synchronous dialog) and the Internet (the king of asynchronous dialog) at a time when both voice and data are handled and processed by the same digital protocol. This TCP/IP (packet-switching protocol) also handles intermittent communication, the third form of digital dialog: dialog that is triggered by an event (alarms, notices, warnings, reminders, expirations, instructions, help, etc.). As traditional circuit-based protocols are being replaced by packet-based protocols, formerly disparate modes of "dialog" like texting, emailing, photo capture and exchange, Internet calling (Voice over Internet Protocol or VoIP), walkie-talkie exchanges, etc., can now be accommodated on the same telecommunications platform.

This is possible because, in a digital world, information is reduced to a state in which logical operations can be performed on it. This state is called the binary state and often referred to as yes/no, 0/1, base-2, on/off. Communication in a digital world, then, is dialog reduced to a binary state. Because of this transformation, information becomes computable. The advantages of reducing dialog to a digital form are many: not just the efficiencies and speed at which digital dialog can be delivered, but being computable means that digital dialog can be processed. The dialog can be diverted into a digital "brain" to assemble the appropriate feedback and deliver it through the appropriate channels to the appropriate digital dialog layers.

Making dialog computable makes it possible for the phone system to capture a whole new form of dialog because, while we think of dialog as talking with others, true digital dialog makes the phone system a platform on which we can talk to ourselves (which we do constantly) about ourselves; it is a platform for all internal and external communications—what we like and what we need to know. In short, true digital dialog is interesting. Moreover, digital dialog makes it possible to talk to "things".

With a nudge, however, phone companies can tilt the playing field and tip practically all non-call information into the phone system. By hosting people's telephone numbers as online addresses—supplying users with their own place online—phone companies can become the digital ears, digital eyes, digital brain, and digital voice for anyone with a phone number and has heard of the Internet.

With that nudge, normal dialog can finally become true digital dialog.

In one embodiment, the system uses software and existing communications technologies to turn today's phone system into a new phone "network" that sends and delivers "non-calls" or personalized communication of either voice, video, or data. Research shows that human beings—male and female—think most about relationships. Relationships are maintained mostly by personalized communication; that is, information that is pertinent to the one being addressed in the hopes of receiving pertinent information (or "feedback") in return. The measure of personalized information is "interest"; in other words, the ability of the information being communicated to focus and maintain our attention. In general, more interesting information is also more valuable information. Monetizing this value, however, has proved to be elusive. There is no general method or process to communicate personalized information. Personalized information comes with more interaction. What prevents broadcast, cable, and satellite companies from global dominance in content delivery is their respective platform's in-built lack of interactivity (or long latency if interactivity can be achieved). Unlike broadcast, cable, and satellite companies, phone companies are the undisputed kings of interactivity measured by the total amount of information flowing in its channels. Consider this: In a 2003 Berkeley Study, "Information flows through electronic channels—telephone, radio, TV, and the Internet—contained almost 18 exabytes of new information in 2002, three and a half times more than is recorded in storage media. Ninety-eight percent of this total is the information sent and received in telephone calls—including both voice and data on both fixed lines and wireless" (source: UC Berkeley's School of Information Management and Systems, "How Much Information? 2003", Executive Summary, page 3). Any attempt to capture information flows and be the world's largest information exchange must include the phone companies.

Until now, the communications industry has been divided into two camps: channel providers and content providers. Over the years, the buildup of communications technologies have by necessity been focused on the channel or medium of communication, on maximizing the reach or penetration of the medium, and in maximizing the message-carrying capacity and efficiency of the channel or medium (calling, signaling, semaphores, telegraphy, and today's broadcast and telephony technologies). Monetizing communications channels is generally achieved through utility charges augmented by "bundling" various channels of communication into a single payment plan. In contrast, content providers survive through subscription and/or advertising.

The barriers to truly personalized communication were many and formidable. There was no single point of contact for users; however, in one embodiment of the system and method, phone numbers are used as proxies for the owner of each phone number. The amount of interactivity provided was poor; however, in one embodiment of the system and method, one-to-one, one-to-many, many-to-one, and many-to-many messaging options are provided. There was no convergence of various mediums of communication; however, in one embodiment of the system and method, using one common phone-centric network for all communication (fixed line and wireless, broadcast, Internet, and text) convergence can be achieved. The ability of the user to access the system was limited; however, in one embodiment of the system and method, a method of using ordinary phone, PDA, and PC devices to access one's own and others' online addresses is provided. Furthermore, the ability to use any device was limited; however, in one embodiment of the system and method, any communication device may be used to access the system: phone, PDA, computer, etc.

Furthermore, there was too much complexity in the details of many systems, including the legal and political implications of using phone numbers as IP addresses and being able to deal with the most regulated industry on earth, as well as being able to handle all personalized information flows. Also, previous systems lacked dynamic complexity; however, one embodiment of the system and method includes the ability to receive, organize, manage, store, and retrieve content-of-interest and handle opt-in, opt-out, and no-opt information exchanges. Additionally, previous systems lacked essential complexity; however, in one embodiment, the system and method provides necessary flexibility, security, and privacy in broadcasting and/or receiving personalizable messages.

The biggest barrier to personalizing information flows is the simple fact that few people (estimated at less than 2% of the people who can reach the Internet) have their own address online. Without their own online address, people must enter the Internet from a common portal—typically, a search site like Google—and "go to" the sites and information interesting to them. It is much more efficient that information is personalized and then delivered to an address. The process and method of personalizing information flows begins with providing people with an easy-to-remember-and-use online address. Telephone numbers are described by governments to be the property of the person represented by their number (known in the industry as "single number portability"). By being hyper-focused on other uses of phone numbers, phone companies can transform themselves from simply being carriers of information flows into being hosts of information flows. This means that, in theory, a phone company is more valuable because of hosting phone numbers rather than in connecting them.

The communications traffic in and out of these phone-numbers-used-as-online-addresses as "non-calls" distinguishes them from the traditional "calls" handled by phone companies. Non-calls are requests for content-of-interest (COI) in all of its forms: content-of-POTENTIAL-interest, CRUCIAL-content-of-interest, WORK-content-of-interest, and ED[ucational]-content-of-interest. Non-calls use the existing phone system to collect and deliver personalized communications.

I. System Overview

In one embodiment, the Device Independent Unified Contact System (shown in FIG. 1) includes a plurality of input devices, home computer 5, laptop 6, smart phone 7, cell phone 8, telephone 9 (either VoIP or traditional PSTN), television with set-top box or other enhanced television system 10, and other devices 11. Other devices 11 may include any device that functions on a bi-directional transmission network or may include devices that receive communications over one type of network and send transmissions over another type of network (for example, satellite TV).

These input devices communicate with switching cloud 15. Switching cloud 15 includes a myriad of networks including, but not limited to, all conventional telephone systems, all cell phone systems, other wireless systems, the Internet, and any other communication switching network in the world. Logistically, in many cases, communications may travel from the device through multiple networks before reaching pNumber Service Provider 20. In many cases, communications may utilize the Internet at some point. For example, in the case of wireless phone networks, the pNumber Service Provider 20 may be accessed through the wireless phone network of the carrier and then through the Internet. Alternatively, the pNumber Service Provider 20 may be part of the wireless provider's core network, or may be connected via dedicated private networks (T1, VPN, etc.). The precise access route from the input device through the switching cloud 15 to the pNumber Service Provider is not vital to the function of the Device Independent Unified Contact System 1. In one embodiment, the pNumber Service Provider 20 may host the services on servers accessible via the Internet.

The switching cloud 15 filters out all the communications associated with pNumbers including telephone, email, and web communications, and directs them to pNumber distribution circuit 25. More information on filtering will be provided in the following sections; however, the filtering can be done by existing hardware architecture. In the context of PSTN, filtering is provided based on the usage of the * or # either preceding or following the dialing of a number. Existing switches can recognize the usage of this character and route the call to a separate server or other data hosting device. In the context of networks that operate on HTTP or a similar protocol, all messages associated with pNumbers will be sorted according to the address indicated. The distribution circuit 25 preferably includes a message repeater circuit 30 which directs the pNumber communications to the appropriate one of the storage nodes 35 within the pNumber Service Provider 20. Each of the nodes 35 is capable of providing many products that develop the one-point-of-contact concept. Some of these are illustrated at node 40, and include pAlert, the governmental warning system; pHome, which organizes the home-oriented messages; pWork, which organizes the work related messages; pRetail which organizes shopping; pTravel, which organizes travel-related messages; pEducation, which organizes education related messages; and many others. A pButler system 45 provides a variety of interface capabilities, permitting messages to be delivered by voice, web, email, or any other future communication method.

In addition to the inputs provided by the user, a variety of content and commerce providers may provide input to the pNumber Service Provider 20. Content servers 50, 55 and other content sources 60 provide information to various pNumbers. Content servers 50, 55 and other content sources 60 may include a variety of information sources including, but not limited to, content available over the worldwide web, such as news, music, video, entertainment, e-commerce offers; content available from governmental agencies (in the case of PAlert), etc. Since content need not come exclusively from a single transmission medium As show in FIG. 2, in another embodiment, system 100 includes a switching network 140 that includes all conventional telephone systems, all cell phone systems, other wireless systems, the Internet, and any other communication switching network in the world. There are a myriad of inputs to this network, including personal computers 110, laptop computers 112, smart cell phones 114, conventional cell phones 116, telephones 118, and many other communication devices 120. The system 100 also includes governmental communication systems including one or more Federal emergency communication systems 144A, 144B, with ellipses 145 that there can be many of these systems. There also may be other governmental emergency networks indicated at 148A, 148B, and the ellipses 149. These may include one or more state emergency communication systems, as well as many other communication systems of governmental agencies, foreign governments, quasi-governmental agencies, etc.

The emergency system provides a single contact point for each person in an emergency. The expanded system addresses a much larger problem than the need for an easily accessed and easily remembered emergency contact point. Most of us are overwhelmed by the number of websites, passwords, phone numbers, etc. that are required to simply keep up with banks, schools, credit cards, loans, shopping, email, social web sites, business, etc. Life would be much easier if there was a single, easily remembered, contact point for all information we need to operate effectively. The expanded Sage Connex communication system provides such a one-point-of-contact system.

Figure 2:
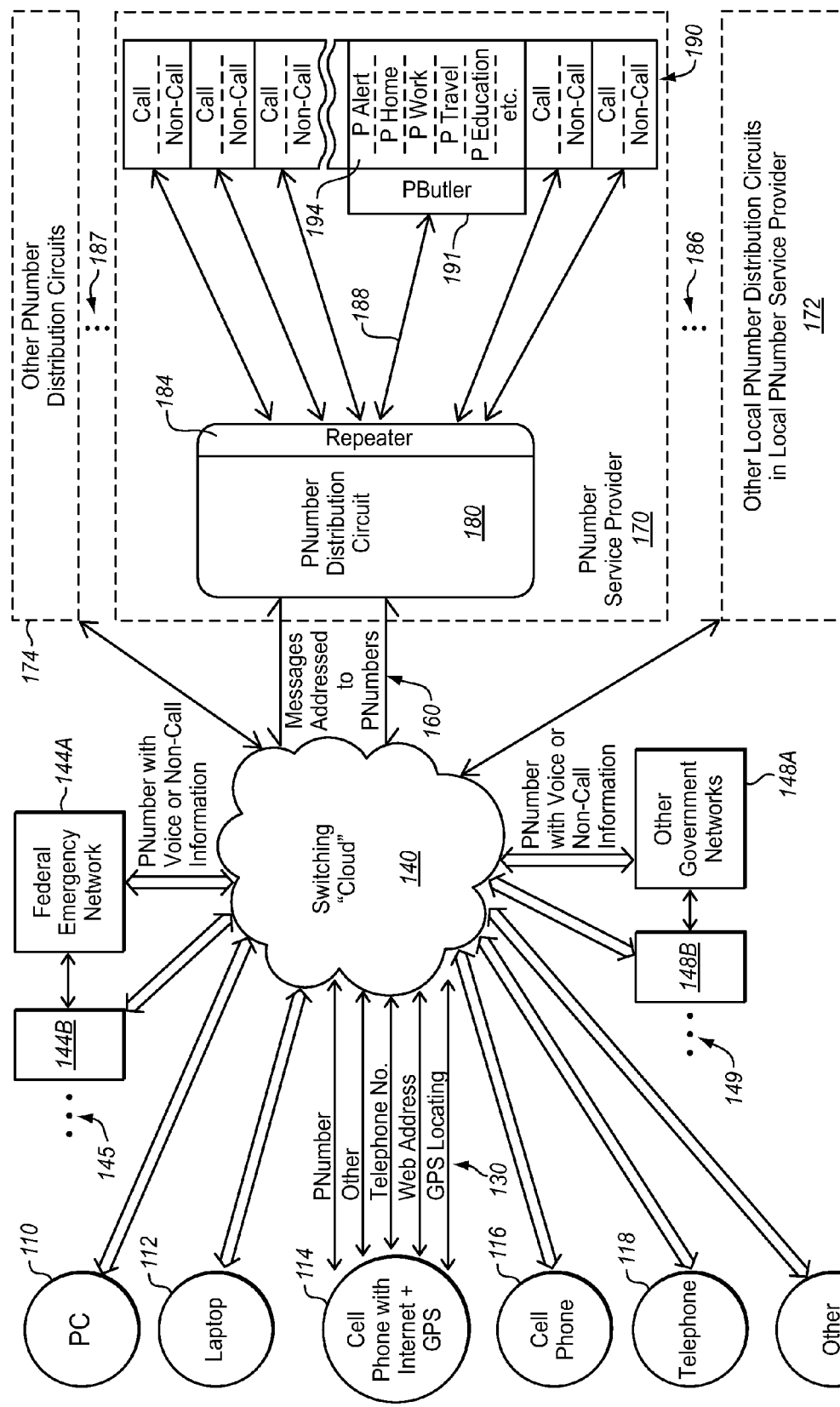
FIG. 2 is a diagram of one embodiment of an emergency alert system.

Referring to the FIG. 2, one embodiment of the expanded system 100 is illustrated. System 100 includes a switching network 140 that includes all conventional telephone systems, all cell phone systems, other wireless systems, the Internet, and any other communication switching network in the world. There are a myriad of inputs to this network, including personal computers 110, laptop computers 112, smart cell phones 114, conventional cell phones 116, telephones 118, and many other communication devices 120. The system 100 also includes governmental communication systems including one or more Federal emergency communication systems 144A, 144B, with ellipses 145 that there can be many of these systems. There also may be other governmental emergency networks indicated at 148A, 148B, and the ellipses 149. These may include one or more state emergency communication systems, as well as many other communication systems of governmental agencies, foreign governments, quasi-governmental agencies, etc.

Various types of exemplary communication protocols are illustrated at 130 for the smart cell phone 114. These can include pNumbers, conventional telephone numbers, conventional web addresses, GPS location data, and other types of communications. The other inputs 110, 112, 116, 118, and 120, similarly can have a variety of different types of inputs to the switching cloud 140. It should be noted that, while it is evident that the pNumber system easily converts telephone numbers to unique, personal nodes on which telephone messages can be stored, it is also true that the pNumber system can also provide unique, personalized email and Internet addresses. That is because current email and Internet standards require that domain names be limited to the ASCII letters a through z (case insensitive), the digits 0 through 9, and the hyphen. See IETF (Internet Engineering Task Force) RFC 1034. Thus, with appropriate governmental and IETF cooperation, a PNumber can also direct all emergency emails and web communications to a unique, personalized, and easily remembered email account or web site which will also provide the governmental alerts. Thus, the PNumber communication mode represents PNumber telephone communications, PNumber email communications, PNumber web communications, and any other communication protocol that can be converted to pNumbers.

The switching system 140 filters out all of the communications 160 associated with pNumbers, including telephone, email, and web communications, and directs them to PNumber distribution circuit 180. The distribution circuit preferably includes a message repeater circuit 184 which directs the PNumber communications to the appropriate one of the storage nodes 190 within the telephone system 170. Each of the nodes 190 is capable of providing many products that develop the one-point-of-contact concept. Some of these are illustrated at node 194 and include pAlert, the governmental warning system; pHome, which organizes the home-oriented messages; pWork, which organizes the work related messages; pRetail which organizes shopping; pTravel, which organizes travel-related messages; pEducation, which organizes education related messages; and many others. A PButler system 191 provides a variety of interface capabilities, permitting messages to be delivered by voice, web, email, or any other future communication method.

Similarly, as indicated by ellipses 186, there preferably are other local PNumber distribution circuits located in other local PNumber service providers 172, which may be local branches of the same telephone company that owns local PNumber service provider 170, or other telephone companies. As indicated by ellipses 187, there may also be other types of PNumber distribution circuits 174, such as distribution circuits in satellites, which may be owned by the same company that owns PNumber service provider 170, or may be other companies, such as a cell phone company.

An aspect of the system 100 is the hosting of phone numbers as online addresses. These web addresses can be set up swiftly and in mass, and then customized by each individual. A related key aspect is that each electronic node 190 is controlled by the individual to whom it communicates, with appropriate governmental regulation to be sure alerts have priority.

The Sage Connex system permits companies offering phone services, including traditional phone companies, VoIP, and wireless providers to become web site hosts and automatically generate a personal home page with an array of services that simplify the individual's life.

Another aspect of the system 100 is that it permits detailed geographic specificity for alerts. Unlike the Internet, geographic specificity is inherent in the organization of phone numbers since the phone numbers are distributed in an organized manner by telephone companies. The alert for a hurricane can be sent to only the persons likely to be affected, with the persons who are notified changed instantly as the hurricane veers in a new direction. With appropriate guidance by warning systems, even the erratic path of a tornado can be plotted and warnings directed to persons projected to be within a window, for example a five-minute window, of the tornado's arrival. Similarly, alerts for explosions, wrecks with toxic chemicals, and alerts for other potential disasters can be localized. While this inherent geographic specificity has been disrupted recently by cell phones which are mobile, the specificity can be reinserted using GPS locators that are already in the most advanced cell phones. The GPS locators also have other uses. For example, all cell phones approaching a road closure could be alerted.

Another important aspect of the system is that the personal web site for each telephone number can be accessed from any convenient electronic terminal, including conventional telephones, cell phones, and browsers. Since each node is local, connections and communications are fast and not subject to the potential issues in long distance communications. Since each contact point is individual, there is no potential for collapse due to overuse. The PButler interface allows the contact point to be communicated with by voice, written, or by a visual display.

Various terms useful in understanding the pWorld system include:

pNumber—generally, a phone number used as an online address for non-call exchanges.

pre-linking—See pSpider.

pSites—websites as programs. The different types of programming produced for the telesphere network.

pSpider—not indexing Internet content, but creating tokens by connecting content to the activity spaces behind the click spaces (using header registers).

pWorld—the telesphere—a place within the phone system where non-call communication is received and can be organized and stored. The space between the devices connected to the phone system where notions are processed and resolved. Physically, any digital string with telesphere registers in the header. Together with its components, they constitute the "improvements in telephony" system.

assembly points—components that process notions into feedback.

phone marker—the use of a signal selected from the group consisting of: a # signal or a * signal interspersed between two of said alphanumeric signals corresponding to said alphanumeric telephone number symbols; an Internet protocol address; a preprogrammed speed dial signal; a signal indicating that any key has been held down; or any other key or sequence of keystrokes, code or signals inserted in a dialing sequence initiating a non-call.

phone sites—places where notions are captured and transmitted and feedback is delivered and displayed, played back, and/or stored.

activity space—a type of telesite which is pre-wired for performance and achievement. Because they are self-organizing spaces, it does not need to be specified in advance all of the features of problems or what feedback is needed in order to see and hear and perform necessary functions. Living spaces (like homes), workplaces (like offices), and learning spaces (like classrooms) have many conflicting, interlinked variables and broadly defined goals of "making the grade" or "making a profit." The properly designed space considers the user, the activities, and the realities of the work. The essential purpose of being in the right "space" is to direct the outcome of the activities.

augmented phone services space—a layer in the infosphere accessible by any device which can access the phone system in which non-calls are processed.

click space—where user notions are converted to digital representations to be processed into feedback.

metaphor space—a virtual space described by a metaphor, e.g., the use of home, neighborhood, community, office, work, classroom, learning, and training metaphors and analogies and their related graphic elements to organize, store, display, playback, and "drill-down".

pWorld space—beginning as a point'n'click "souped up" website and leading to next generation drag'n'drop environments toward a kind of virtual environment and finally to virtual reality.

strand—a string of data that can be connected, strands are especially configured for use in the augmented phone services layer of the infosphere.

brandstrand—the personalization of feedback.

digital strand—string of data containing content, context, parameters, and instructions.

A. Data Protocols

There are several layers of rules, protocols, modules, and components for supplying users with their own place online and giving them digital ears, digital eyes, a digital brain and a digital voice. The system includes:

a new augmented phone services layer in the phone system to handle "webtone" as well as "dialtone";

a new call type: non-calls, a type of digitally-based dialog; and delivery protocols and modules for the delivery of content-of-interest and how to deliver it.

1. Phone Services to Augmented Phone Services

The telesphere is a new augmented phone services layer that enables individuals, groups, and businesses to utilize phone-based digital services easily and productively. Installing it gives users automated access to the Infosphere on a Do-It-Yourself (DIY) basis using a "site-fabrication" process to help users personalize and customize their websites and access an unlimited library of phone, data, and webpage add-ons from which they can design their personal and work life online.

The total system specification encompasses a virtual service above the ISP layer and "complex hosting" below.

A new augmented phone service must integrate the phone system and the Internet. To use the vernacular, the augmented phone service must support "webtone" as well as "dialtone". The protocols and modules support both the world of interactivity and the world of connectivity. In one embodiment, "complex hosting" is used in a distributed Internet service array (DISA).

Complex hosting is the handling of phone and web-based traffic with the equipment and infrastructure needed to set up, host, and operate a digital dialog network. Complex hosting is the infrastructure behind "webtone" components:

a supply of phone numbers to convert into personal Web addresses;

installation of a "non-call" network appliance server in the phone network;

hosting the personalized exchange of information, audio content, and video content; and billing information.

The DISA network design details how the DISA model is applied to a phone company's standard hosting configuration. The DISA architecture defines five layers containing the components that deliver digital dialog functionality, with a non-call network appliance server supplying the "digital dialog" layer in Layer 4:

Layer one—security layer—The DISA architecture allows for strategic deployment of multiple firewalls between the distinct layers, such as a firewall in front of the load balancing and application server layers (between layers 2 and 3) and another between the application and data resource layers (between layers 4 and 5), integrating the network's security components throughout the system.

Layer two—load balancing layer—This layer presents a single system image in the form of a virtual IP address, representing multiple Web/applications servers.

Layer three—web and application server layer—the phone company's application servers are the primary hosts for personal websites. This layer handles the user interfaces and hosts the different digital dialog sites ("telesites")

users want attached to their personal web address. In one example of an embodiment, it runs on Microsoft IIS and Apache, and e-commerce systems such as Microsoft Site Server and Microsoft Commerce Server.

Layer four—digital dialog layer—posting and display of customized views and messages to personal web addresses is handled by the network appliance server. It houses an operating system which integrates session information flow with underlying stored content or content ready-to-be-delivered-on-demand (JIT web pages). JIT web pages are made possible with data analytics, data-mining, and pattern-recognition software built into the operating system, which also integrates the network's operations with the domain registries, the telephone network, and the billing interface. The operating system stores all personal information, custom data, and links in a user's personal account in Layer 4.

Layer five—data resources layer—the data resources layer is where the application data is stored, managed, and accessed. The DISA architecture avoids data replication problems by providing a highly available centralized file server. This avoids having to replicate data on application server drives. This layer contains the database architecture that stores e-commerce data, such as product catalogues, users' registration information, and billing and shipping information, etc., as well as storing personal and custom information in users' personal accounts.

Using mass production techniques embedded in a digital dialog network appliance server, an augmented phone services layer churns out "telesites" on demand, an industrial-strength manufacturing process which can be duplicated in any major telephone services area by registering large volumes of telephone numbers as domain names. These telesites put web services on the phone bill, and complex hosting integrates online address registrations and personal portal hosting with provisioning, billing, and collections.

Furthermore, complex hosting must be able to manage the new phone network across multiple ISPs on both dialup and broadband services regardless of whether the ISP is on a landline, cellular, cable, or satellite network.

B. Calls and Non-Calls

Phone companies currently handle call traffic (voice or image dialog, paging, texting and fax). To handle non-call traffic, however, all incoming content—information and digital dialog—must be reduced to tokens, notions, and feedback so that they can be processed in the augmented phone services layer in the network.

A non-call is a digital dialog. At every click and point in the telesphere matrix, a "dialog" can be started and maintained using chat, email, messaging, faxback, bulletin boards, blogs, or tele-assistance. These digital dialogs can be one-to-one (assignments, for example), one-to-many (soliciting bids or broadcasting), or many-to-one (an auction) and are facilitated by the digital dialog user interfaces designed to manage the exchange of personalized information.

Currently, calls are handled by phone companies and non-calls are handled by dotcom companies. Both calls and non-calls are interactive processes that involve the exchange of information and the transmission of content; but in order to handle non-calls, a circuit of notions and feedback must be created on which digital dialog tokens can be processed.

Processing the tokens entering the system is the non-call equivalent of "resolving" the call. Semantic computing techniques are used to match incoming notions with appropriate feedback (trade secret); but how the telesphere is set up, the mechanisms within the DISA layer needed to move tokens through the system, and the description of the process itself constitute a system of resolving non-calls using token-based computing.

The non-calls themselves are phone addressable information that previously passed over the phone system. The key to capturing this digital dialog traffic is the ability to divert non-call traffic to a "datapoint", a place in the augmented phone services layer where the digital dialog can be processed and delivered. The broad specifications of this datapoint are:

delivery to that point must be unique: regulated—secure, protected—private access, and self-regulated—customizable and reliable—like the dialtone;

use of that point must be unique, depending whether the user is the addressor or the addressee;

access to that point must be unique—the use of the * and # keys on the telephone keypad and the www prefix in the address line of a browser;

functions at that point must be unique: where tendencies are expressed and captured as notions, where notions are processed into feedback, where content is organized, where content is stored or deleted, where content is displayed or played back, and where "rules" are applied to incoming content; and the nature of that point must be unique: device independent, convergent, and custodial.

C. Resolving Non-Calls

In one embodiment, a token-based process of resolving non-calls is used. The process is made up of five intercomplementary sets of modules/procedures implemented in a module system:

Module A—marking non-calls and routing them into the telesphere to be resolved by inserting the * and/or # key(s) on the phone keypad or entering www.[number] into the Internet browser.

Module B—pre-linking all content in the Internet to digital "voice" and "visual" interfaces by indexing pointers to their location with address pointers of an activity matrix, i.e., encoding all of this into digital "loops" embedded into the header registers of all content-of-potential-interest.

Module C—converting incoming clicks and interactive voice functions (IVF) or keypad sequences into notions and augmenting these notions with "tendencies" gleaned from user profiles and past activity and/or data mining, i.e., encoding all of this into digital "hooks" embedded into the header registers of all active "tickets" (yet-to-be-resolved notions in the telesphere).

Module D—assembly point software processes "tokens" (a code set of data and instructions) using a trade-secret recipe, data analytics and values in the fields of the header registers, aligning "loops" to "hooks" to the "phone addresses", and assembling "brandstrand" feedback into content-of-interest.

Module E—delivery software directs content-of-interest to digital "ears" and "eyes" (phone-numbers-used-as-addresses) for immediate feedback, posted to the digital "voice" and "visual" interfaces, or stored in users' activity matrix to be delivered later.

It is the resolution of non-calls which allows the system to handle the migration from dialog to digital dialog by enabling the phone system to handle both calls and non-calls. A process of computing on digital addresses mimics the natural tendencies of our minds to associate perceptions with experience in order to formulate responses and behavior. In the telesphere, however, a "digital mind" (a set of rules and procedures operating within the connectivity of the phone system) resolves notions and tendencies with information delivery and feedback. The processes that govern our natural behavior and response to impulses from the environment are mirrored by digital "sense organs" and a "digital brain" to automatically and instantaneously associate and link information using the nearly universal phone system.

The five intercomplementary sets of modules are a foundation on which "improvements in telephony" can be made (upgrading telephony to handle non-calls). In order for the phone system to accept and resolve non-calls, a select set of inputs, outputs, and processes must be arranged along a complex logic line based on rules and connectivity called the "non-call local loop circuit". Non-calls are resolved by a process of attaching incoming notions to tokens which are "pushed" along this virtual circuit to a programming point where the tokens are either "delivered" to a call center interface as a message to digital "ears" and "eyes" (an addressable or personal point in the telesphere) or as content-of-interest to ISP-hosted digital "voice" and "visual" interfaces (characterized as personal, work, or learning dialog). Each incoming notion "charges" (or "weights") a token established at the beginning of a session to receive and carry it. A transaction ticket is created and the token is further charged or weighted by mapping in any relevant tendencies. The non-call local loop circuit facilitates a synchronous, asynchronous, or intermittent digital dialog (a two-way flow of information once a connection has been established) by "balancing" the "charges" (or "weights") of the notions with the opposite charges of the feedback. (Another way to visualize this process is to think of notions unbalancing the system and feedback balancing it again.) The real source of the incoming notions originates in the mental structure of the user's mind which is matched to an internal structure in the phone system by an activity addressing scheme common to both. When a non-call is originated and a connection is established, the charged or weighted notions are resolved only by opposite charges or weights: content-of-interest stored in the internal structure of the telesphere that flows as feedback into the digital dialog exchange. This continuous flow of inputs and outputs collected and generated by the assembly point processes constitutes any and all forms of digital dialog traffic flowing in a virtual circuit connecting addressors and addressees (senders and receivers). The inputs, outputs, and processes of the instant digital dialog mechanism flow over a conceptual "connection" between sender and receiver. This connection is made when a set of datapoints within the system, the activity address matrix, and the user interfaces are contiguously linked in a digital dialog session:

inputs—capturing notions;
    outputs—delivering content-of-interest;
    processes—processing digital dialog tokens;
    [data]points—access, addressable, personal, assembly, and programming (including interrupt and delivery) datapoints;
    operating system—the software that handles pre-linking, address processing, matching loops and hooks, feedback assembly, and delivery;
    activity address matrix—universal set of computable logical and physical addresses shared by the system, devices in the system, and by every user in the system; and
    interfaces—the digital version of ears, eyes, and voice presented in a metaphorical form which all users understand intuitively (e.g., home, office, classroom, alert, bank, etc.), the tangible forms of "digital dialog".

1. Inputs

The five intercomplementary sets of modules provide for the capturing of notions to be processed into feedback. The following occurrences can be transformed into feedback:
    Internet access;
    Telephony access;
    Phone numbers as online addresses;
    Addressable points;
    Converting large volumes of unique numbers (telephone numbers, street numbers, barcodes, ID numbers, etc.) into addressable points on the Internet accessible by a personal computer (PC), personal digital assistant (PDA), and/or a phone device;
    Attaching one or more personalizable and customizable "splash pages" (personal points) to each addressable point;
    Capturing notions;
    Attaching personal points with relevant links to other addressable points; and
    Delivering the ready-to-be-hosted personal points to a specially configured network application server in the Internet service provider's (ISP) racks at the data center of the phone companies.

2. Outputs

The five intercomplementary sets of modules provide a means for delivering content-of-interest to a programming point that directs the content-of-interest to either a call center or ISP host including content such as:
    Feedback;
    Addressing;
    Delivery;
    Display, playback, or storage; and
    Delivering charge information to the billing agent.

3. Processes

The five intercomplementary sets of modules provide components enabled at stepped points in the system to process incoming notions until each one is resolved, for instance:
    Prelinking Internet and telephony content to an activity address matrix within the telesphere;
    Registering phone numbers as phone accessible addresses;
    URL country suffix for digital country code;
    Pre-registering numbers and host servers;
    Programming unique address processes: processes for addressees, processes for addressors;
    Accessing the telesphere and processes at a personalized point;
    The use of phone numbers (easy-to-remember numerical proxies for and the private property of people) as addressable points in the telesphere;
    Combining the operating system and user interfaces to resolve notions with content-of-interest in such a way as to digitally mimic the workings of a brain:
        Digital cognition—the processes responsible for the awareness of everyday life (feedback), processes which include memory, experience, perception, and the expert use of any given syntax (click space); and
        Association—using digital hooks and loops to mimic a natural function of the way our mind processes information, that being our inherent mental ability causing us to associate and link anything in the external environment (or all content in the telesphere) that is similar in quality, characteristics, properties, or traits to anything that already exists in our mental environment (or content-of-interest) as a memory or distinction (content stored in the activity address matrix);
    Converging different types of digital content for processing by inserting header registers;

Resolving notions by applying, processing, and computing on the values contained in header registers, separating available content from content-of-interest, indexing the addresses of both, marking each of the data strings classified as incoming content or content-of-interest, appending them with header registers the contents of which constitute a code of data and instructions using notions and data analytics to process, sort, and post output to an "activity address matrix" of "folder" addresses containing "pointers" to the content-of-interest;

Monitoring access and use of all personal and programming points, and personalizing views and messages;

Developing "virtual digital surfaces" to capture notions and deliver feedback;

Processing and sorting incoming content into content-of-interest using a click, click-point and click-space process that pushes notions through the system;

Resolving incoming notions at an "assembly point" where "feedback" is assembled by clustering links and sites sent to a digital interface at an ISP-host or a personal point at a call center;

Packaging feedback for delivery (messages for personal points and content-of-interest for digital dialog interfaces); and Building web pages "on-the-fly" (HTML+header register for session use or storage).

4. [Data] Points

The five intercomplementary sets of modules establish and maintain a connection by passing non-call tokens through various linked "points" in the system, for instance:

Telenumbers follow an intercomplementary matrix addressing scheme for each type of web address. For example, there are different schemes for phone numbers as web addresses, barcodes as web addresses, and street numbers as web addresses, etc., but in general, telenumbers are:

Numbers and addresses that are proxies for people, e.g., students (at ID addresses), target markets (at street addresses), taxpayers (at national ID addresses), buyers (at warranty addresses), and old customers (at ticket number addresses);

Numbers and addresses that are proxies for things, e.g., users or owners of machines and parts (at machine and parts addresses), marriages (at registration addresses), sales (at point-of-sale addresses), coupons (at buyer's addresses), and appointments (at calendar addresses); and Telesites are web pages used as programs, with specific preset configurations for products and services which can change automatically with incoming clicks or IVF keypad input.

5. Activity Address Matrix

The five intercomplementary sets of modules use an activity address matrix to link user's internal mental structure to the physical addresses of content-of-interest located at addressors' or addressees' digital devices, the host server, and a server in the Internet or on a removable device. It is the activity addressing scheme that enables the system to associate and link anything that exists in the external environment to anything that is similar in characteristics, properties, or traits to personal, work, and learning activities that already exists in our mental environment. This activity address matrix is located between users and the content-of-interest stored in matrix folders—like a middleman between clicks and content—enabling users to see and hear interesting views and messages or have links to content in other folders. The activity address matrix is the same for local phone, PDA or PC device, the host network server, remote network server, or a removable storage device anywhere in the session circuit.

All content-of-interest in the form of data strands (brand-strands and digital strands) to images, views, messages, and links (pointers to other folders) is stored in a folder labeled with a matrix address number which contains:

sponsored views, messages, and links;
client views, messages, and links;
default views, messages, and links;
public views, messages, and links;
private views, messages, and links; and/or
personal views, messages and links.

6. Operating System

The five intercomplementary sets of modules use an operating system that acts as both a traffic cop and assistant, assembling information and delivering it to the digital interfaces for display on PDAs or PCs or playback by piping it through the telephone for users who call in. The assembly process activates the switches that deliver (or stop) the right views and messages from displaying or playing. This high-volume high-speed assembly process depends on the following:

storing content at addresses;
performing computations on addresses; and
manipulating addresses.

7. Interfaces

The five intercomplementary sets of modules use specifically-designed user interfaces to anticipate and handle the normal issues of reaching addressable and personal points in the telesphere:

Telenumber registration;
Telesite selection as the first page people see or can listen to;
Public/private/personal access, passwords, and memberships;
Add-ons, commercial connections, and new features;
Phone and Internet interfaces to add, delete, change, and save changes;
Display and/or playback of personal data and choices on a phone device, PDA, or PC;
Aggregating data on the same site from multiple sources;
Payments and collections; and
Supplier relationships and deliverables.

Digital dialog is repeated sessions using the interfaces to create virtual environments which are built up by the interaction of click spaces and activity spaces. Behind the interfaces, a click space containing logical addresses travels along the non-call local loop circuit activating processes resulting in feedback. Any one click space can be distributed over many activity spaces (one-to-many). In other words, click spaces can be distributed over many addresses in the activity matrix. Conversely, activity spaces (storing pointers to content-of-interest at physical addresses) are many-to-one. One activity space can be distributed over many click spaces. The interfaces directly control the clicks, click points, and click spaces, instructing the system to prepare content-of-interest for immediate delivery to an addressable or personal point, or storing the content-of-potential-interest if a notion is replaced by a tendency and the user left instructions (solicited delivery) or did not request delivery (unsolicited posting).

The user interfaces are essentially metaphors for receiving, displaying, organizing, and storing digital content-of-interest and matching users to content stored in databases. They activate and control a process for delivering content-of-interest to online addresses and to an activity address matrix that links Internet addresses with content-of-interest and matches this content with what users want to see, hear, and know.

D. pBrain pBrain is a virtual processor (or "brain") located within the phone system that processes incoming notions so that the proper feedback can be provided by pWorld servers. Notions are indications by the user of a desired action, and feedback is the result that fulfills the notion. pBrain allows for the interactivity, filtering, and function of the system.

Figure 3:
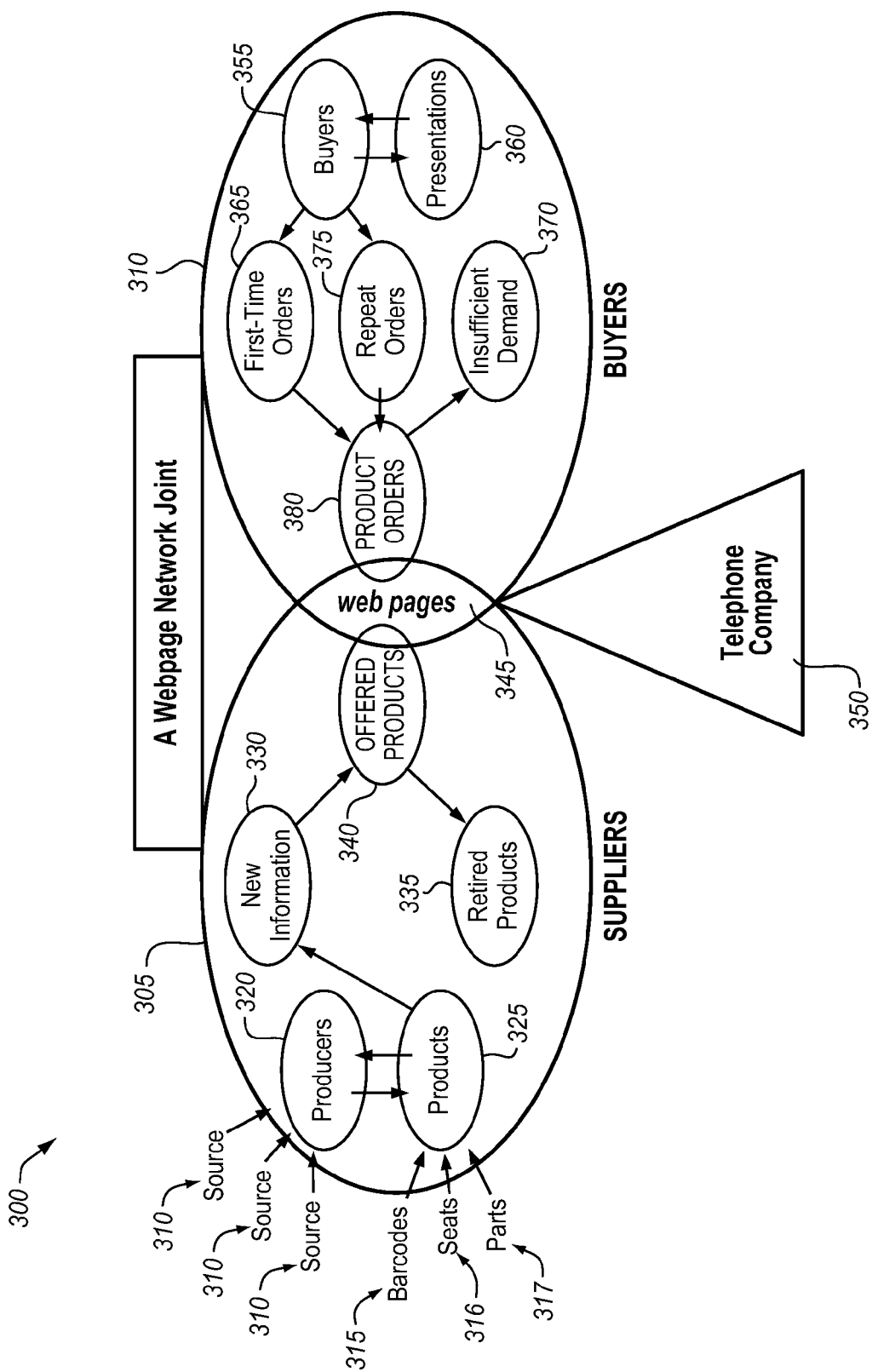
FIG. 3 is a diagram of one embodiment of the interaction between consumers and producers.

FIG. 3 shows an embodiment of a webpage joint network diagram where producers/suppliers 320 are connected to buyers 355. Set 305 is the sphere of the supplier/producer, where activities related to the production, presentation, and sale of products takes place. Set 310 is the sphere of the buyer where buying activities take place. In the context of the presently described systems and methods, the phone company 350 is uniquely positioned to support the intersection of the two spheres by providing web addresses correlated to various characteristics of products, orders, and users hosted in web pages 345.

In the context of producers/suppliers 320, sources 310, barcodes 315, seats 316, and part numbers 315 can all be assigned a web address based on the number or other indicia associated with them. Sources 310, barcodes 315, seats 316, and part numbers 315 are converted into products 325 by the producers 320. The producers 320 generate new information 330 about the products 325, and this new information 330 becomes an offered product 340. Some portion of the products offered and the information concerning those products is provided for sale via web pages 345. At a certain point, some products become retired products 335 if sales or interest in these products has waned.

In the context of buyers 355, presentations 360 concerning products are received by buyers 355. Buyers 355 either make first time orders 365 or repeat orders 375. In some cases, there may be insufficient demand 370 for a particular product. Product orders 380, some portion of which are realized over web pages 345, is the result of the buyer process. In order to make information more accessible to buyers, receipt numbers, ticket numbers, and the user's personal address (pHome) may be created as web pages.

The theory behind these web pages is that the pBrain virtual processor may process the information stored, received, and exchanged by these web pages in order to make the commerce system and advertising as efficient as possible.

Figure 5:
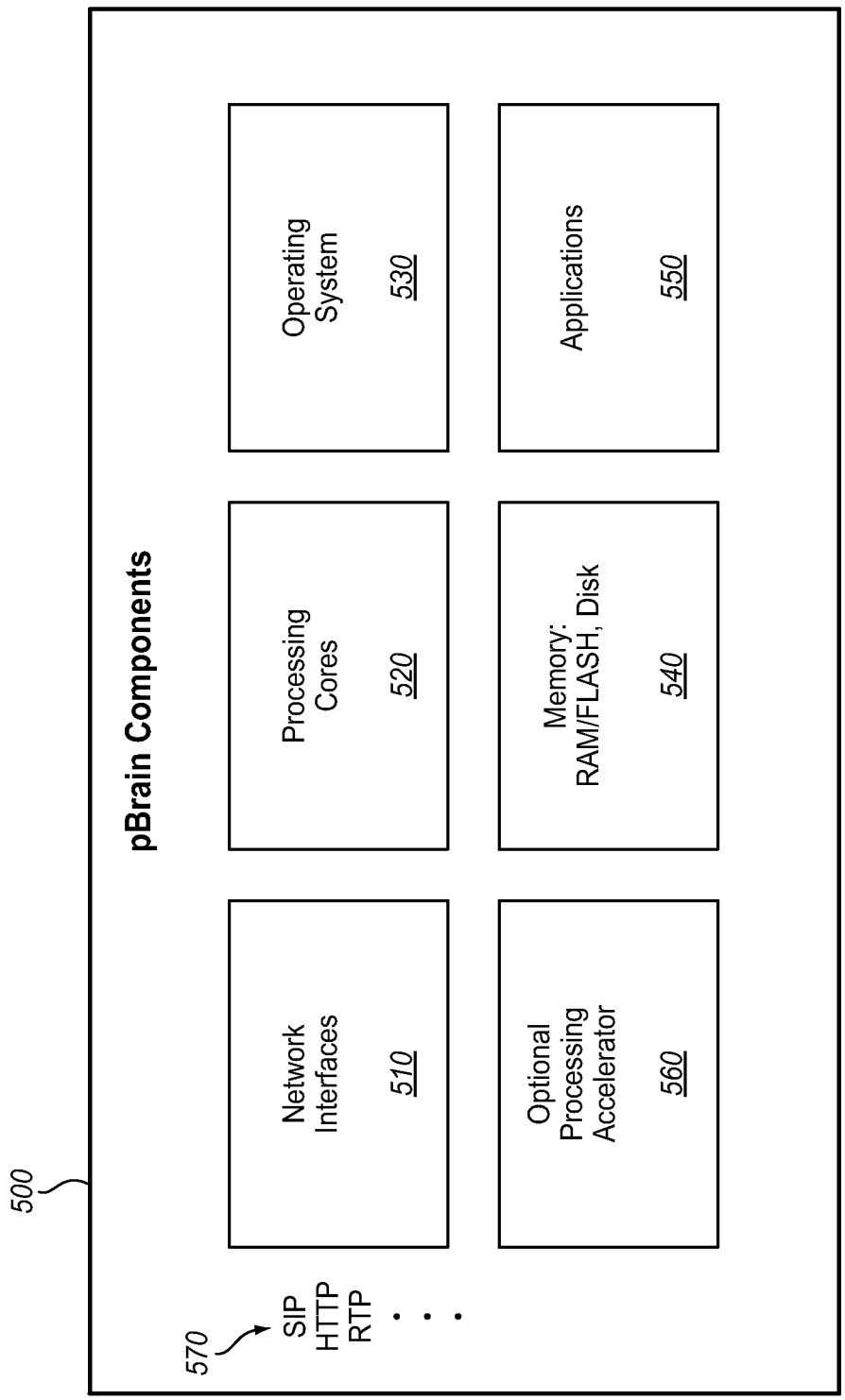
FIG. 5 is a system diagram for the components of one embodiment of pBrain.

Referring to FIG. 5, in one embodiment pBrain 500 includes a number of components. pBrain 500 may be designed to be a distributed processing system or a processing system with a single location. Network Interfaces 510 allow pBrain 500 to interface with a variety of networks using a variety of protocols including, but not limited to, SIP (session initiation protocol), RTP (realtime transport protocol), and HTTP (hypertext transfer protocol). Since pBrain may interface with voice telephone networks (including PSTN), wireless telephone networks (CDMA, GSM), the Internet, etc., multiple network interfaces may be needed. Processing Cores 520 and memory 540 perform the processing needed to resolve notions into feedback as determined by operating system 530 and applications 550. Since during high traffic times processing power may be at a premium, pBrain 500 may also include an optional processing accelerator 560.

Figure 6:
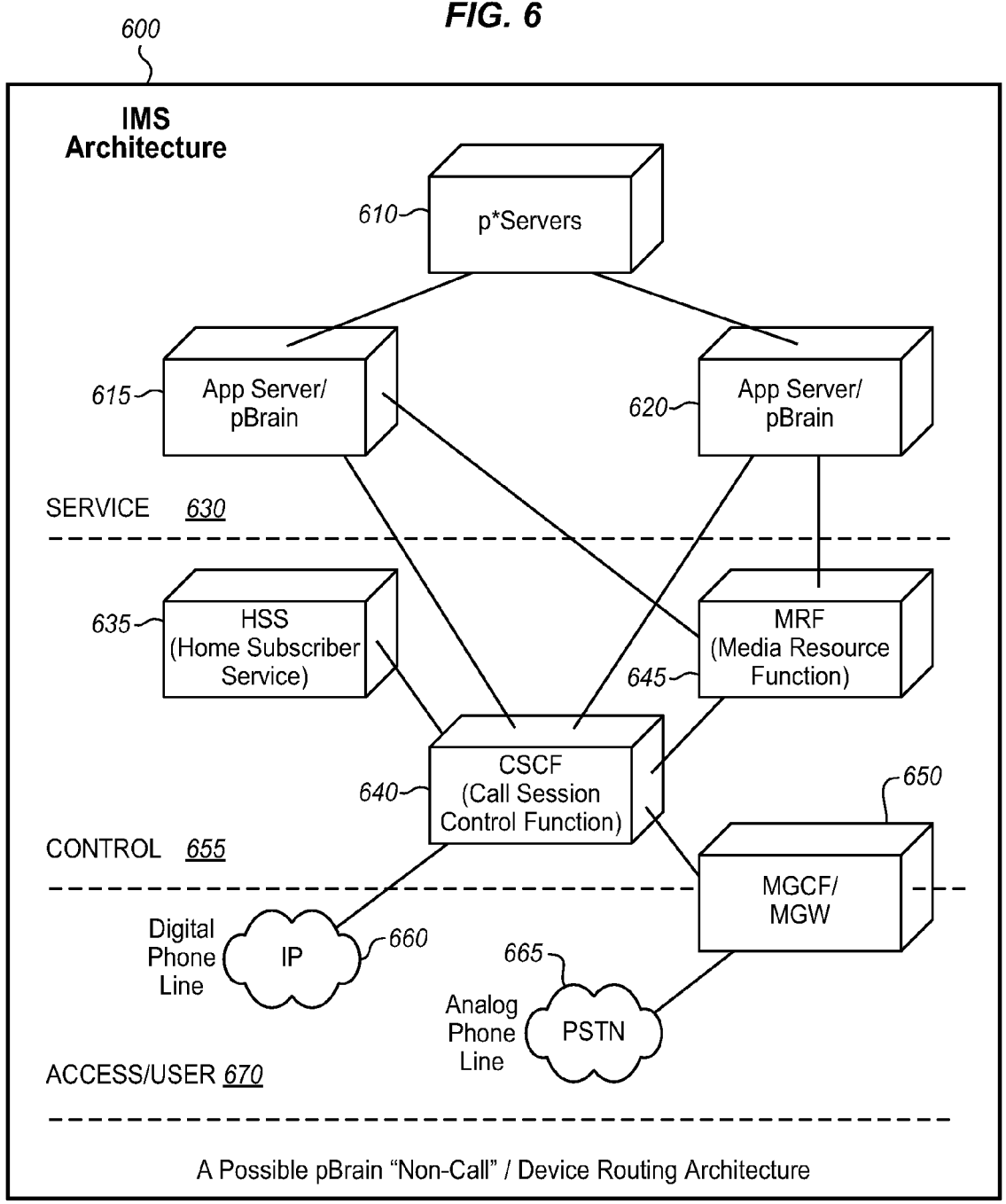
FIG. 6 is a diagram of one embodiment of an IMS architecture.

In FIG. 6, one embodiment of pBrain 600 and a simplified view of an IMS (IP Multimedia Subsystem) Architecture is shown. User access level 670 shows various access networks including IP network 660 and PSTN 665. Additional access networks are possible including, but not limited to, cable television networks, wireless telephone networks, WI-FI (WLAN), Bluetooth, GPRS, etc. Since PSTN 665 is an analog phone line, in order to enter a digital environment, the signal is converted to IP. The Media Control Gateway/Media Gateway 650 serves to convert the TDM signal of the PSTN to IP protocol and direct the packets accordingly.

In the control level 655, the CSCF (Call Session Control Function) 640 processes SIP requests (session initiation protocol) and routes calls to application servers. It is at this point where calls include an indictor for accessing pServers (such as the * or #). The HSS 635 (Home Subscriber Server) is the central database for subscriber data. This subscriber data is provided for the routing of calls. MRF (media resource function) 645 enables advanced media capabilities such as audio and video IVR functions, teleconferencing with ad-hoc and group calls, fax reception and forwarding, and the streaming of content.

Service layer 630 is where the functionality and the pHome, pWork, pEducation, etc., sites reside. p*Servers 610 serve as hosts for the variety of pHome, pWork, etc., sites. The App Server/pBrain 615 and 620 provide for the functionality of the system.

Figure 7:
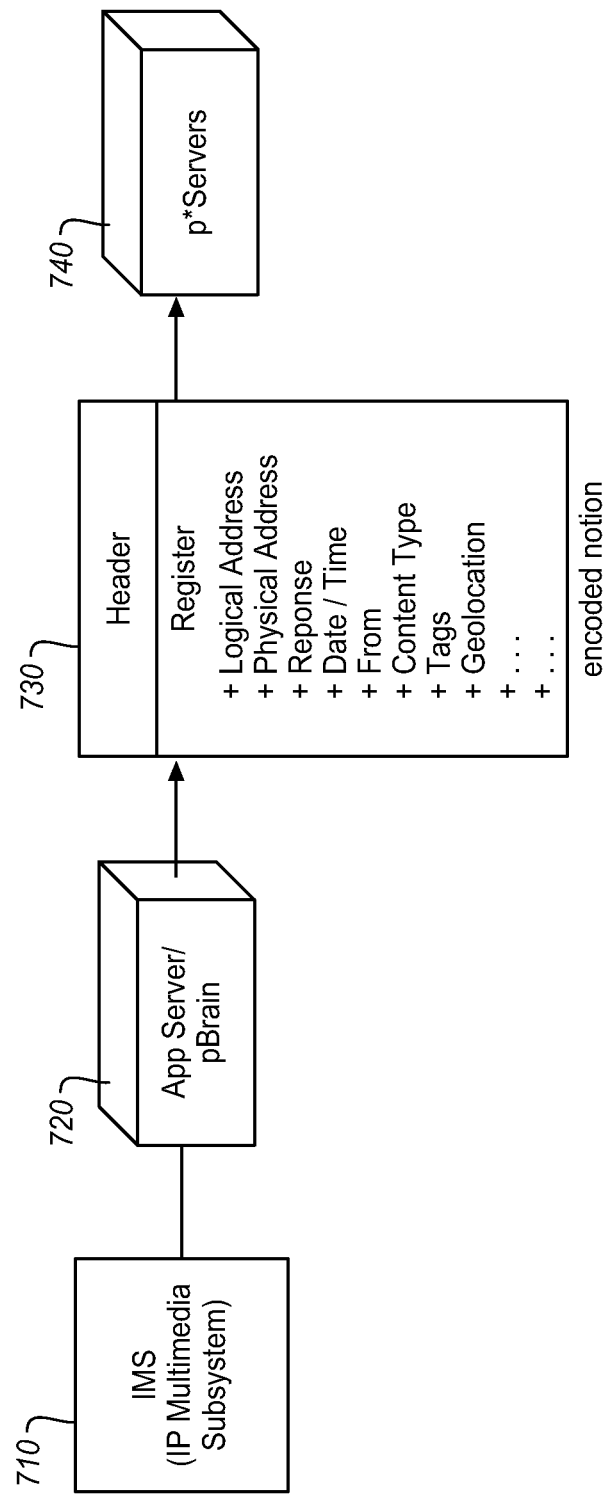
FIG. 7 is a diagram of the flow of notions in one embodiment of a system for processing notions.
Figure 8:
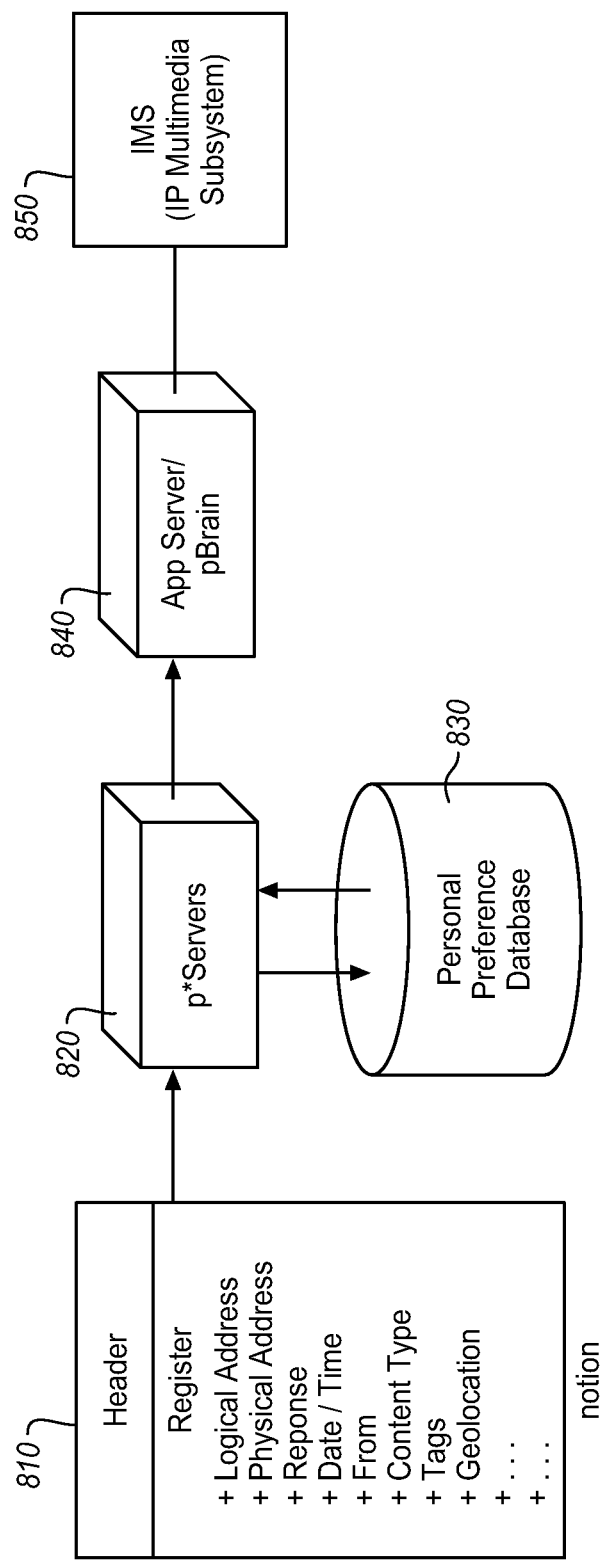
FIG. 8 is a diagram of the flow of notions in another embodiment of a system for processing notions.

FIG. 7 shows how notions are captured, and FIG. 8 shows how notions are converted to digital feedback. A notion is originated through the IMS 710 and to App Server/pBrain 720. pBrain 720 converts the notion into an encoded notion 730. This process involves receiving click stream, textual, or voice input (or key pad inputs) and converting it into a format that may be easily processed. As shown in FIG. 7, the encoded notion includes a header and a register with fields such as logical address, physical address, response, data/time, from, content type, tags, geolocation, etc. These fields are simply one example of the possible fields that may be included in the encoded notion. The requests of the user may be converted according to a number of techniques. In one alternative, the words or text may be interpreted and broken down into categories of requests and indicators. This breakdown may be facilitated according to an interactive process through click stream, textual, or voice interaction with pBrain 720. For instance, a user may say or select a category of queries, such as "find restaurant". In order to narrow choices and provide an accurate response, the pBrain 730 utilizes additional queries of the user. User history and current information (such as geolocation data) of the user may also be utilized and retrieved through the p* Servers 740. It may also determine, for instance, what restaurants are open so a closed restaurant is not suggested based on the time of the request and so on. The encoded notion may then be fulfilled by the pServers 740 by delivering content or other response.

FIG. 8 shows an embodiment for how a notion is resolved and feedback is returned to the user through IMS 850 (IP Multimedia Subsystem). An encoded notion 810 reaches p*Server 820, which as described above may be a pHome server, a pWork Server, etc. Personal Preference Database 830 is accessed to provide additional information about the user including, but not limited to, user profile information, user history, collaborative filtering information (history of those with similar profiles), etc. This combined information then is returned to the pBrain 840 (or App Server) where the information is resolved. Then the p*Server is used to fulfill the notion by retrieving the proper content. Then the information is transferred back to the user through IMS 850. In one example, the encoded notion 810 geolocation information and the user preferences contained in Personal Preference Database 830 may include genre preferences of the user for movies, so that, when the user requests information about available movies, only movies that can be watched or obtained near the user's geolocation are returned and the list of movies is either limited to or sorted according to the user's genre preferences.

Figure 9:
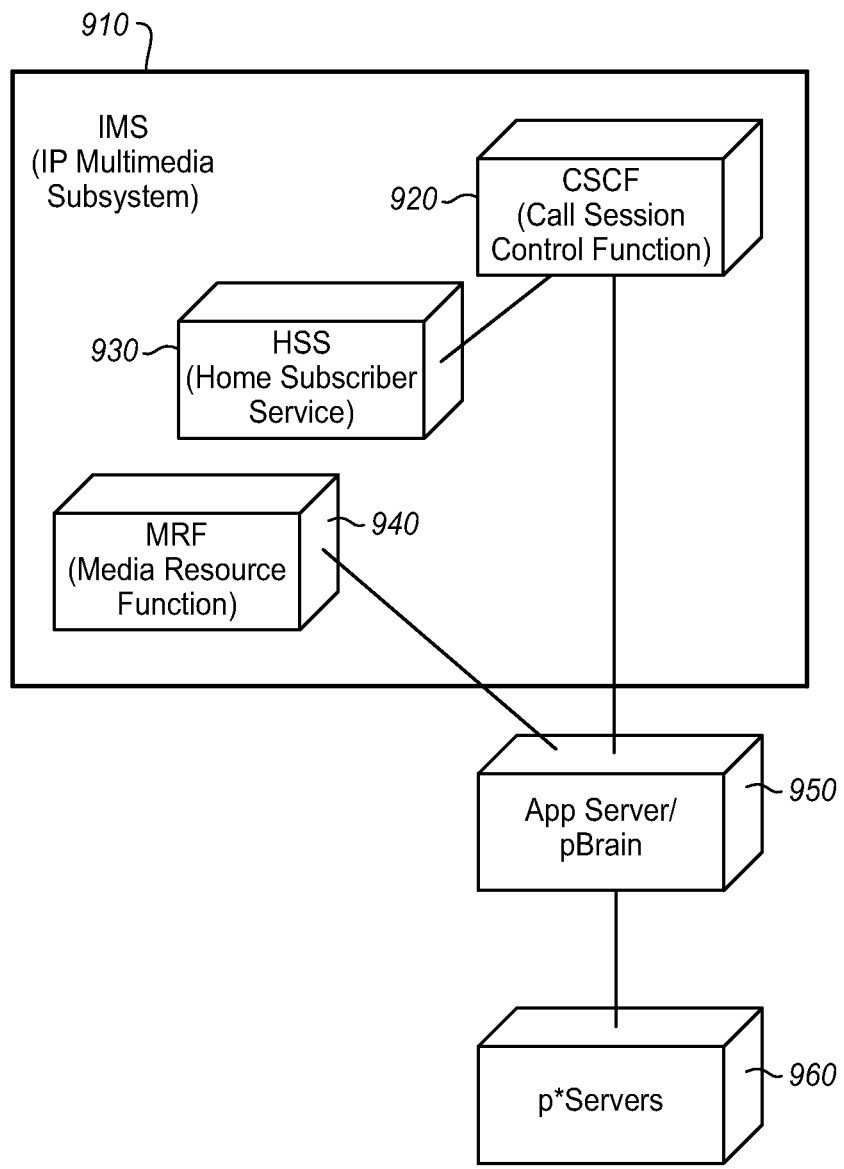
FIG. 9 is a system diagram for one embodiment of a system including an IMS, a pBrain, and an interface to the pWorld Server.

FIG. 9 shows an example of converting Header Registers into the content and populating the header registers with pointers. The example is the tagging of content and insertion into the Activity Matrix—in this case, voicemail from a friend. Insertion into the Activity Matrix means registration and storage at the intended recipient's pHome. In one example, a call enters the IMS 910 from an individual wishing to leave a voicemail for a user having a pHome at p*Servers 960. The CSCF 920 (Call Session Control Function) controls the call and obtains routing information from the HSS 930. The call is routed to the user's pHome at p*Servers 960. At p*Servers 960, it is determined how to handle the call. In this case the p*Servers 960 have instructions for delivering a customized greeting to the individuals. A number of alternatives are available, however, including, but not limited to, the rerouting of the call, ignoring the call, sending a notification to the user through another medium and network that the individual is calling them, as well as providing options to the individual for a desired response, etc. The customized greeting is returned to the individual, utilizing the MRF 940 and IMS 910. The individual leaves a message and a notion is created with a partially filled Header-Register. The Header-Register is sent to and received at the pHome Server at p*Server 960.

Figure 10:
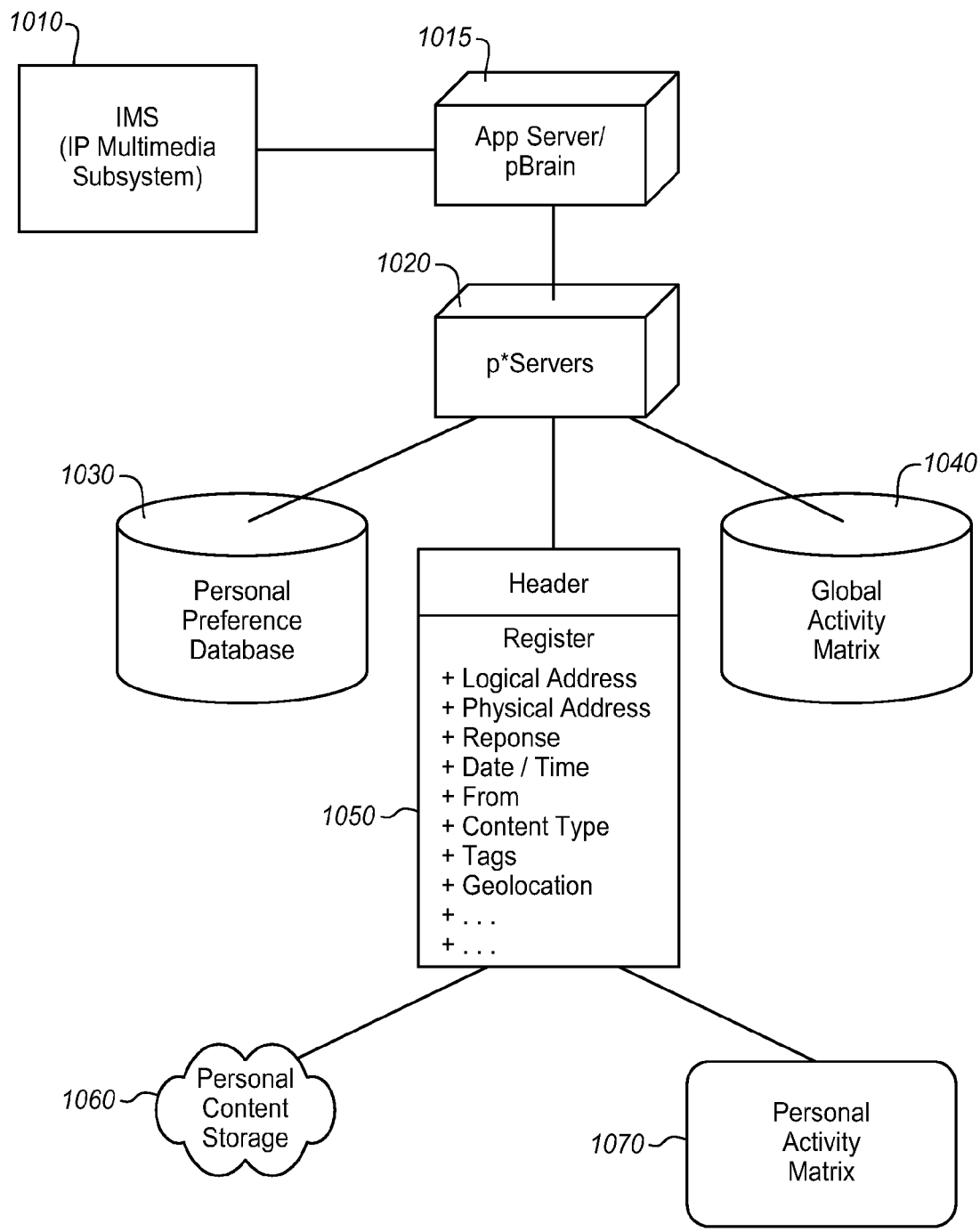
FIG. 10 is a system diagram for one embodiment of a pHome system.

FIG. 10 shows an example of content tagging for insertion into an Activity Matrix. A notion is received through the IMS 1010 and, in order to fulfill that notion, the notion is processed by the pBrain 1015. The digital dialog established by the pBrain 1015 is then sent to p*Servers 1020 with a partially filled-in Header Register. The Personal Preference Database 1030 stores preferences concerning this content, and a logical and physical address is filed in for the content. This is stored in the Global Activity Matrix 1040. The Notion 1050, which is logical and physical address information, then is provided to the user's Personal Content Storage Database 1060 and the user's Personal Activity Matrix 1070. Although this content is provided to these other locations, in one embodiment, the logical and physical address remains the same. In this way, duplication of data can be reduced, since in many cases multiple users will access the same content. In Personal Content Storage 1060, the content is grouped with other content for recall and feedback. In Personal Activity Matrix 1070, it is grouped with content related to similar activities.

By recording some level of non-personal information in Global Activity Matrix 1040 about the content, matches for future users will be improved. Examples of such information may be related to collaborative filtering, location filtering, preference filtering, profile filtering, etc.

II. PSTN and Phone Company Integration

The pWorld system interacts and provides value for traditional phone companies in many ways.

Internet—A huge additional revenue stream for the phone companies will be Internet registration fees of pHome, pWork, pEd, etc., sites that are based on the user phone number. Since augmented phone and data services will be channeled through the phone companies, the phone companies will get to "mass register" domains (phone numbers) to provide the "digital homes" for people. There will be flat monthly fees, registration fees, and additional service and bandwidth fees. All of these provide additional revenue for the phone companies.

Applications—These are run via the application servers in the IMS. The application servers then interface to the pWorld network, providing augmented and new services. The application servers have direct access to existing digital services that are provided by the phone companies (voice mail, call records, greetings, etc). As such, these can be seamlessly integrated into new applications provided on the pWorld platform. Now that "calls" can now be diverted to the "non-call" network, custom greetings, messages, and special options can be presented to callers on an individually tailorable basis. Access to applications, services, and data are classified as "public", "personal", or "private", where personal information can be shared on a controlled basis, information deemed public is accessible by anyone, and if it's private, that information or service is available only to the pWorld/pHome owner.

Billing—As applications are run and content is moved (P2P, Pay-per-download, free downloads, etc.), service and bandwidth charges are accrued. These charges are then reflected on the monthly phone bills of the pWorld users. Currently, the phone companies are only performing "offline charging" where billing occurs only at the end of the month. pWorld could now enable "online charging", dynamic, or real time billing and services that were previously not possible, thus providing additional revenue streams. This will work for both pre- and post-paid paradigms. In the prepaid content, pay-as-you-go billing may be used, where a user's account balance is queried and it is required that the user have sufficient finds available, either directly or indirectly, through credit, account-linking, fill-up, etc. The IMS supports all these options.

Security—The IMS provides rudimentary security against spoofing and provides basic privacy, but doesn't go far enough. Additional authentication measures are necessary if the user tries to access any content or applications that have not been deemed public. Authentication measures will be available such as PIN, password, digital certificates, and securID. Since most phones contain multiple sensors (audio, video, GPS, accelerometers, keyboards, touch-screens, etc.), input from these sources can be used to provide additional authentication measures such as facial, voice, and gesture recognition. Additionally, the pButler can be configured to provide challenge-response authentication (asking for responses only the true user would know the answers to). Some features and functions may only be available at certain authentication "levels".

Non-call interface—"non-calls" are distinguished by a "*" or "#" key in the phone number. These are calls coming in via the PSTN, not the IP networks. As seen in: http://www.ibm.com/developerworks/webservices/library/ws-soaipmultisub1/, the PSTN gateway of the IMS is routed to the CSCF (in the control IMS control plane) which handles SIP registration of the end points and processes SIP signal messaging of the appropriate application server in the service layer. The "*" and "#" key are encoded in the SIP stream (from the PSTN gateway) and decoded and routed via the CSCF. The IMS control layer consists of potentially many components working together, but in presently provided examples, combined operation is clumped together as a single operator.

Non-call servicing—Assuming the caller is not accessing over the IP interface (via computer, smartphone, etc.), but using the phone company interface, the call stream (which has been converted from analog to VoIP via the PSTN gateway) is tagged with various pieces of information using fields in the header registers. These headers are constructed in the pWorld application server and provide a place for additional information to be attached to a digital dialog. Initially, the header information may be sparse, containing only date/time, a dialog identifier, phone number of caller, and perhaps some identifying information associated with the caller (gleaned from database lookups about the phone number). There might also be coordinate (GPS) information also available. If the caller is unknown or has no special significance, the pButler will respond with a default greeting. This greeting may contain options for the caller which have been pre-arranged by the pHome Owner. These might include "leave a message", "hear my auction items", "listen to my new piece of music", "hear my latest tweets", etc. Responses then are collected by the pButler, and the appropriate action is activated. The transaction is then logged (for the pHome Owner), and any special billing operations are performed (say, if the Owner charged for listening to their music).

If the caller is identified as the pHome Owner (by the phone they are calling from—weak authentication), additional options could be made available by the pButler, including an option to strongly authenticate, which could allow even more available features. These options and features would have been set up via a web interface.

Figure 32:
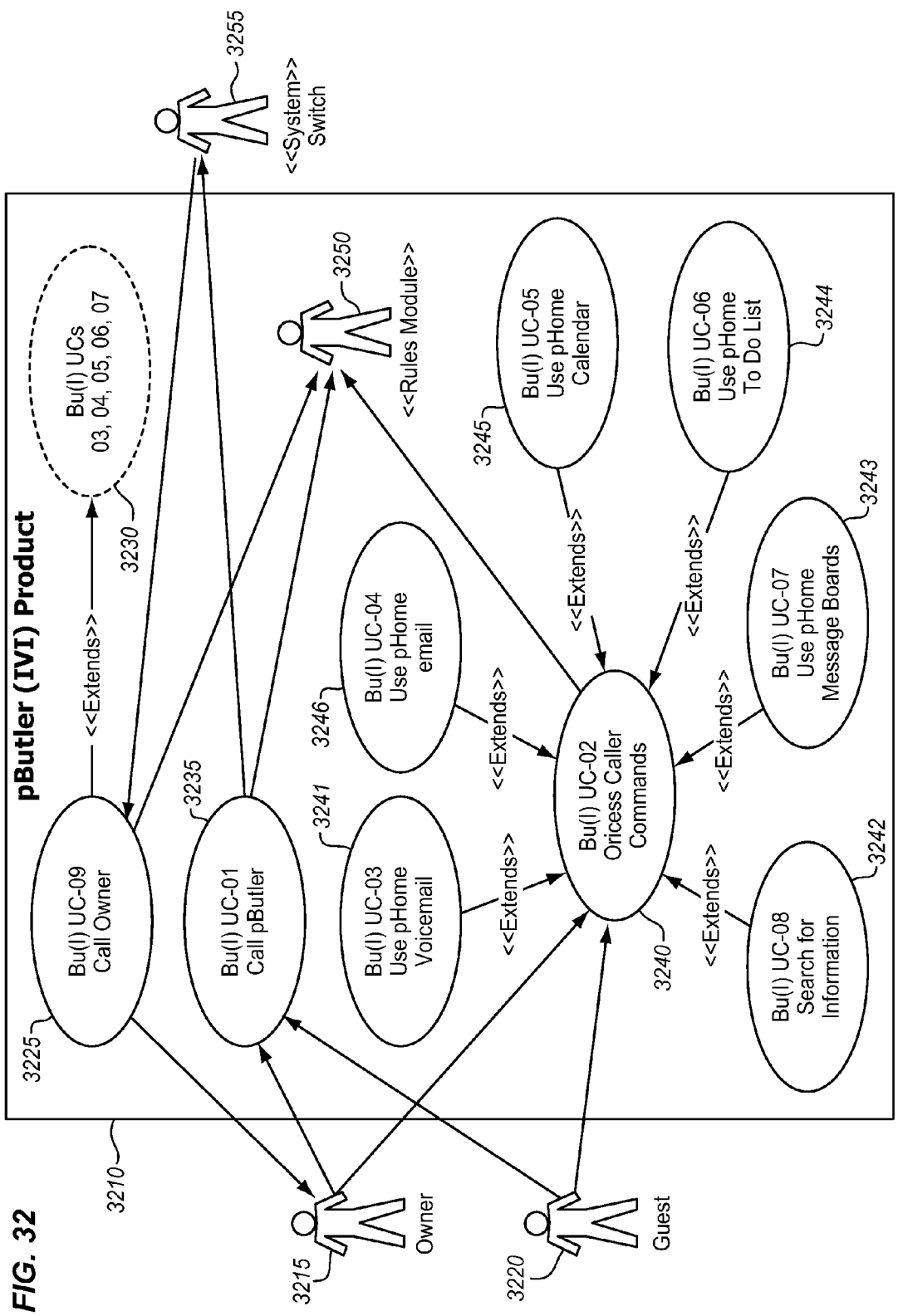
FIG. 32 is a use case diagram for one embodiment of pButler.
Figure 33:
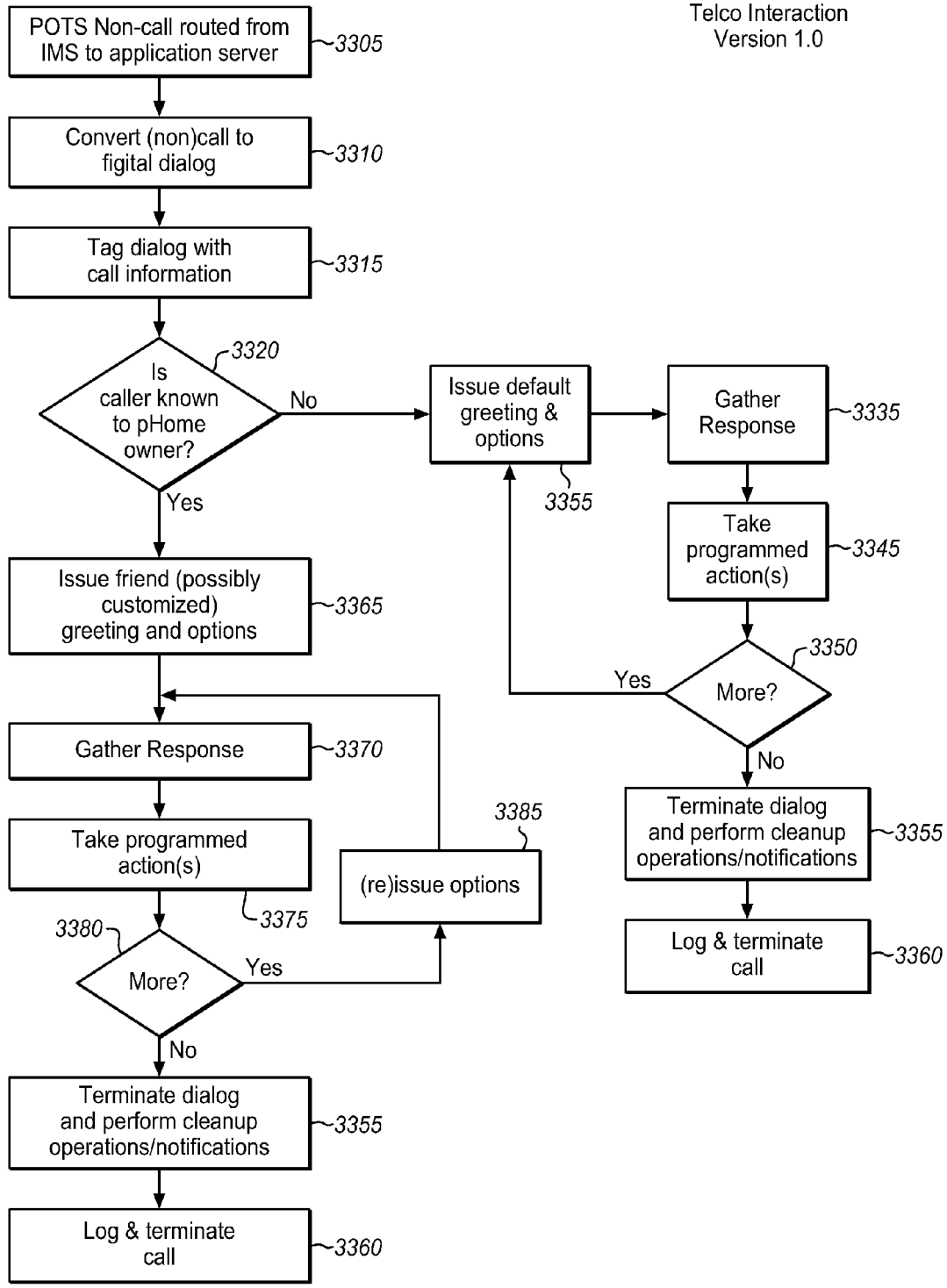
FIG. 33 is a flow chart for one embodiment of routing a non-call.

FIG. 32 shows an example of the flow of interactions with a telecommunication company. A plain old telephone service non-call is routed from the IMS to the application server in step 3205. In step 3210, the non-call is converted to digital dialogue. In step 3215, the digital dialogue is tagged with call information. In decision step 3220, it is determined whether the caller is known to the Owner of the pHome that they are accessing. If not, in step 3225, a default greeting is issued and default options are offered. In step 3235, a response is gathered and then the corresponding action is taken in step 3245 according to the rules of pButler. In decision step 3250, it is determined whether additional actions are required and, if so, flow returns to 3225. If not, in step 3255, the dialog is terminated and cleanup operations are performed. In step 3260, the call is logged and terminated.

If the call is known to the pHome Owner, then a friend greeting is issued and options are offered in step 3265. In some cases, the greeting and options may be extensively customized to the visitor. In step 3270, a response is gathered and then the corresponding action is taken in step 3275 according to the rules of pButler. In decision step 3280, it is determined whether additional actions are required; and in step 3285, options are reissued. If no additional actions are required, in step 3255, the dialog is terminated and cleanup operations are performed. In step 3260, the call is logged and terminated.

These services and options augment the phone companies' abilities and make the phone network more attractive to users, especially since their phones and Internet now have common interfaces.

III. pALERT

Access to the pWorld servers is via a special tier of pAlert servers. These servers act as "firewalls" to eliminate unauthorized access. Access to the pAlert servers may be via dedicated lines, general Internet, etc. Access control can be performed by IP filtering, passwords, X509 certificates, biometrics, and other well-recognized security features.

Once access to the pAlert servers has been established, several pieces of data need to be specified to create an alert. This includes the type and nature of the alert (and may be implicitly defined by the type of access credentials), the geographical area (geofencing) for which the alert is valid (this may also be implicitly defined by access credentials), and any other special demographic data that may be used to more closely refine the target audience of the alert. There are two basic types of alerts: non-optional and optional (opt-in or opt-out).

Once the type/nature and geographic region has been defined, then a general (usually terse) message must be specified. Additional media elements (audio, text, video) may also be made available by the issuer of the alert and targeted to specific geographic areas so that users within specific areas may be provided with additional resources/information.

This information may be entered/uploaded manually, or provided by an API (application programming interface) to the pAlert servers.

Once the alert information has been entered, depending on the type of alert, additional authentication/authorization measures may be required before the alert is actually issued to the pWorld servers (especially true of non-opt-out alerts).

Once the alert has been validated and constructed, the pWorld servers are notified; and, if the alert is optional, then user-preferences are checked to see if users have chosen to "opt-out" of the alert; if so, then no further action is taken for that user. If, however, the alert is of a non-opt-out nature, or the user(s) have chosen to accept the alert (opt-in), then those users within the geographic area are notified via their contact preferences/mechanisms (phone, PDA, pager, etc.). For non opt-out alerts, if cross-company agreements are in place and geolocation information is available (via their cellphone or PDA), then alerts may also be sent to users that are found to be in the geographic areas specified by the alert.

Billing information is maintained by the pAlert and pWorld servers so that the alerting entities are properly billed. If the service is "opt-in", then the user may also be charged a fee (to show up on their phone bill).

Figure 4:
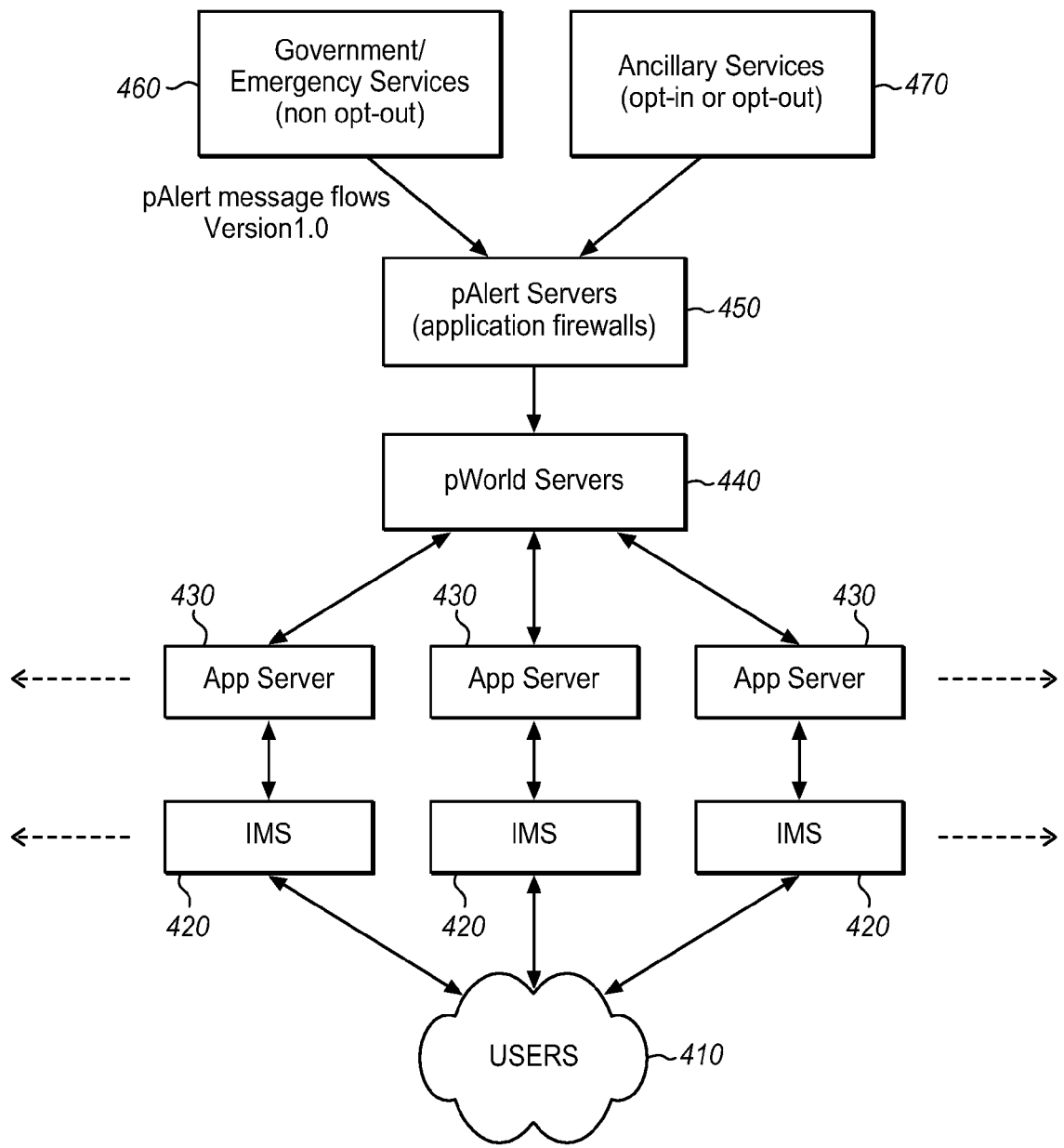
FIG. 4 is one embodiment of message flow in a pAlert system.

FIG. 4 shows one embodiment of message flows in the pAlert system. Government/Emergency Services 460 which are non-opt out and Ancillary Services 470 (opt-in or opt-out) may originate messages and send them to pAlert Servers 450. Ancillary services 470 may include services such as weather reports, traffic reports, etc., that are not vital to survival. The pAlert servers 450 may have application firewalls or other safeguards to ensure only authorized messages are allowed. Messages then proceed to the pWorld Servers 440 where they are stored in various p*Sites such as pHome and pAlert. Users 410 may then access the stored alerts through various IMS 420 and Application Servers 430.

pAlert Types and Natures

As mentioned previously, different types of pAlerts may be of an opt-in, opt-out, or no opt-out nature. Examples of no op-out pAlerts could include emergency notifications for local disasters, criminal activity, or specialized government (local and federal) messages.

Local disasters might involve weather-related phenomenon such as tornadoes, hurricanes, and severe storms. Other examples include warnings about fires, floods, earthquakes, chemical spills, industrial accidents, bio-toxin releases, terrorist activity, and food/water supply contamination. Criminal activity warnings might include "amber alerts", prison escapees, gang activity, robberies, home invasions, and the like. Specialized government messages might include information that is currently mailed (jury duty, court dates, renewal notices, etc.) but is more efficiently and less costly to handle electronically. As newspapers are failing across the country, new methods need to be created for public notices; these might also be handled via pAlerts. From the federal level, critical announcements can be distributed quickly.

Opt-in pAlerts are those which the pWorld user has specifically requested. These might include stock market prices, ticket availability for events, coupons from favorite stores, invitations to special events, notifications of "trigger" activity (an item in a classified ad or auction appears, cruise line price falls below a specific threshold, a friend twitters on a specific topic, auto dealers selling cars 3-for-one, etc.).

General Classes of pAlerts
Critical/Emergency (no opt-in)
Solicited (opt-in)
Unsolicited (can opt-out)

To allow control over solicited and unsolicited pAlerts, it is assumed that each general class has a plethora of subclasses, allowing the user to "drill down" to whatever level-of-detail they desire about pAlerts. The user then can search or specify more or less interest in particular alerts. For example, at the highest level, the user might opt-out of all unsolicited alerts. However, they may choose to "drill-down" and only allow pAlerts from a select group of local grocery stores or restaurants.

pAlert Feedback

One of the unique things about pAlert is the ability to provide feedback to the pAlert provider about whether or not the users have received the notification (or did it simply go-to "voice mail"). Feedback can be gathered from the user about the pAlert and returned to the pAlert provider. This feedback may take several forms: free-form text, a poll response, or even multimedia elements that the users upload, providing status or additional information about the situation they are in.

A. Exemplary System

Figure 11:
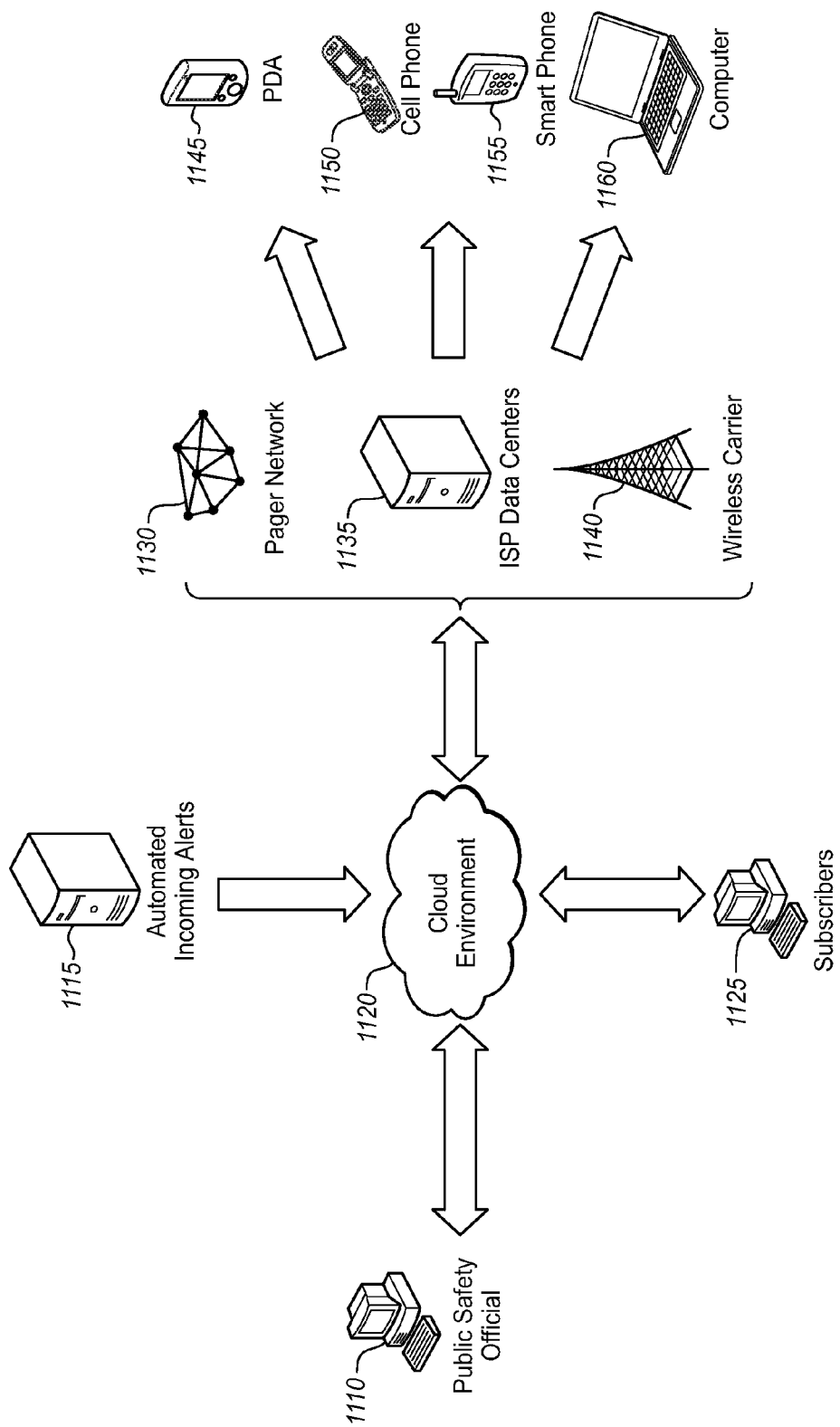
FIG. 11 is a system diagram for one embodiment of an emergency alert system.

FIG. 11 shows a basic system design for the pAlert system (FIG. 2 also shows an embodiment of the pAlert system). The pAlert system is designed to get messages from Public Safety Official 1110, Automated Incoming Alert Server 1115, and subscribers 1125 to PDA 1145, cell phone 1150, smart phone 1155, and computer 1160. Various networks may need to be navigated in order to get messages to all of these devices, such as ISP data centers 1135, pager network 1130, and wireless carrier 1140. Although the embodiment shown primarily targets mobile devices, in other embodiments, PSTN phones, etc., may be included.

Figure 12:
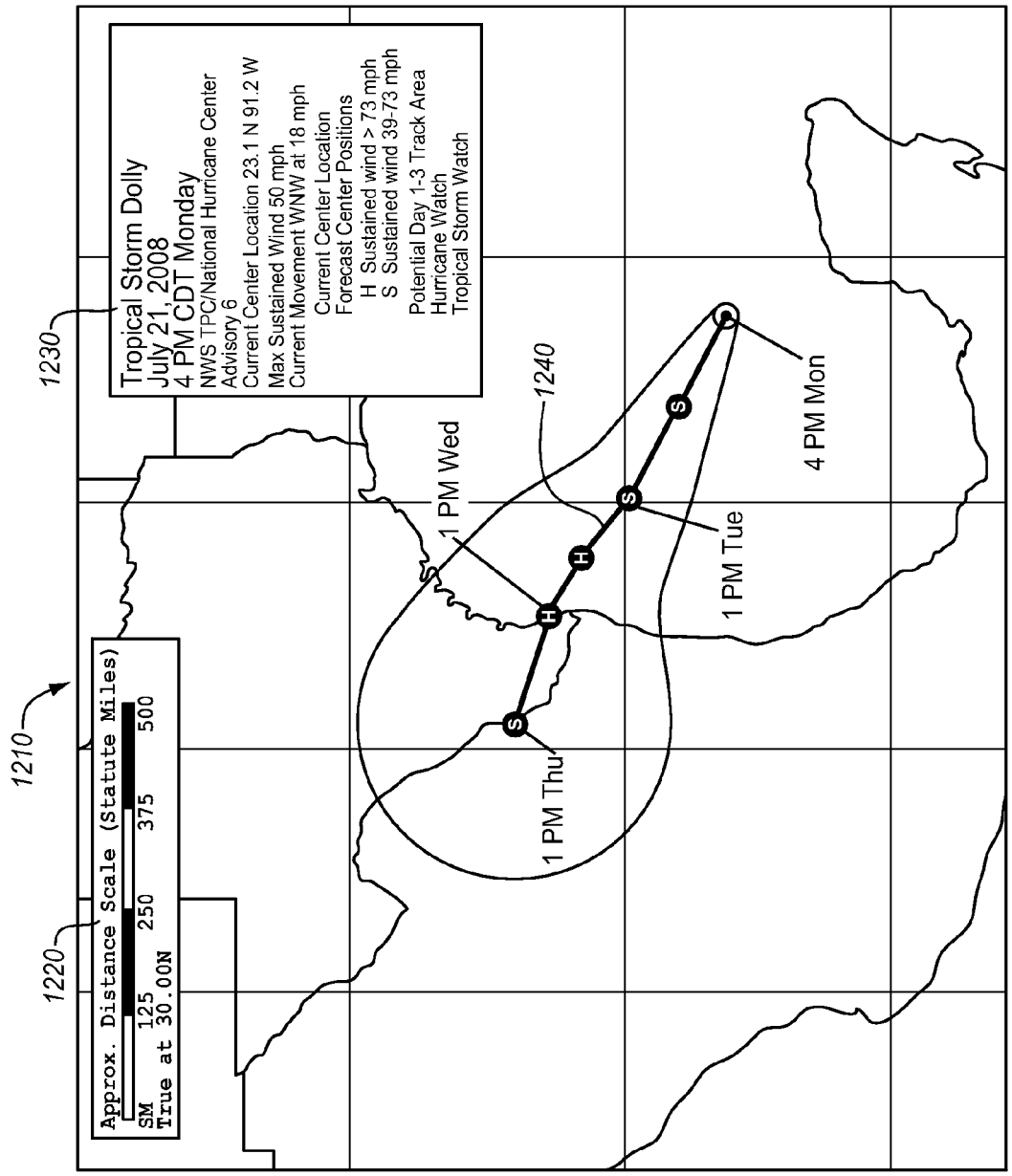
FIG. 12 is a geographical map with a predicted storm path indicated on the map.

FIG. 12 shows an example of a weather event. The information provided on map 1210 and in keys 1220 and 1230 is exemplary of that which is available during weather events. Other non-weather emergencies may be included in the alerts provided by this system. NOAA and the National Weather service may issue such alerts. As is clear from the map 1210, a potential day 1-3 track area 1240 is clearly provided by NOAA. As part of the pAlert system, a geofenced area may be created to match the track area 1240 and then those parties in the track area notified of the approaching storm. In the context of FIG. 11, certain messages may go to wireless customers whose geolocation data shows that they are within the geofenced area of the storm. The geolocation information may be garnered from the pButler system, since the pButler system has access to the pHome and other p*Site information.

Figure 13:
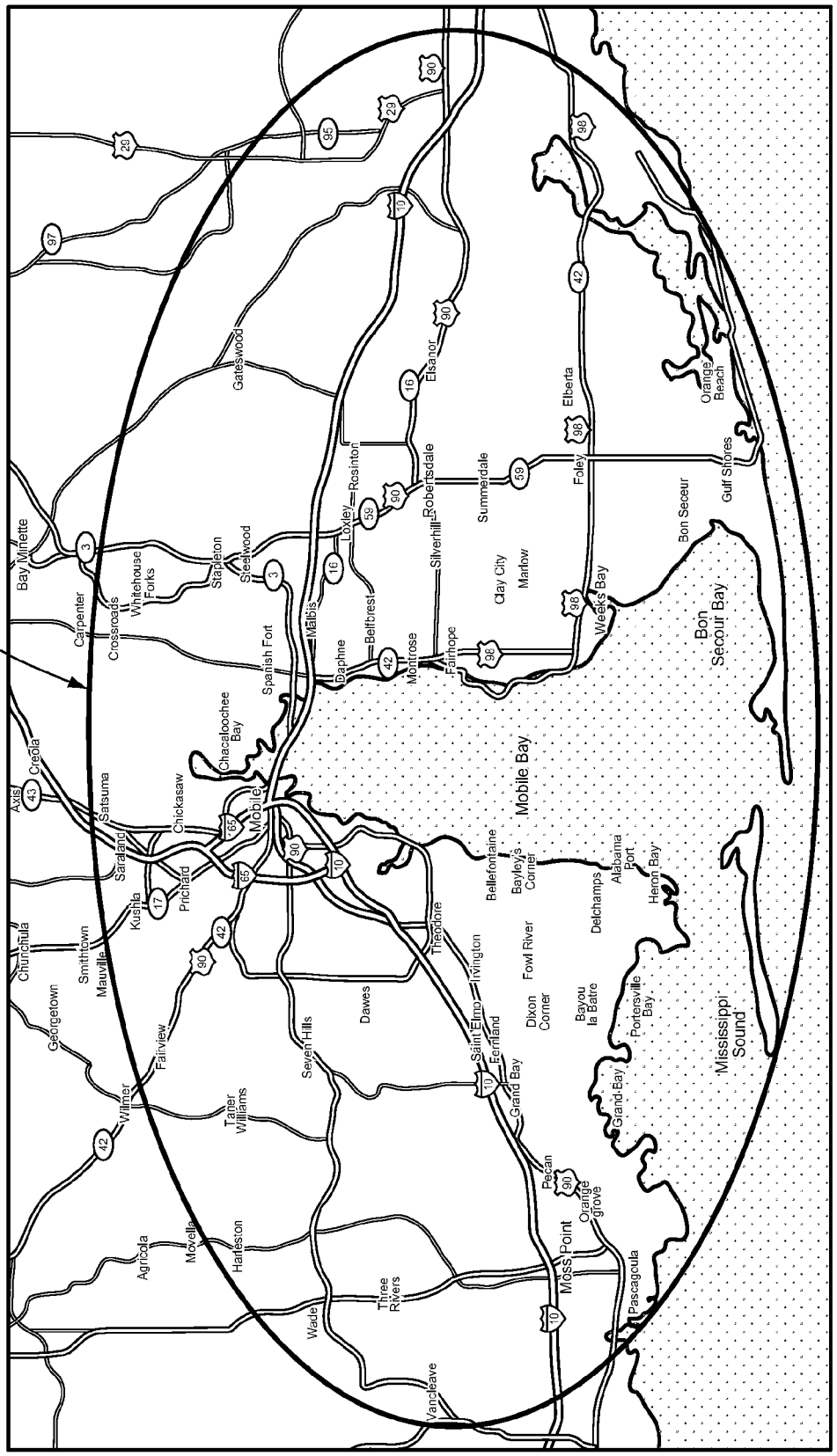
FIG. 13 is a depiction of one embodiment of geofencing an alert.
Figure 14:
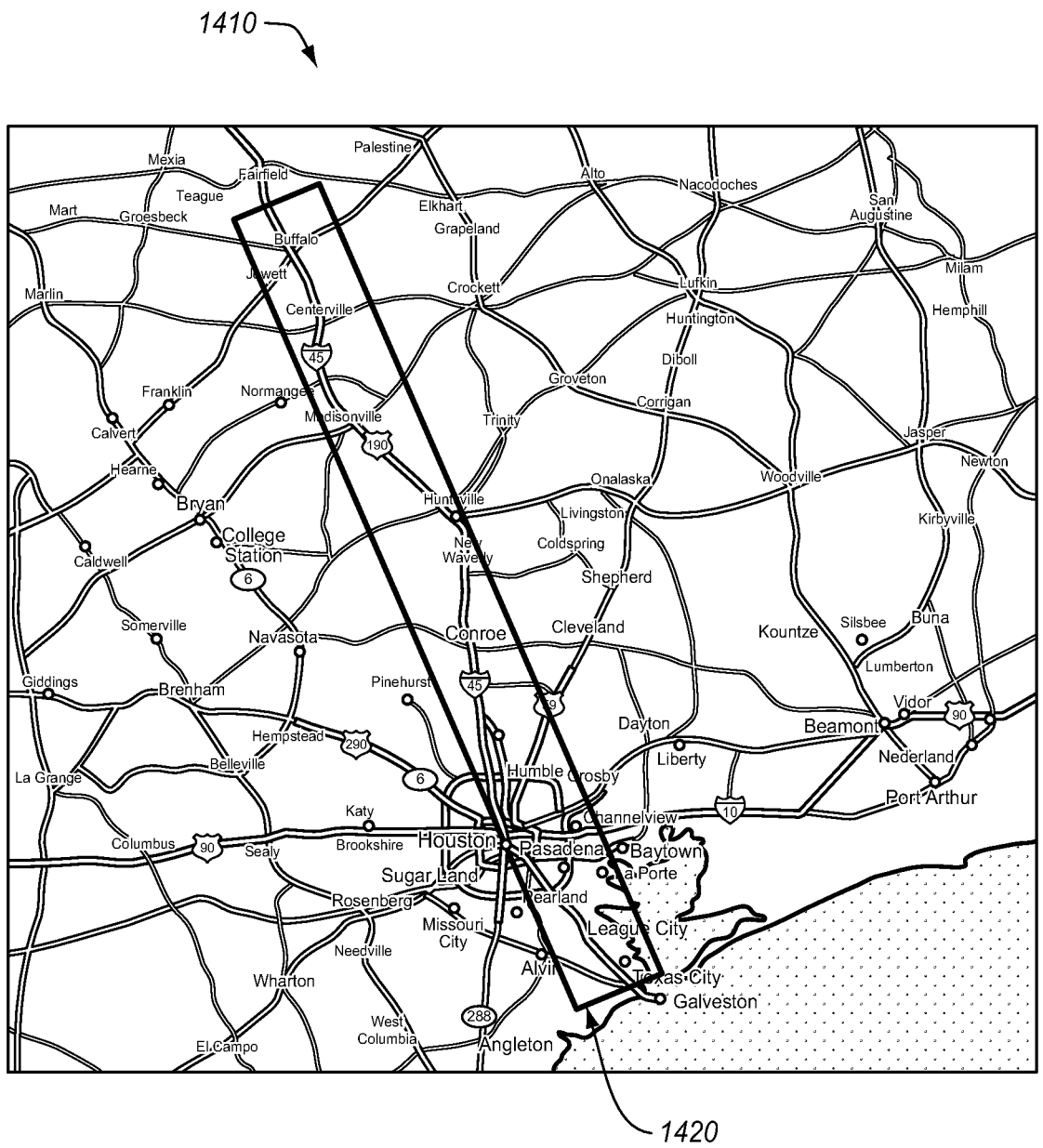
FIG. 14 is a depiction of another embodiment of geofencing an alert.

FIG. 13 shows another map 1310 relating to a storm event. In this case, geofenced area 1320 is depicted as the area of subscribers who will automatically receive storm event warnings. As shown in FIG. 14, pAlerts can take the form of various shapes such as the corridor 1420 shown in map 1410. In this case, the corridor 1420 approximately flows in the direction of a highway, but various and irregular shapes are possible for geofencing. In this case, the pAlert is for an accident on the highway that has been geofenced. Despite being shown as a corridor or rectangle, the pAlert geofenced area could use the shape of the highway as a base and capture all area within some set distance from the highway.

Figure 15:
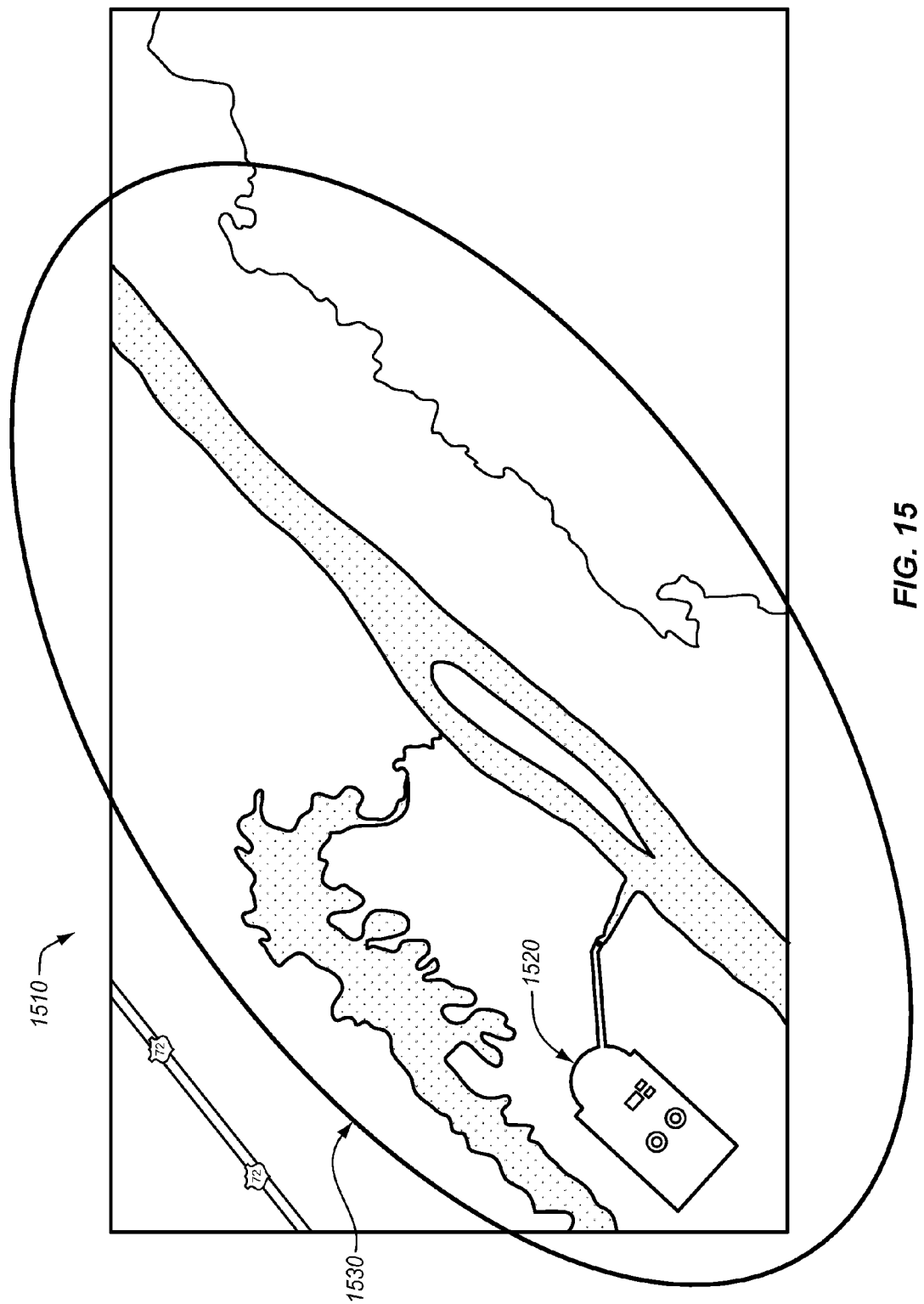
FIG. 15 is a depiction of another embodiment of geofencing an alert.

In FIG. 15, the map 1510 shown has an oval shaped area 1530 geofenced. This area is reflective of the diffusion and flow (due to wind) of airborne contaminates emanating from plant 1520. This type of geofenced area is based on the premise that the geofenced area need not be purely geometric shapes or distances from landmarks, but instead can rely on mathematical analysis in order to determine the area to be geofenced. Further, the area to be geofenced can rely on historical data, cultural norms, preferences, etc. In the case of traffic, those who request traffic information about a certain road can be notified whenever that road experiences traffic.

Figure 16:
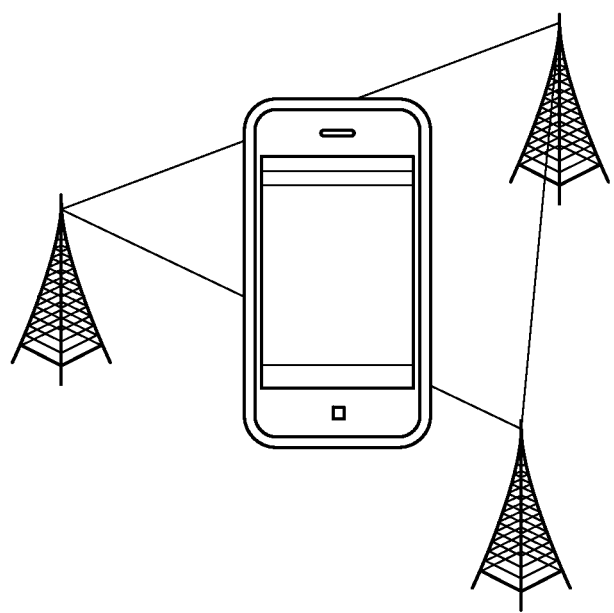
FIG. 16 is a depiction of one embodiment of triangulation.

FIG. 16 shows a wireless device and the determination that the device is in a certain area based on triangulation using wireless towers. Various techniques may be used to determine the location of mobile users, including GPS. Additionally, direction of travel may be determined and destination predicted based on the direction of travel and historical data for the user and the population in general.

Figure 17:
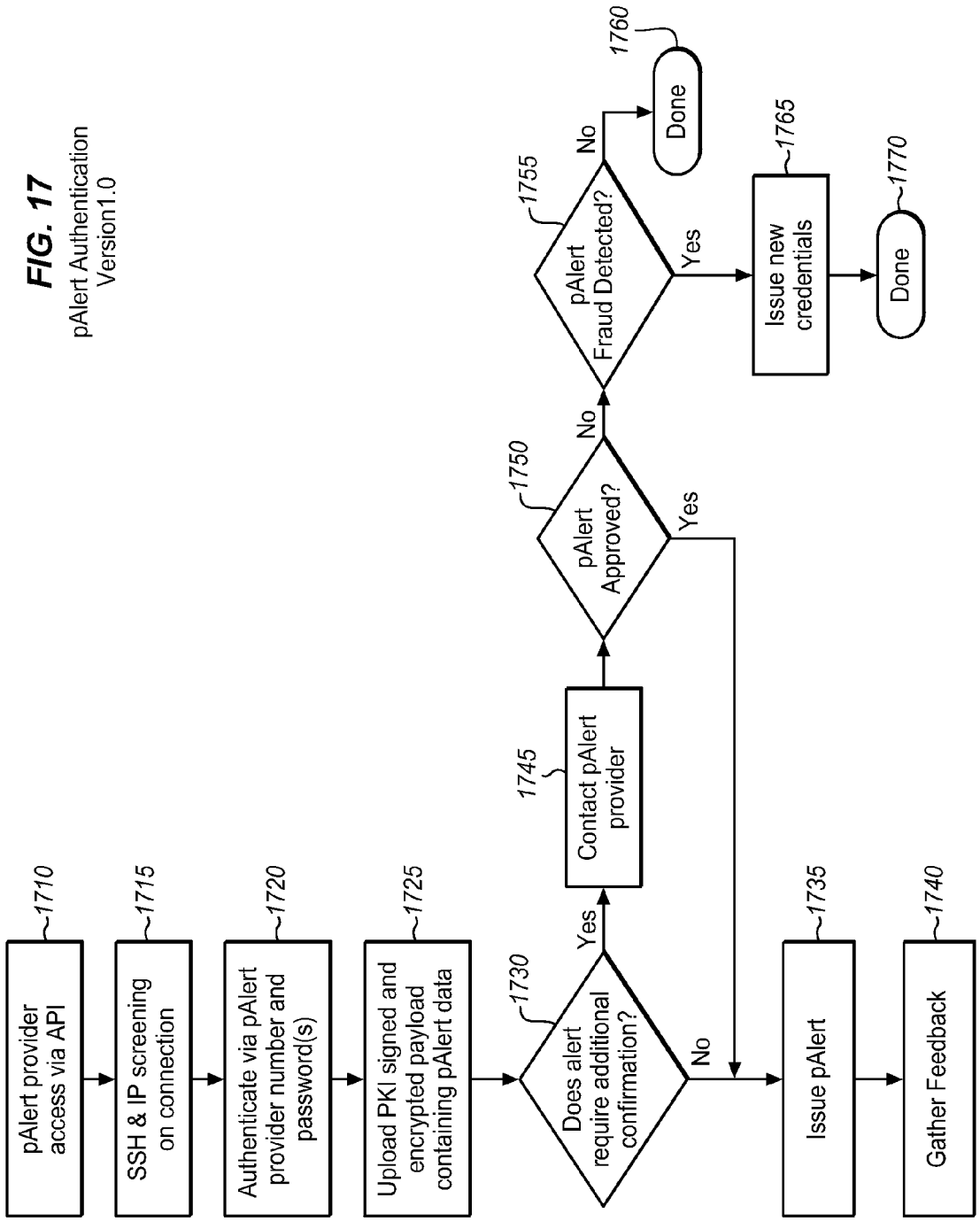
FIG. 17 is a flow chart for one embodiment of pAlert Authentication.

Authentication of messages may be important to the reliability of a pAlert system, since false messages may reduce confidence in the system. FIG. 17 shows an exemplary embodiment of an authentication process. In step 1710, a provider accesses pAlert via an API (application programming interface). In step 1715, an initial authentication occurs using SSH (Secure Shell) and IP (Internet Protocol Screening). In step 1720, the pAlert provider is authenticated via provider number and password. In step 1725, a PKI (private key infrastructure) signed and encrypted payload is uploaded containing the pAlert data. In decision step 1730, if pAlert does not require additional authentication, a pAlert is issued in step 1735. In step 1740, feedback is gathered according to users' reaction to the pAlert. Additional information in relation to the pAlert may be gathered and used to better inform those receiving pAlerts or to direct emergency personnel.

If the alert does require additional authentication, then the flow proceeds to step 1745 and the pAlert provider is contacted. If the pAlert is approved at step 1750 after interaction with the provider, then the flow continues to the previously explained step 1735. If the pAlert is not approved, then in decision step 1755, it is determined whether fraud has been detected. If not, then the flow proceeds to step 1760 and no action is taken. If fraud is detected, then new credentials are issued in step 1765, since the system has been compromised. The process then finishes at step 1770.

Figure 18:
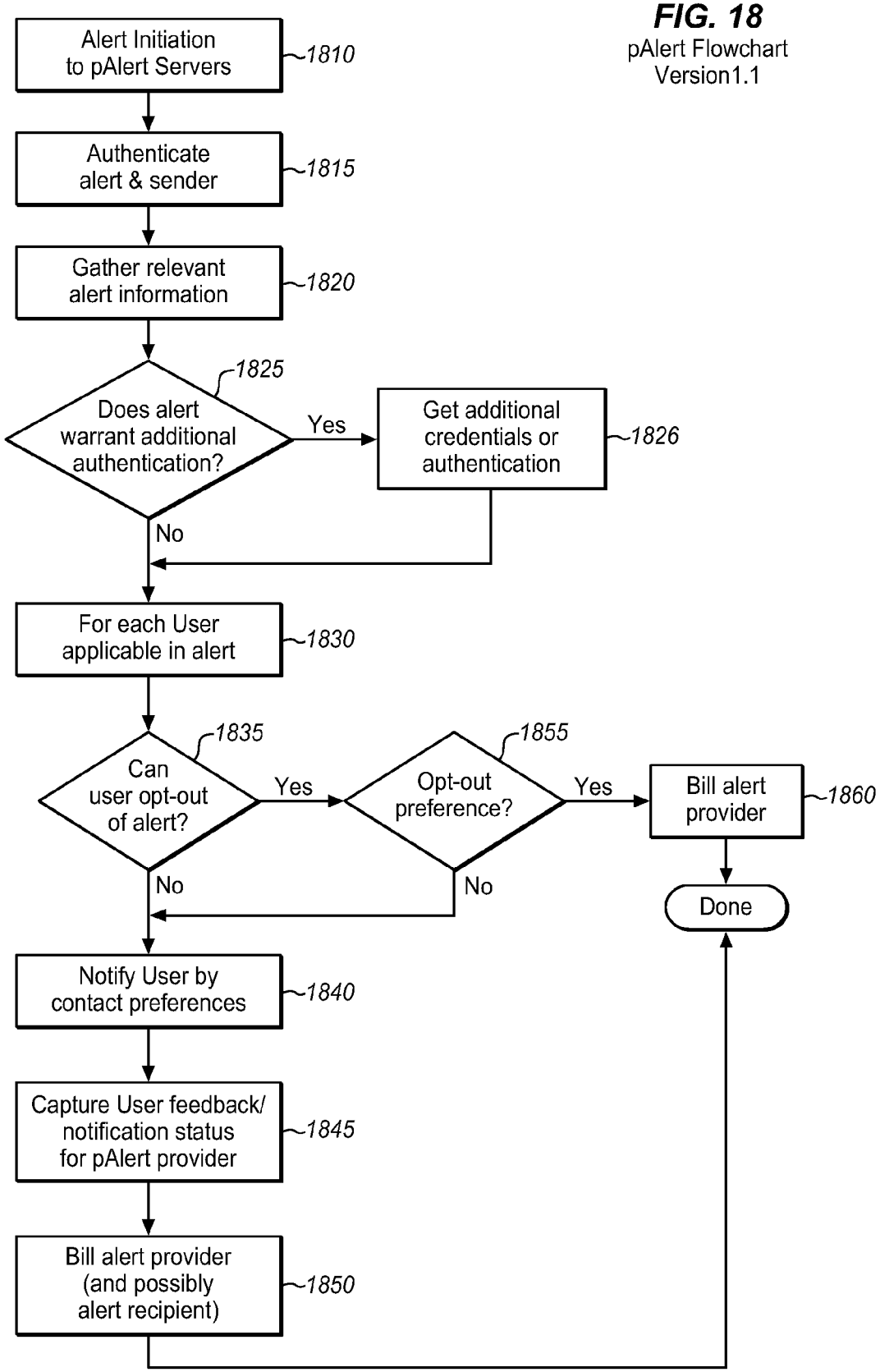
FIG. 18 is a flow chart for one embodiment of pAlert service flow.

FIG. 18 shows an exemplary embodiment of a pAlert process. In step 1810, an alert is initialized at the pAlert servers. In step 1815, the alert is authenticated and sent on. In step 1820, relevant information relating to the pAlert is gathered. The relevant information may relate to numerous factors, including historical data relating to pAlerts or previous disasters in the area of the alert. In step 1825, it is determined whether the alert warrants additional authentication. If yes, in step 1826, the additional authentication is requested. When additional authentication is received (or if no additional authentication is needed), the flow continues to step 1830. The alert process is determined for each applicable user. In step 1835, it is determined whether the user can opt out of the alert. Certain alerts, such as those for natural disasters, may not be opted out of. The opt-out process is ordinarily handled by the pButler system. In step 1855, the user's opt out preference is checked; and if the user opts out, then the alert provider may be billed in step 1860. Not all alert providers must be billed for providing a pAlert.

If the user cannot opt out of the alert or chooses not to, then in step 1840, the user is notified of the alert according to the user contact preferences. In step 1845, user feedback is captured concerning whether the pAlert was received or retrieved by the user. In step 1850, the pAlert provider is billed.

IV. Applications and Content

A. pHome

A user's online home may become his entry point for managing many aspects of the user's life including, but not limited to, social, financial, family, scheduling, etc. With the inclusion of the related pWork and pEducation, the p*System may provide the user with that contact point.

Figure 19:
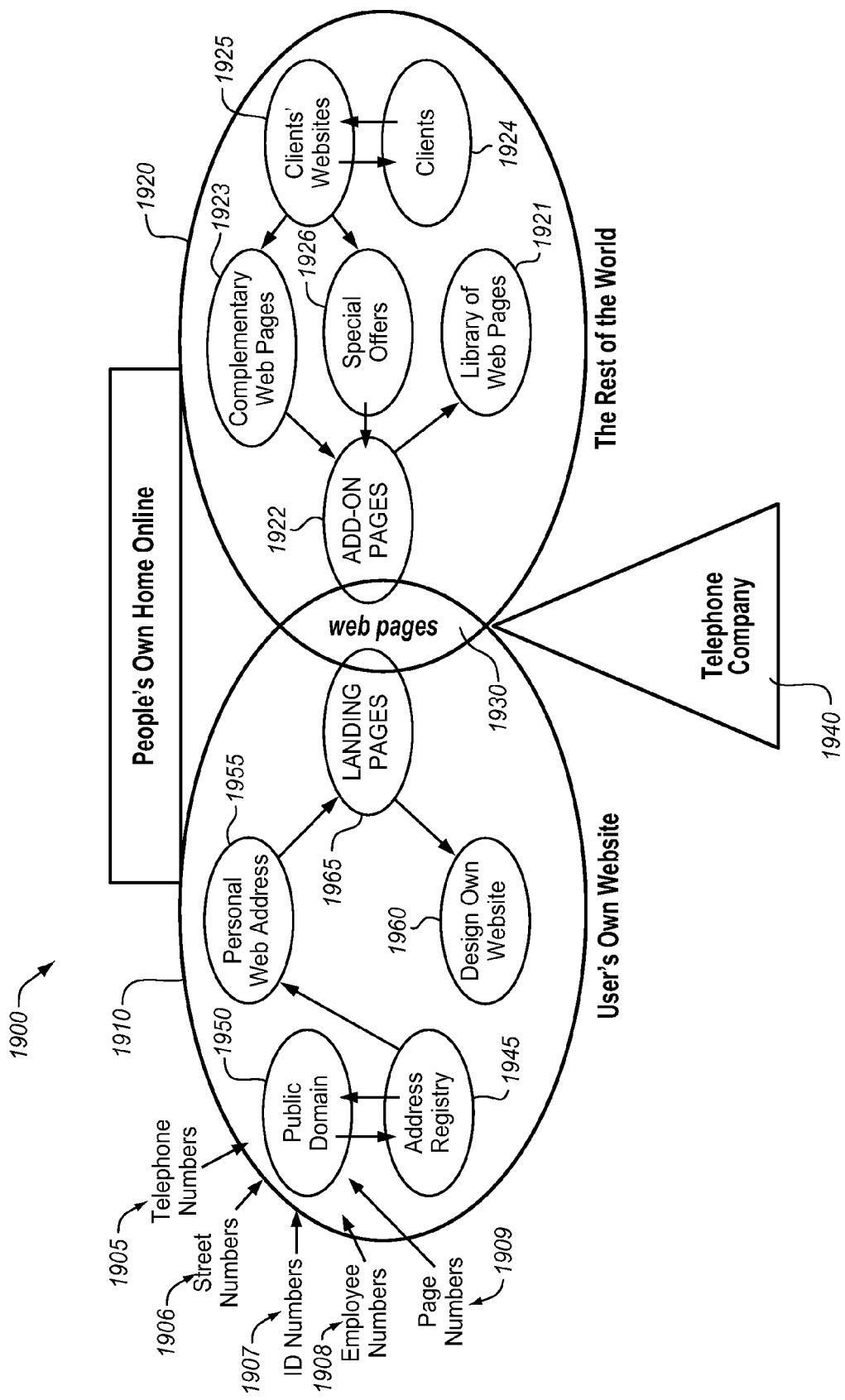
FIG. 19 is a depiction of one embodiment of an online home.

FIG. 19 shows an example of an online home. The online home 1900 includes the user's website 1910 as the interaction point and the rest of the world 1920. The web 1930 is the point of intersection between the user's website and the rest of the world. The telephone company 1940 can support this interaction by providing pHome websites and interaction through PSTN lines and voice calls as well as the Internet.

The user's websit1 1910 includes a variety of identification numbers including, but not limited to, telephone numbers 1905, street numbers 1906, ID numbers 1907, employee numbers 1908, page numbers 1909, etc. All of these items are identifying information about the user that is easily remembered for easy access to the user. All of these numbers and other identifying information may be used to create various p*Websites. The public domain information 1950 is registered at address registry 1945. Some of those addresses are converted into personal web addresses 1955. These become landing pages 1965, a portion of which are available over the web 1930 to visitors. The user may design their own website at website design module 1960.

The rest of the world 1920 contains various add-on pages 1922 that may be accessed via the web 1930. Complementary web pages 1923, special officer 1926, and the library of web pages 1921 may feed into the pages that become add-on pages 1922, as well as clients 1924 may visit clients' websites 1925.

The Owner's Experience

Essential to creating the sense of pride and control is the ability to personalize (control) the home. Essential to personalization is ease of use. The pHome product delivers a virtual home owned and personalized by its Owner.

Ironically, the pHome provides an easy method of defining and controlling aspects of our real lives, such as a to-do list or calendar appointments. The pHome lifestyle is the synthesis of real life and fantasy that enables the Owner to be organized, efficient, and better informed about social and commercial activities of interest to the Owner.

Figure 20:
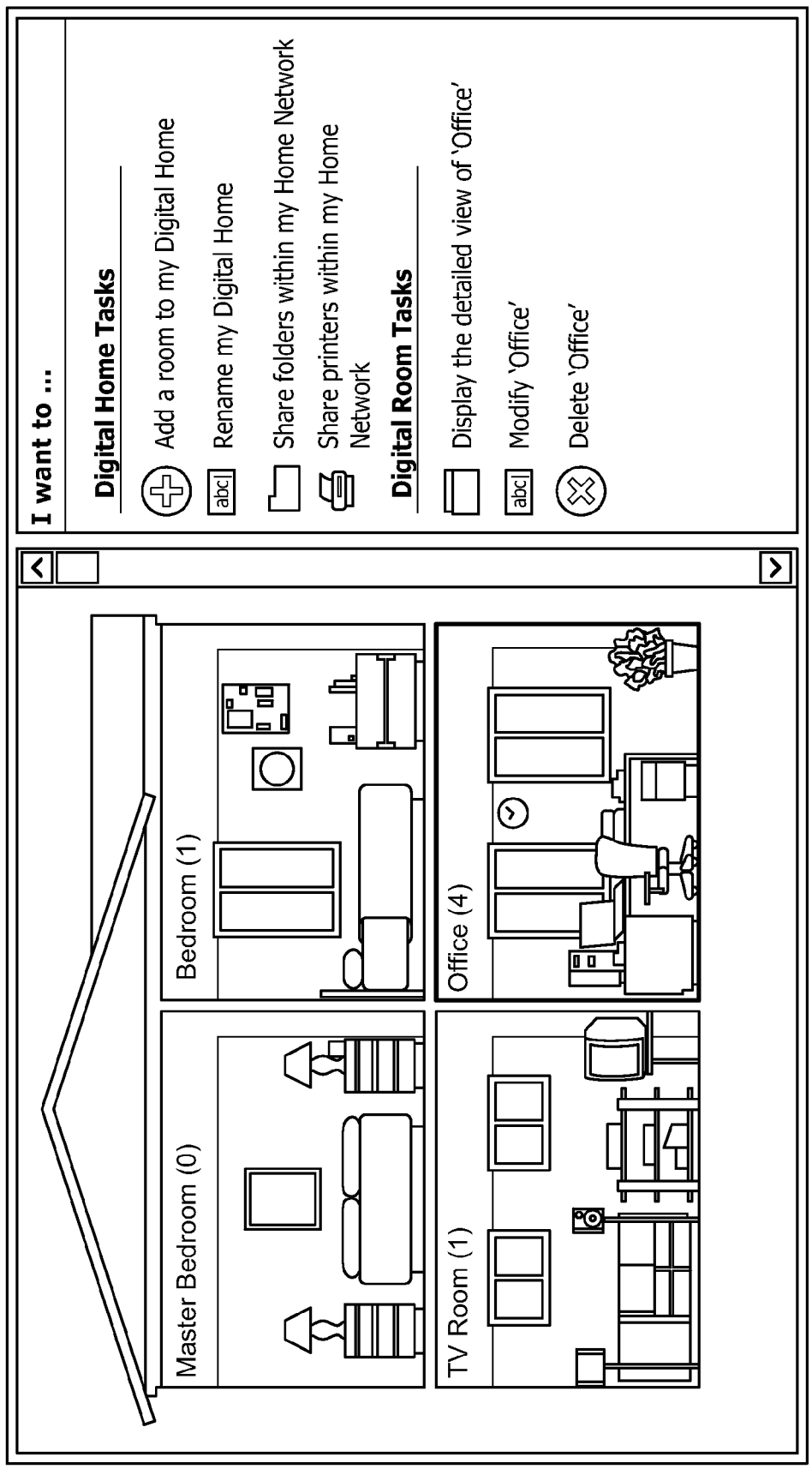
FIG. 20 is a graphical depiction of one embodiment of a pHome interface.

FIG. 20 shows an example of a pHome interface. As is shown in FIG. 20, the house is made up of a number of rooms. The user may perform a number of actions such as adding or naming rooms, sharing folders or printers in the user's home network, or perform a number of tasks within a room.

Figure 21:
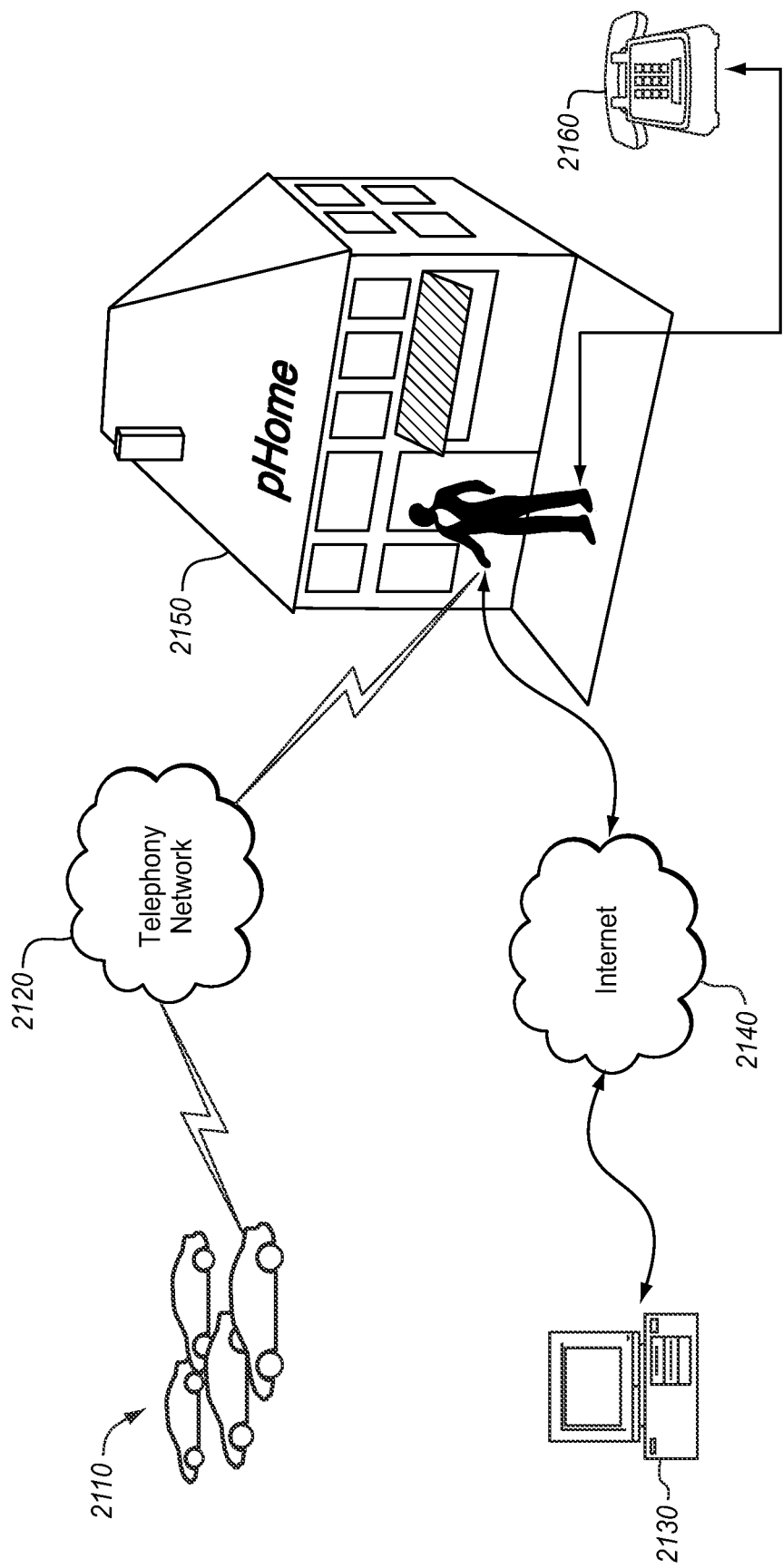
FIG. 21 is a system diagram of one embodiment of pHome.

FIG. 21 shows some of the various ways pHome may be accessed. The primary access points of a user are the mobile phone, a computer, and a PSTN telephone. As shown, a user in traffic 2110 may utilize his cell phone to contact pHome 2150 through telephony network 2120. Further, a user may utilize a computer or other Internet-capable device to access pHome 2150 through Internet 2140. Finally, a user may use a PSTN phone 2160 to access pHome 2150. In all of these cases, the pButler is there to greet the user.

Figure 22:
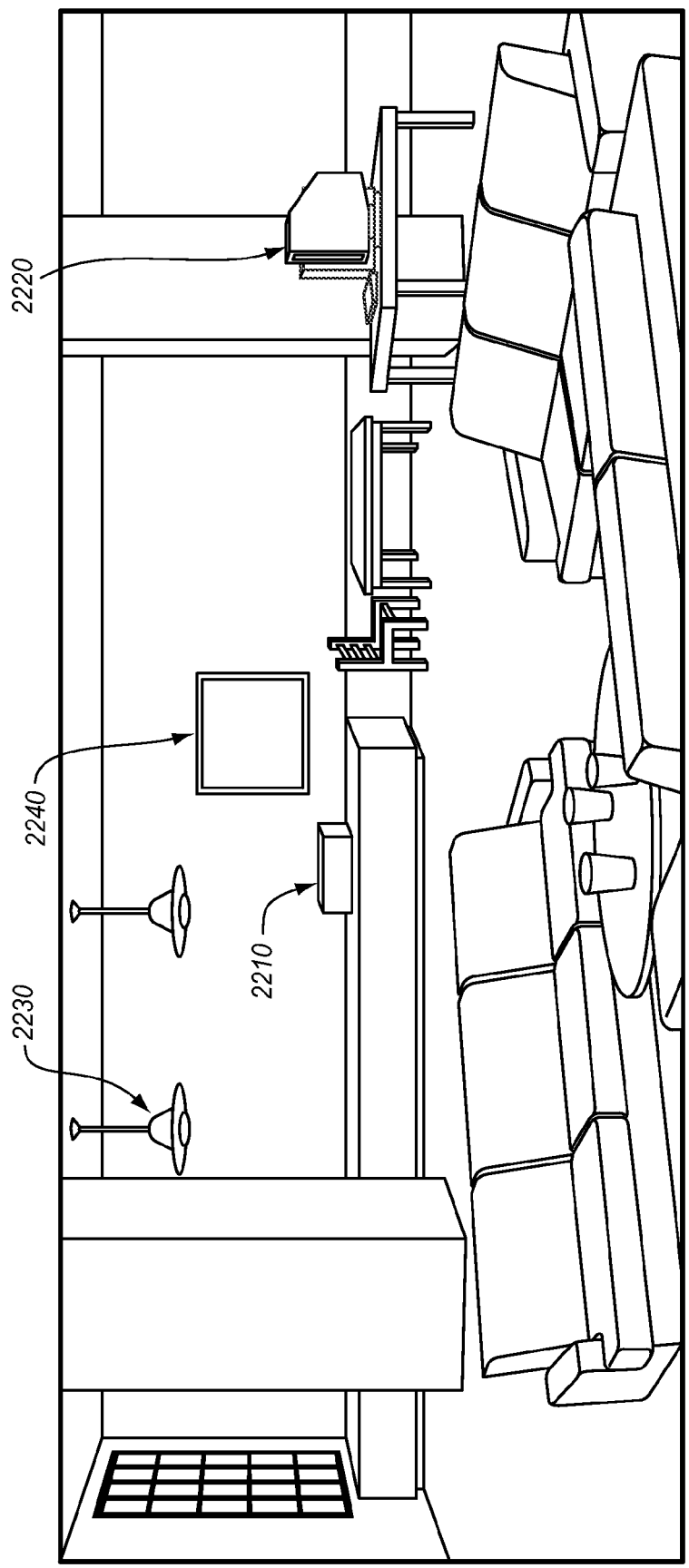
FIG. 22 is a graphical depiction of another embodiment of a pHome interface.
Figure 23:
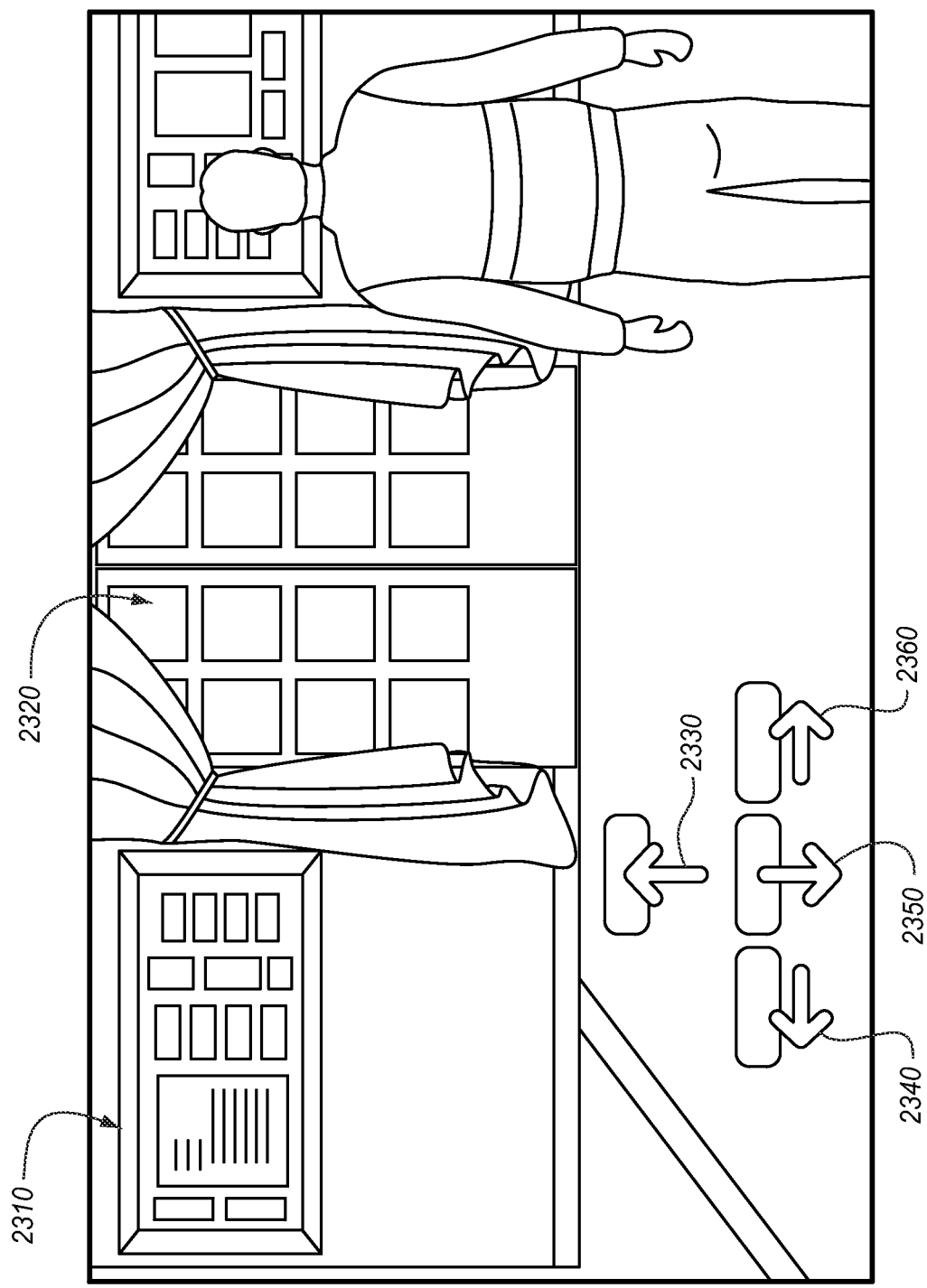
FIG. 23 is a graphical depiction of another embodiment of a pHome interface.

FIGS. 22 and 23 show an alternative embodiment of a pHome space. In addition to the two dimensional representation depicted in FIG. 20, the pHome space may be presented in a three-dimensional representation. Each room may present a variety of features to the user. For instance, the kitchen may have recipes stored, message boards, and family calendar. The den may have to-do-lists, work contacts, and newsfeeds. As shown in FIG. 22, the lighting gadget 2230 may control the lighting in the house. The computer gadget 2220 may allow access to email, calendar, and preferences. The radio gadget 2210 may control music in the home or elsewhere. The video screen gadget 2240 may provide for messaging features, video calling, etc.

Figure 24:
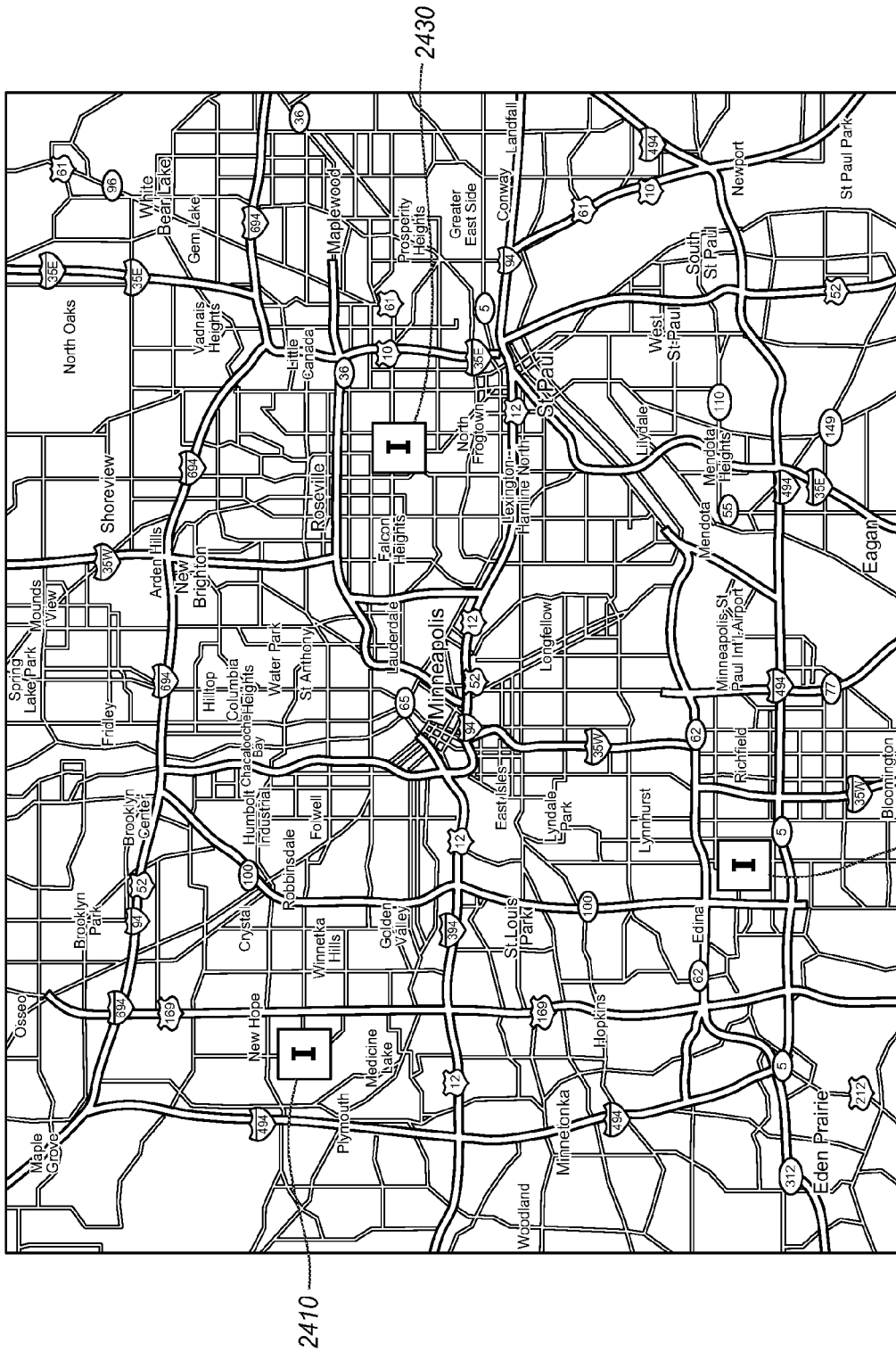
FIG. 24 is one embodiment of geolocation on a map.

In FIG. 23, a depiction of the user is shown in the room. The forger in this example contains a message board 2310 that can provide alerts, messages from family, and opt-in advertisements. The exit 2320 may server either simply as a way to leave the pHome, or as a gateway to the pHomes of others or other accessible sites. The message board 2310 may also contain location information for family members or others who have authorized the tracking and reporting of their location. Navigation buttons 2330, 2340, 2350, 2360 are used to rotate the user's view and navigate around the pHome. In FIG. 24, an example of a map showing the geolocation of a family member is shown. Infobox, 2410, 2420, and 2430 all represent the geolocation of family members. This geolocation data may be based on a reported location of the user by the user, a GPS-determined location based on the user's wireless phone or device, or a triangulated version based on triangulation using cell phone towers, and any other methodology used to determine location of a user. Additional information may be available about the family member (or other individual) including the name and activity of the place they are visiting, how long they have been there, whether they are answering calls, etc.

pHome may also include the ability to offer items for sale through the public view of the pHome. This public view may be indexed so that it is easily searchable and accessible. pHome may also include lighting changes base on the time of day and a pButler having a digital corporeal embodiment.

Figure 25:
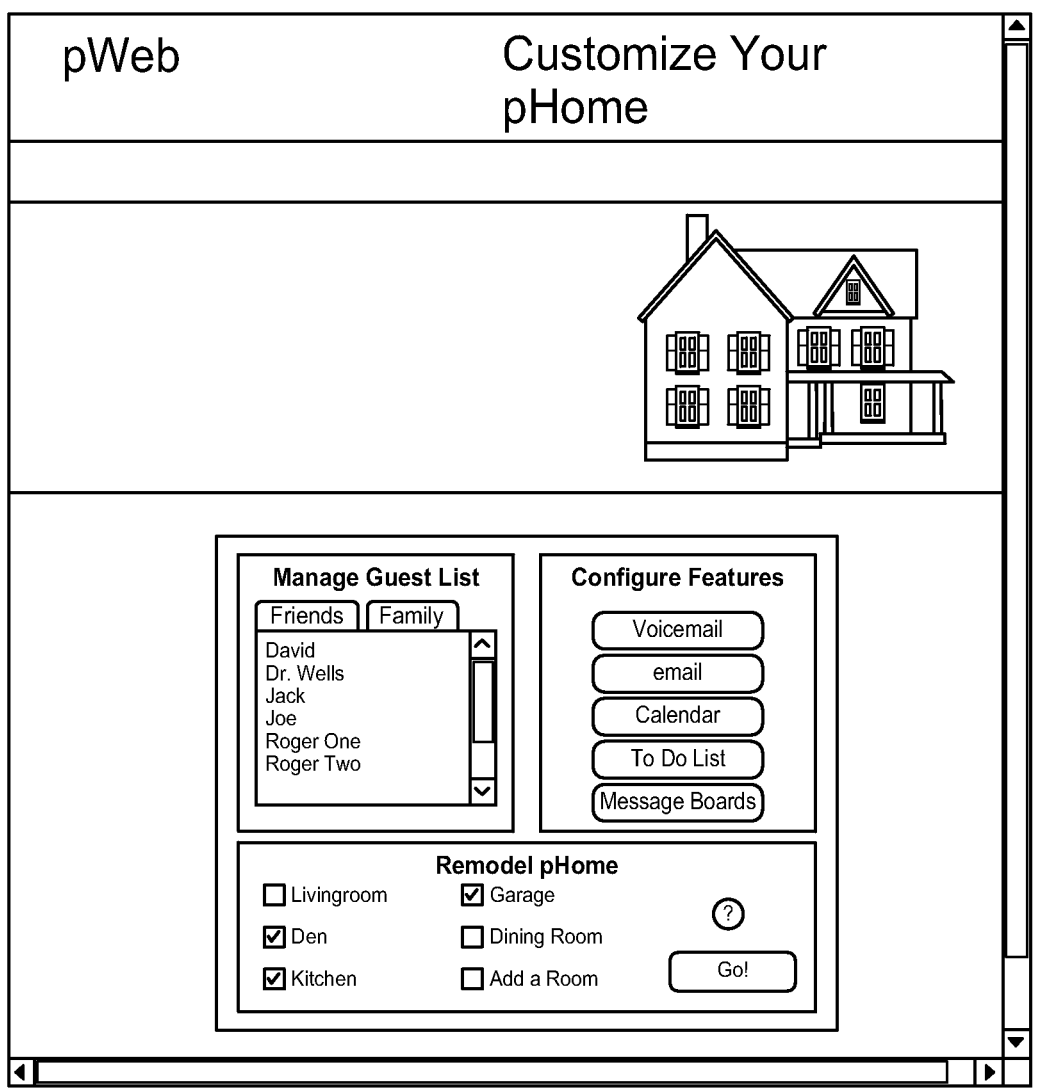
FIG. 25 is a graphical depiction of another embodiment of a pHome interface.

FIG. 25 shows an interface for customization of a user's pHome. For instance, as shown, the user can manage the guest list and access privileges for the guests. The user may configure voicemail, email, calendar, to-do list, message boards, and may remodel portions of the home.

Figure 26:
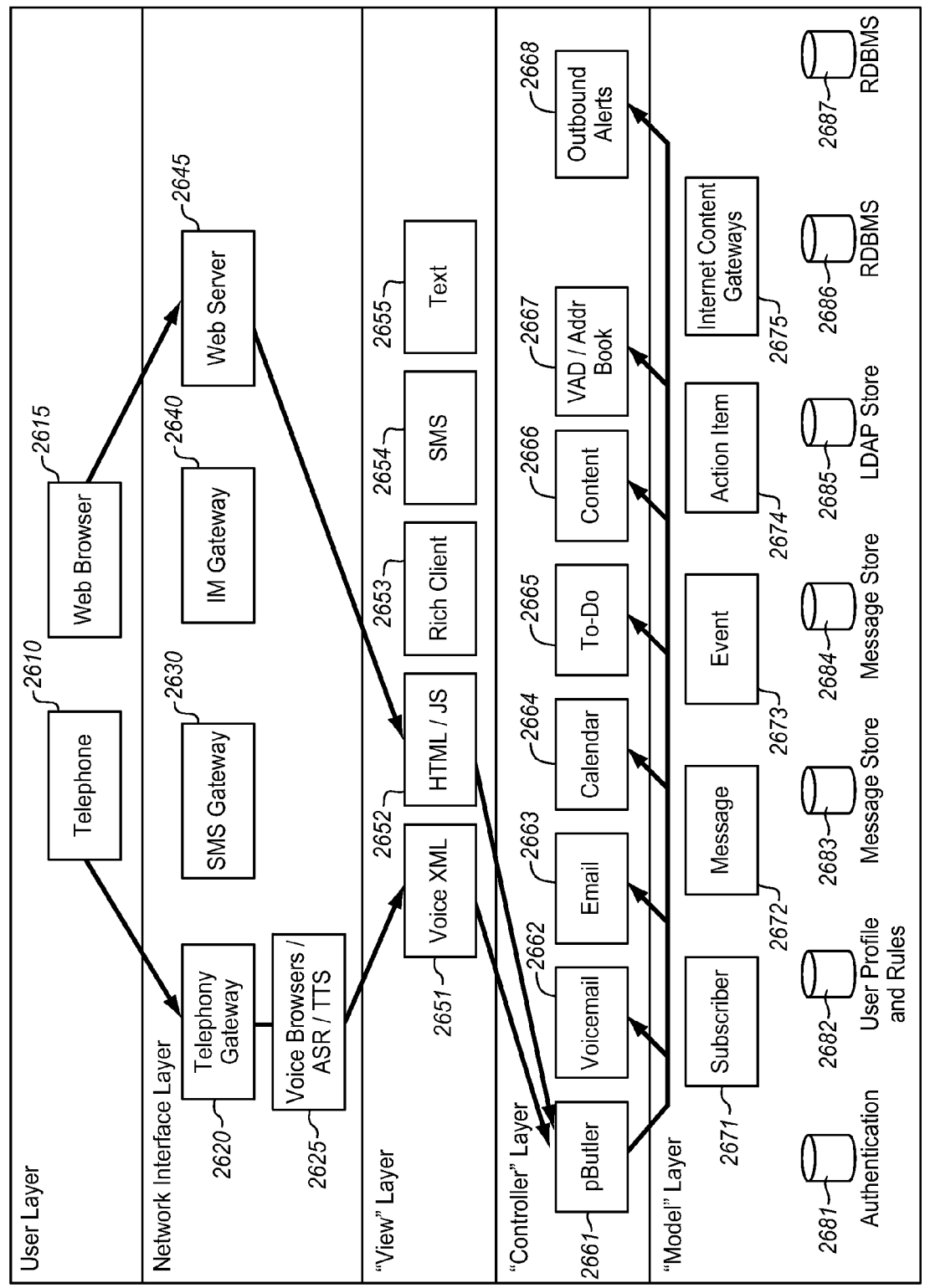
FIG. 26 is a layer diagram of one embodiment of pHome.

FIG. 26 provides an overview of how the pHome system works. Two of the primary modes of connecting to pHome are through either a telephone 2610, which provides a voice interface, or through a web browser 2615. In alternate embodiments, other contact points and networks are possible, such as cable TV with set top box, etc. (see above). From telephone 2610, a message from the user is passed to telephony gateway 2620 and then to the Voice Browser/ASR (Automatic Speech Recognition)/TTS (Text To Speech) 2625. Then VoiceXML module 2651 provides standardization for interactivity with pBulter 2661 and provides the interface language. pButler is the main contact point for all interactivity of the system. On the web browser side, requests from Web Browser 2615 travel to web server 2645 which are handled by a HTML/JS (javascript) module which provides interactivity and interface language. Requests then are routed to pBulter 2661 where they may be resolved.

pButler 2661 allows access to voicemail 2662, email 2663, calendar 2664, To-Do List 2665, content 2666, Virtual Address book 2667, and outbound alerts 2668. Request to pBulter are processed through the model layer which contains system resources and information. The various modules are in the model layer provided for generalizations and activities. Models (objects) are provided for the subscriber 2671, a message 2672, events 2673, action items 2674, and Internet Content Gateways 2675. Various modules are provided for performing tasks, those modules including: authentication 2681, user profile and rules 2682, message store 2683, 2684, Lightweight Directory Access Protocol 2685, relational database management system 2686, and scheduling 2687.

Figure 27:
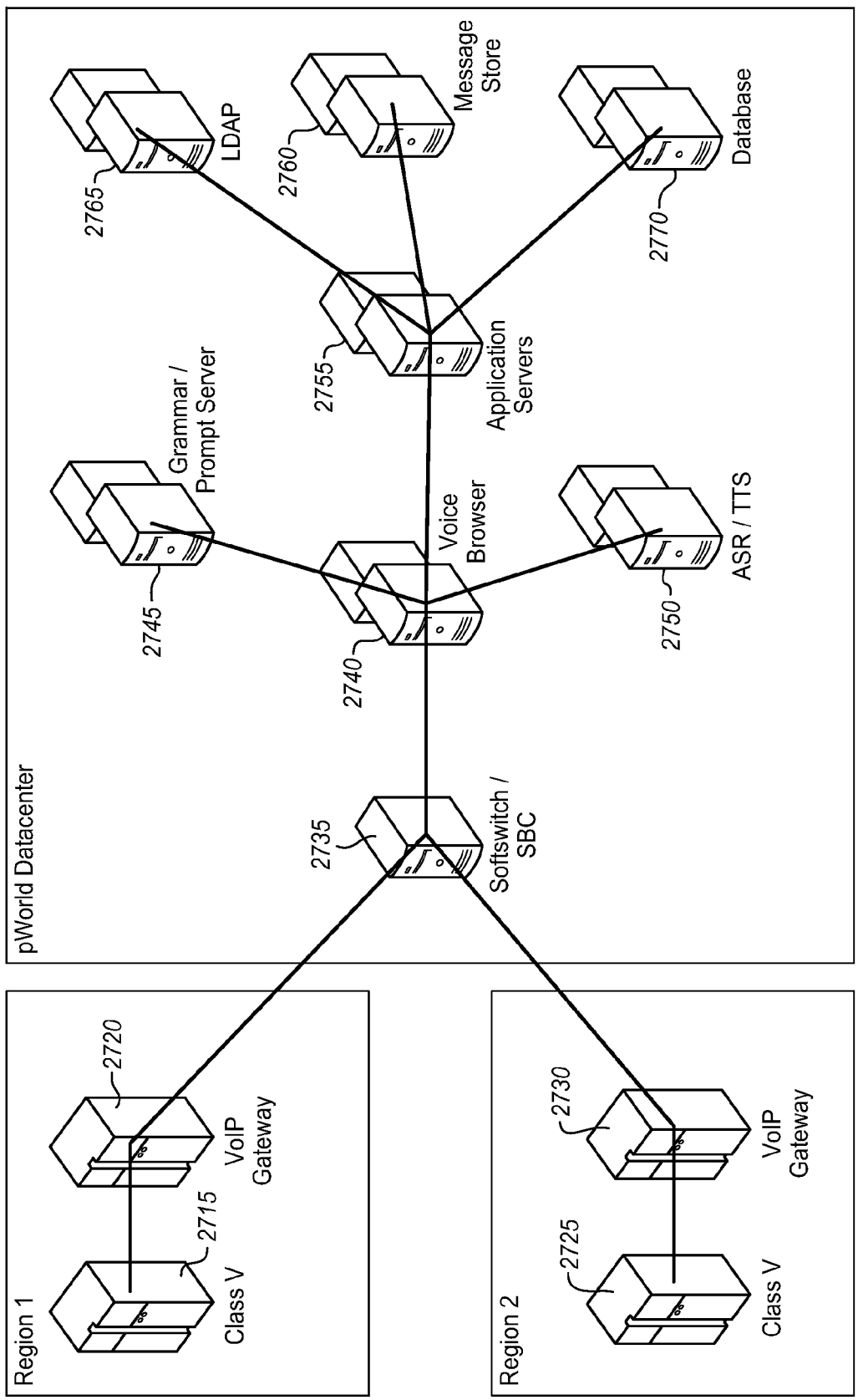
FIG. 27 is a system diagram of one embodiment of pHome.

FIG. 27 shows additional detail about the structure of a pWorld system. Users may access the system via class 5 switches 2725, 2715 (a telephone switch or exchange located at the local telephone company's central office, directly serving subscribers) and then via VoIP Gateways 2720, 2730.

Non-calls then are routed (via the Internet) to Softswitch/Session Border Controller 2735. A Voice Browser 2740 provides an interface for the user and utilizes Grammar/Prompt Server 2745 and Automatic Speech Recognition/Text To Speech server 2750 to process language and provide understandable responses. The application servers 2755 provide the actual interactivity through voice browser 2740 and may rely on additional servers for interactivity, including Lightweight Directory Access Protocol 2765, Message Store 2760, and database 2770.

Building and Remodeling

The pHome Owner constructs, furnishes, maintains, and remodels their pHome. The Owner can build rooms that mirror real rooms such as kitchen, living rooms, utility rooms, garage, home office, etc. The Owner furnishes each room with usable personal objects such as message boards, telephones, desks (with tools such as calendars and to-do lists).

Habitation

Once the pHome is set up, the Owner uses the personal objects and tools in each room. Thus, the Owner can pay bills, communicate with family, or create a honey-do list in pHome.

The Owner can even command their trusted, ever-attentive, always-available servant, pButler(web) to accomplish tasks.

Entertaining Guests (Private Social Networking)

Because the Owner can entertain in their pHome, it is the next generation of social networking: private social networking. The Owner can formally invite Guests or allow them access to unsecure rooms on an ad hoc basis. pHome establishes a single point of contact for those who want to get in touch with us. It represents a new dimension of social networking that provides a more personal experience than "Facebook" and "MySpace". pHome serves as a communications center for friends and family to send and receive messages in voice, video, or text format.

pHome Guests are greeted and guided through the home by the Owner's pButler(web).

Commercial Networking

On an opt-in basis, the pHome Owner can allow online and brick-and-mortar merchants belonging to pWorld to post coupons in specific rooms based on predefined Owner interests. In addition to coupons, the Owner may elect to receive targeted text or video advertising. The Owner predefines the characteristics of the desired text and video advertising, eliminating junk mail or spam. In one example a Fridge interface may be included. The Fridge interface keeps track of the items used and identifies when items need to be reordered or adds them to a shopping list.

Access to pHome

There are several methods for Owners and Guests to enter the pHome. Each of the following access methods features Owner-defined security:

- Online access via computers—Owners and Guests may use a PC and a browser to access pHome as they would any website. This access method will provide the richest visual experience for those entering pHome.
- Online access via handheld devices—Owners and Guests may use a handheld device with a graphic display to access pHome. This access method will provide a minimalist visual experience for those entering pHome.
- Voice access via telephony devices—Owners and Guests may use voice-enabled devices to access pHome. This access method allows Owners and Guests to use pHome features and access pHome information by directing the Owner's trusted assistant pButler via voice commands.

Product Consumers (Users, Actors)

This section identifies the types of people and systems that use the product and the reason they use the product and reason for usage. This section establishes the relative priority of each user type.

| User Type | Reason |
| --- | --- |
| Owner | A person subscribing to the pHome service - the "Owner" of the pHome. |
| Trusted Guests | Family, friends and business associates who have greater visitation rights. |
| Guest | Visitor to the Owner's virtual home |
| Merchants | Send the Owner targeted alerts when the Owner opts in to a pHome sponsored advertising program. |

Competitive Analysis

The competitive analysis is a comparative evaluation of existing products, indicating the competitions' strengths and weaknesses. The competitive analysis identifies attributes of the proposed product that overcome competitor's strengths or exploits the competitions' weaknesses.

| Competition | Strengths or Weaknesses | Comparative Analysis |
| --- | --- | --- |
| 3D Social Networks (LivelyGoogle, SecondLife, etc.) | Strengths: Because they are established, they have become the de facto standard for social networks. Weaknesses: They are public social networks with limited user control and personalization. | pHome fosters a deep sense of ownership. pHome represents another dimension to social networks. It provides users with the ability to design and control their private social network. pHome enables commercial networking. |

Product Definition

This section provides a detailed description of the product features and functionality.

Summary of Product Features

The table below summarizes the product features. It establishes the relative priority of each feature and its allocation of the project budget.

| ID | Feature) | Relative Priority |
| --- | --- | --- |
| Fe-01 | pHome personalization (control). Owner has the ability to: | 1 |
| | Construct and remodel the pHome according to their designs. | |
| | Furnish each room according to their preferences. | |
| | Create pButler(web) persona according to their preferences. | |

-continued

| ID | Feature) | Relative Priority |
|---|---|---|
| Fe-02 | Private Social Networking (Entertaining). The Owner may allow Guests to visit their pHome. This is the social networking component of the pHome experience. | 2 |
| | The Owner predefines Guest roles. Each role would have different levels of access. A Trusted Guest may have access to all of the pHome rooms and limited access to pHome gadgets. A regular Guest may have access to a single pHome room and view-only access to a limited number of gadgets. pButler(web) ensures Guests comply with the rules of the pHome. | |
| Fe-03 | Private Commercial Networking. The Owner, using message boards existing in each room, may opt to receive commercial alerts (advertising) from pBiz vendors. The commercial alerts are posted on bulletin boards in the appropriate room type (e.g., car part alerts posted on the pGarage bulletin board. | 3 |
| Fe-04 | Controlled Public Social Networking. The Owner may choose to allow the public into their pHome to view personal artifacts, such as family pictures. In pHome, the Owner can limit public access to specific rooms. | 4 |
| Fe-05 | Access to email. The Owner uses their email from pHome. | 5 |
| Fe-06 | Access to voicemail. The Owner uses their voicemail from pHome. | 6 |
| Fe-07 | Access to text messages. The Owner uses text messaging from pHome. | 7 |
| Fe-08 | Access to pHome alerts. The Owner receives personal alerts from family, friends, and coworkers in pHome. Also, the Owner receives commercial alerts in pHome. | 8 |
| Fe-09 | pHome assistance. The Owner and Guests are assisted by pButler(web). | 9 |
| Fe-010 | pHome is initially a two-dimensional experience that will evolve into a -D web experience as -D tools, applications, and production environments mature. | 10 |

Use Case Model

The following sections employ use cases to describe how the product behaves in response to systematic stimulus and user stimulus.

Figure 29:
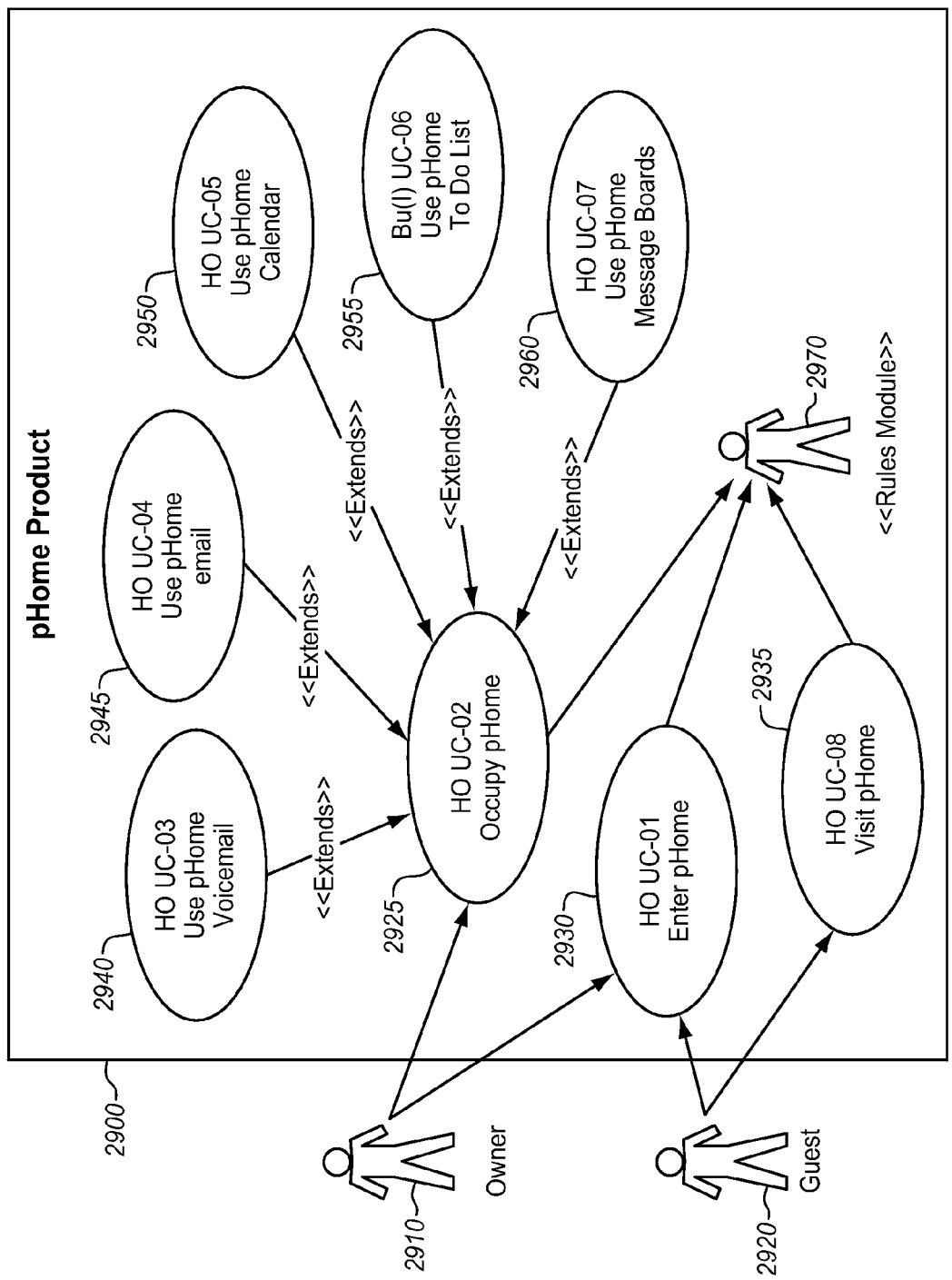
FIG. 29 is a use case diagram of one embodiment of pHome.

The table below summarizes the product user functions identified in the use case model of FIG. 29. The pHome product 2900 primarily has actors Owner 2910 and Guest 2920. The interaction of these parties and the access provided to them is primarily managed by rules module 2970. The use case maps to a feature.

| Use Case, Part Number | Function (User Actor) | Feature |
|---|---|---|
| HO UC-01 2930 | Enter pHome (Owner and Guests) The Enter pHome use case defines the functionality required to control access to the pHome. The Enter pHome functionality applies rules previously defined by the Owner using the pWeb interface to determine which rooms and which pHome capabilities Guests can access and use. | |
| HO UC-02 2925 | Occupy pHome (Owner) The Occupy pHome use case defines the functionality available to the Owner once they access pHome. The Occupy pHome functionality applies rules previously defined by the Owner using the pWeb interface. | |
| HO UC-03 2940 | Use Email The Use Email use case defines the functionality enabling the Owner to use email. The Use Email functionality applies rules previously defined by the Owner using the pWeb interface. | |
| HO UC-04 2945 | Use Voicemail The Use Voicemail use case defines the functionality enabling the Owner to use voicemail. The Use Voicemail functionality applies rules previously defined by the Owner using the pWeb interface. | |

| Use Case, Part Number | Function (User Actor) | Feature |
|---|---|---|
| HO UC-05 2950 | Use Calendar<br>The Use Calendar use case defines the functionality enabling the Owner to use the calendar.<br>The Use Calendar functionality applies rules previously defined by the Owner using the pWeb interface. | |
| HO UC-06 2955 | Use To-Do: List<br>The Use To-Do List use case defines the functionality enabling the Owner to use the pHome to-do list.<br>The Use To-Do List functionality applies rules previously defined by the Owner using the pWeb interface. | |
| HO UC-07 2960 | Use Message Boards (receive alerts)<br>The Use Message Board use case defines the functionality enabling the Owner to use the pHome message board.<br>The Use Message Board functionality applies rules previously defined by the Owner using the pWeb interface. | |
| HO UC-08 2935 | Visit pHome (Guests)<br>The Visit pHome use case defines the pHome functionality available to a pHome Guest.<br>The Visit pHome functionality applies rules previously defined by the Owner using the pWeb interface. | |

Logical Components Descriptions

Switch—the telephony network element that provides the pHome Owners and Guests access to the network and routes calls to pButler(IVI). Switching functions are beyond the scope of the pHome product.

pButler(IVI)—the pButler(IVI) provides the voice access capabilities for pHome. The pButler(IVI) product is specified in the pButler(IVI) Vision Document.

Webserver—the webserver provides the execution environment that hosts the portlets (portal gadgets) that interact with the pWorld applications and data.

Figure 30:
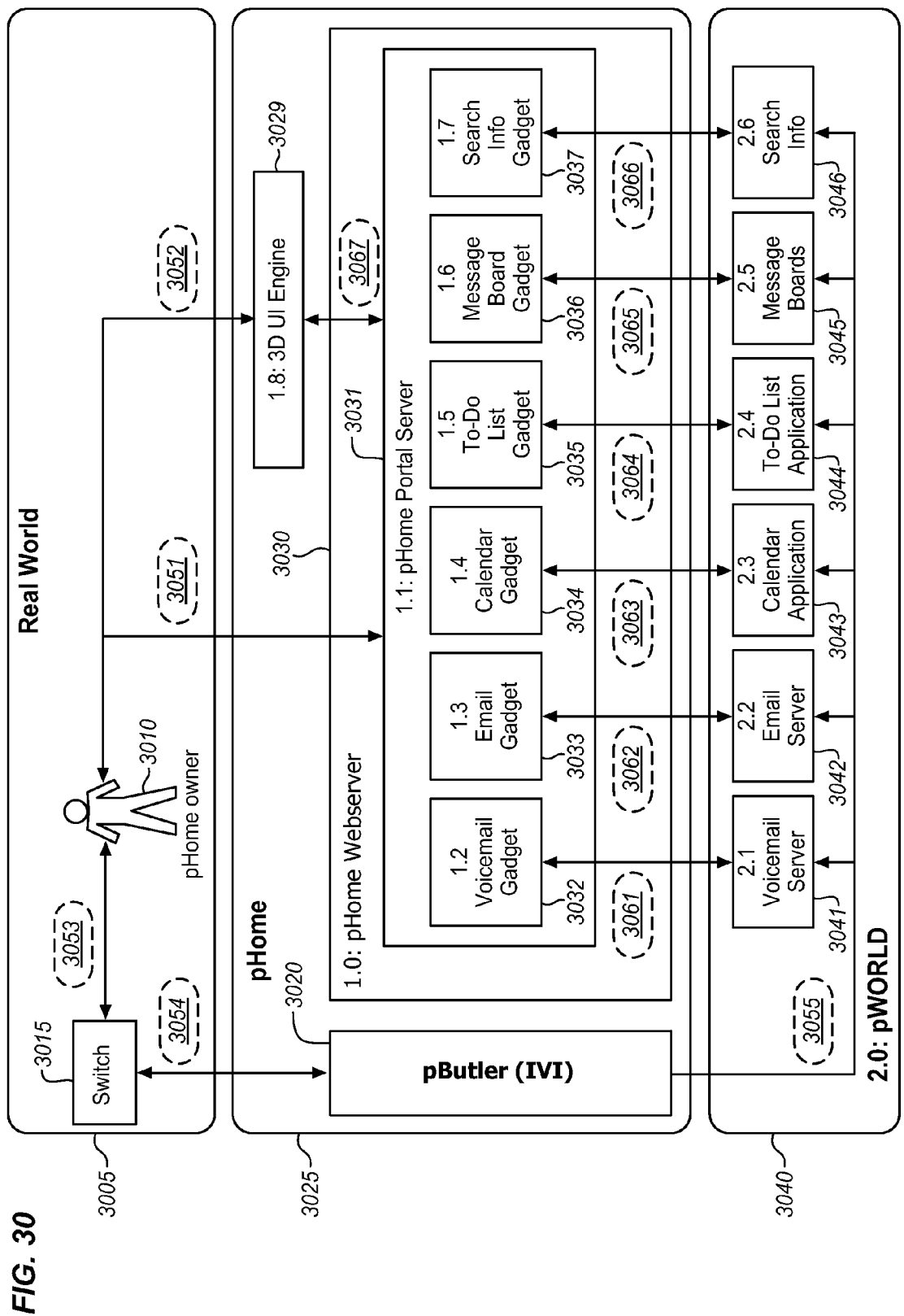
FIG. 30 is a component and deployment diagram of another embodiment of pHome.

FIG. 30 shows an embodiment of pHome 3025 and its interactions with pWorld 3040 and the Real World 3005. Interactions with pButler 3020 provide the main interface for the user through switch 3015. The table below provides the descriptions of the components identified in the logical architecture diagram.

| WBS ID | Component, part number | Description |
|---|---|---|
| 1.1 | Portal Server 3031 | The application layer of the webserver that hosts the pHome gadgets. |
| 1.2 | Voicemail Gadget 3032 | The gadget that interacts with the voicemail server. |
| 1.3 | Email Gadget 3033 | The gadget that interacts with the email server. |
| 1.4 | Calendar Gadget 3034 | The gadget that interacts with the calendar application. |
| 1.5 | To-Do List Gadget 3035 | The gadget that interacts with the to-do list application. |
| 1.6 | Message Board Gadget 3036 | The gadget that interacts with the message board application. |
| 1.7 | Search Info Gadget 3037 | The gadget that enables information searches within pWorld on the Internet. |
| 1.8 | 3-D UI Engine 3029 | The 3-D UI Engine is an application that renders information from the webserver in 3-D. |

Participating Systems/Data Sources [WBS ID 2.0]

The table below provides the descriptions of the data sources identified in the logical architecture diagram.

| WBS ID | System/Data Source, Part Number | Description |
|---|---|---|
| 2.1 | Voicemail Server 3041 | pWorld voicemail server |
| 2.2 | Email Server 3042 | pWorld email server |
| 2.3 | Calendar Application 3043 | pWorld calendar application |
| 2.4 | To-Do List Application 3044 | pWorld to-do/task management application |
| 2.5 | Message Board Application 3045 | pWorld message boards |
| 2.6 | Search Information Application 3046 | Information sources internal to pWorld or external on the Internet |

Interface Descriptions [WBS ID 3.0]

The table below provides the descriptions of the interfaces between the components identified in the logical architecture diagram.

| Part Number | Description |
|---|---|
| 3051 | Browser-based, 2-D access path to pHome information. |
| 3052 | Browser-based, 3-D access path to pHome information, |
| 3053 | Two-way voice communications interface between the Owner's handset and the service provider's switch, This interface is beyond the scope of the pHome product. |
| 3054 | Two-way external voice communications interface between the service provider's switch and the pButler(IVI) product. |

-continued

| Part Number | Description |
|---|---|
| 3055 | Two-way interface between pButler(IVI) and the pWorld applications/data sources. Refer to the pButler(IVI) product vision document for the description of the interfaces. |
| 3061 | Two-way messaging interface between the pHome voicemail gadget and the pWorld voicemail server. This interface implements a handoff to the voicemail system. |
| 3062 | Two-way messaging interface between the pHome email gadget and the pWorld email server. The interface supports the following interactions:<br><br>Check email<br>Save email<br>Respond to email<br>Delete email<br>This interface implements the API of the email server. |
| 3063 | Two-way messaging interface between the pHome calendar gadget and the pWorld calendar application. The interface supports the following interactions for calendar appointments:<br><br>Retrieve reminders<br>Save<br>Delete<br>Reschedule<br>This interface implements the API of the calendar application. |
| 3064 | Two-way messaging interface between the pHome to-do list gadget and the pWorld to-do list application. The interface supports the following interactions for to-do list management:<br><br>Create<br>Mark as complete<br>Save<br>Delete<br>This interface implements the API of the to-do list application. |
| 3065 | Two-way messaging interface between the pHome message board gadget and the pWorld message boards. The interface supports the following interactions for using message boards:<br><br>Check messages (alerts)<br>Save messages<br>Post a message response<br>Delete message<br>This interface implements the API of the message board application. |
| 3066 | Two-way messaging interface between the pHome message board gadget and the pWorld message boards. The interface supports the following interactions for using message boards:<br><br>Check messages (alerts)<br>Save messages<br>Post a message response<br>Delete message<br>This interface implements the API of the message board application. |
| 3067 | Two-way messaging interface between the pHome search gadget and pWorld or Internet information sources. This interface implements the API of the information sources. |

2. pButler

Overview pButler pButler is an enhanced voice portal that allows telephony service provider's customers to use their own phone number and voice commands to access the pHome services such as online messaging, e-mail, voicemail, calendaring, to-do list, etc. The pButler also provides the user with predefined alerts of interest such as personal scheduled events, commercial scheduled events, advertising alerts, and emergency alerts. The following diagram demonstrates a simple scenario in which a pHome Subscriber uses voice-based interactions with a telephony network and pButler to access the information in their pHome.

Figure 31:
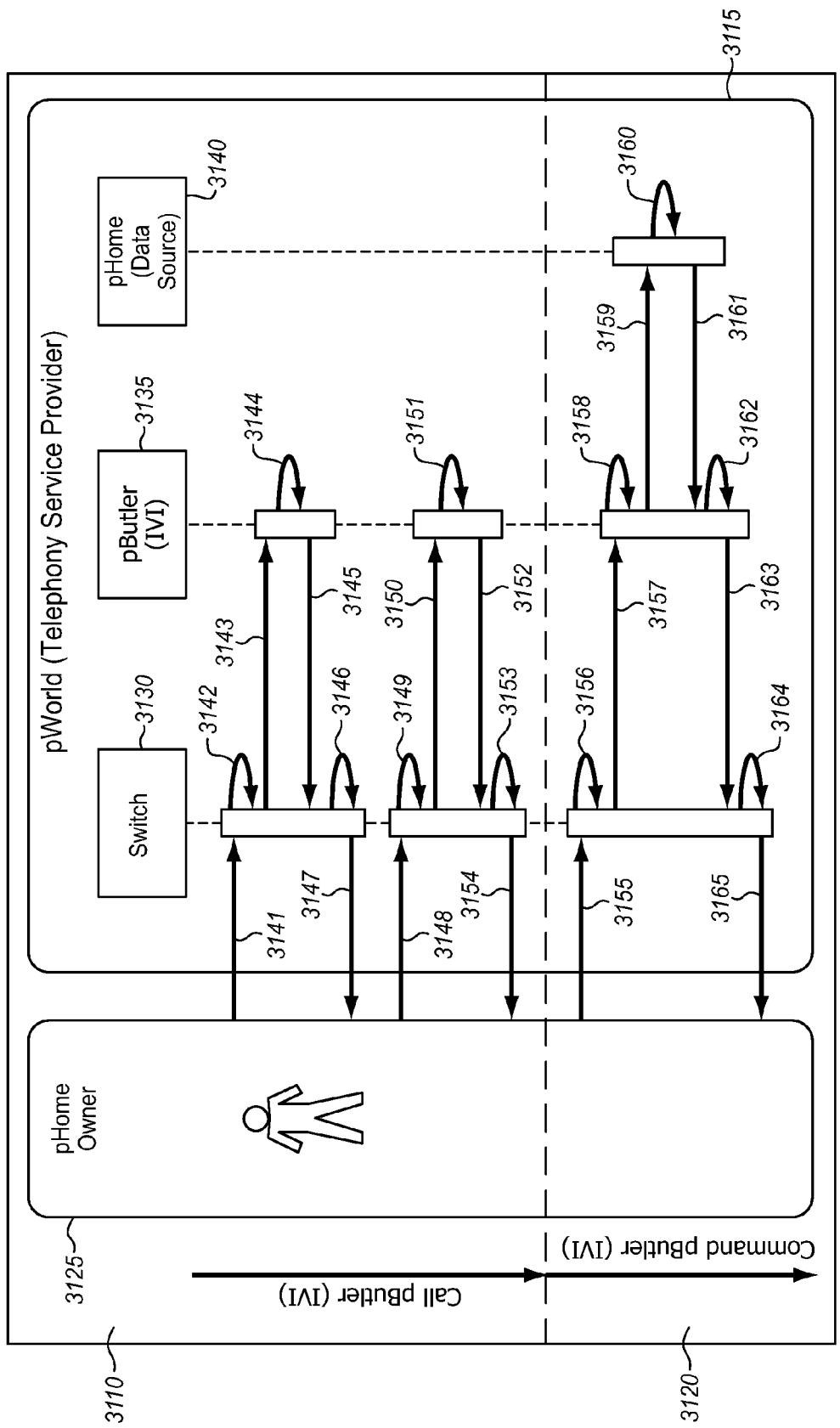
FIG. 31 is a sequence diagram for one embodiment of pHome.

The following table describes the actions labeled in the sequence diagram of FIG. 31. The sequence diagram is broken into two sections: the call pButler section 3110 and the command pButler section 3120. The pHome Owner 3125 goes through the sequence described below in interacting with pHome 3140 through switch 3130 as moderated by pButler 3135. The sequence diagram demonstrates the interactions noted in the "Improvements to Telephony" patent description defining a method of communicating non-call messages over a telephone network.

| Seq ID | Action | Remarks |
| --- | --- | --- |
| 3141 | Owner call accesses telephony service provider's Switch. A "Switch" is wireless or wireline equipment that connects the caller's telephony device to a network, analyzes call set up data, and routes the calls through a network. For the purpose of this document, the "Switch" represents the aggregation of signaling, call set up, routing, and trunking. | The customer dials the pWorld escape sequence.<br>Each phone number is associated with its twin e-number (a phone number with a marker in it). |
| 3142 | Switch analyzes dialed digits. Identifies call as a call destined for pWorld. | Looks for a *-or #-key ("coded signal") in the e-number.<br>If found, open the switch to a "predetermined digital circuit" (non-call local loop circuit). |
| 3143 | Switch sends call information to pButler as the fundamental electronic node designed to process voice-based interactions with the Owner. | Setup a transaction token ("non-call information signal") to enter the local loop circuit.<br>Each token activates a discrete and selected set of nodes in the local loop circuit.<br>A method wherein said predetermined digital circuit includes a plurality of electronic nodes, each of said electronic nodes associated with a telephone number, and said connecting comprises electronically linking said switch to the one of said electronic nodes associated with said selected telephone number. |
| 3144 | pButler identifies subscriber. Determines access rules based on the Owner profile. | A method for registering each of said electronic nodes to a specific user. |
| 3145 | pButler responds via the voice channel to Switch. Requests the subscriber's password verbally. | Default pHome "machine" voice |
| 3146 | Switch forwards request unaltered. | |
| 3147 | Switch delivers pButler verbal response to subscriber. | |
| 3148 | Owner responds with password:<br>Speaks the response or;<br>Enters appropriate digits via keypad. | |
| 3149 | Switch forwards response unaltered. | |
| 3150 | Switch delivers response to pButler. | |
| 3151 | pButler tests the accuracy of the response. If accurate, pButler:<br>Loads Owner profile.<br>Prepares greeting from Owner profile.<br>If inaccurate, pButler:<br>Prepares retry message. | Owner profile contains pButler personality traits such as voice. |

-continued

| Seq ID | Action | Remarks |
|---|---|---|
| 3152 | pButler delivers results to Switch. | |
| 3153 | Switch forwards results unaltered. | |
| 3154 | Switch delivers message to subscriber via voice channel. | |
| 3155 | Owner speaks a pButler command | Example: "What is my next appointment?" |
| 3156 | Switch forwards the pButler command unaltered. | |
| 3157 | Switch delivers the command to pButler. | |
| 3158 | pButler processes the request: Recognizes the command (e.g., a calendar request). Formulates a pHome service query based on the spoken command. | A method selecting non-call information signals passing through said network based on instructions provided by said specific user; and storing said selected non-call information signals at the electronic node registered to said specific user. |
| 3159 | pButler sends the request to the appropriate pHome service (e.g., calendar). | |
| 3150 | pHome service determines response (e.g., identifies the Owner's next appointment). Formulates the response to pButler. | A trade secret method to assemble, via software processes, "tokens" (a code set of data and instructions) and assembling feedback into content-of-interest. |
| 3151 | pHome sends the query results to pButler. | |
| 3152 | pButler reads the query results. | A method to direct content-of-interest to digital "ears" for immediate feedback, posted to the digital "voice" interface. |
| 3153 | pButler speaks the response. | |
| 3154 | Switch forwards the response unaltered via the voice channel. | |
| 3155 | Switch delivers the response via the Owner's handset. | |

Use Case Descriptions

The table below summarizes the product user functions identified in the use case model of FIG. 32. The primary actors are Owner 3215 and Guest 3220 whose differing permissions and interactions are moderated by pButler 3210 using the rules module 3250. System switch 3255 provides for access to various networks such as the PSTN or wireless network for voice based non-calls or the Internet. The use case maps to a feature.

| Use Case | Function (User Actor) | Feature |
|---|---|---|
| Bu(I) UC-01 3235 | Call pButler<br>The Call pButler use case defines the functionality required to allow pHome Owners and their Guests to contact the Owner's pButler from voice-enabled devices.<br>The Call pButler use case includes the functionality necessary to identify, authenticate, and authorize caller access to pHome.<br>The Call pButler functionality includes the ability to distinguish Owners from Guests.<br>The Call pButler use case defines the functionality required for the caller to establish and maintain a dialogue with the pButler.<br>The Call pButler functionality includes the ability for the Owner or the Guest to experience a personalized version of pButler.<br>The Call pButler functionality uses rules defined by the Owner to process calls. | |
| Bu(I) UC-02 3240 | Process Caller Commands<br>The Process Caller Command use case defines the functionality enabling pButler to understand, process, and respond to commands voiced by the pHome Owner or Guest via voice-enabled devices. The supported commands allow the caller (based on their identity: Owner versus Guest) to use voicemail, email, calendar, to-do list, and message boards.<br>The Process Caller Commands functionality uses rules previously defined by the Owner using the pWeb interface to pHome. | |

-continued

| Use Case | Function (User Actor) | Feature |
|---|---|---|
| Bu(I) UC-03 3241 | Use pHome Voicemail | The Use pHome Voicemail use case defines the functionality required for pButler to direct the Owner's call to the voicemail application. Once in the voicemail application, the Owner exercises the voicemail capabilities provided by the voicemail platform. |
| Bu(I) UC-04 3246 | Use pHome Email | The Use pHome Email use case defines the functionality enabling the pButler to retrieve new messages from the Owner's email application and read them to the Owner. The Use pHome Email capabilities also include the ability to save, delete, and respond to an email. |
| Bu(I) UC-05 3245 | Use pHome Calendar | The Use pHome Calendar use case defines the functionality enabling the pButler to retrieve appointment reminders from the Owner's calendar application and read them to the Owner. The Use pHome Calendar capabilities also include the ability to save, delete, and reschedule an appointment. |
| Bu(I) UC-06 3244 | Use pHome To-Do List (Activities Matrix) | The Use pHome To-Do List use case defines the functionality enabling the pButler to retrieve tasks from the Owner's To-Do list and read them to the Owner. The Use pHome To-Do List capabilities also include the ability to create a new task, mark a task as complete, and save or delete tasks. |
| Bu(I) UC-07 3243 | Use pHome Message Boards | The Use pHome Message Boards use case defines the functionality enabling the pButler to retrieve new messages from the Owner's message boards and read them to the Owner. The Use pHome Message Boards capabilities also include the ability to save, delete, and post a response to a message. |
| Bu(I) UC-08 3242 | Search for Information | The Search for Information use case defines functionality enabling pButler to search pHome and Internet sources for information of interest to the Owner. The Search for Information functionality uses search criteria and search rules previously defined by the Owner using the pWeb interface. The Search for Information functionality uses the pButler(IVI) location awareness feature to filter location-related search results. |
| Bu(I) UC-09 3225 | Call Owner | The Call Owner use case defines functionality enabling pButler to communicate with the Owner via voice or text to advise the Owner of events of interest such as the receipt of an email or voicemail from a predefined entity. The Call Owner functionality uses rules previously defined by the Owner using the pWeb interface. |

In addition to the use cases described in the table, the Call Owner use case 3225 may be extended by Use Cases 02-07 3230.

Logical Components Descriptions

Switch—the telephony network element that provides the Subscriber access to the network and routes the Owner's call to pButler(IVI).

Figure 28:
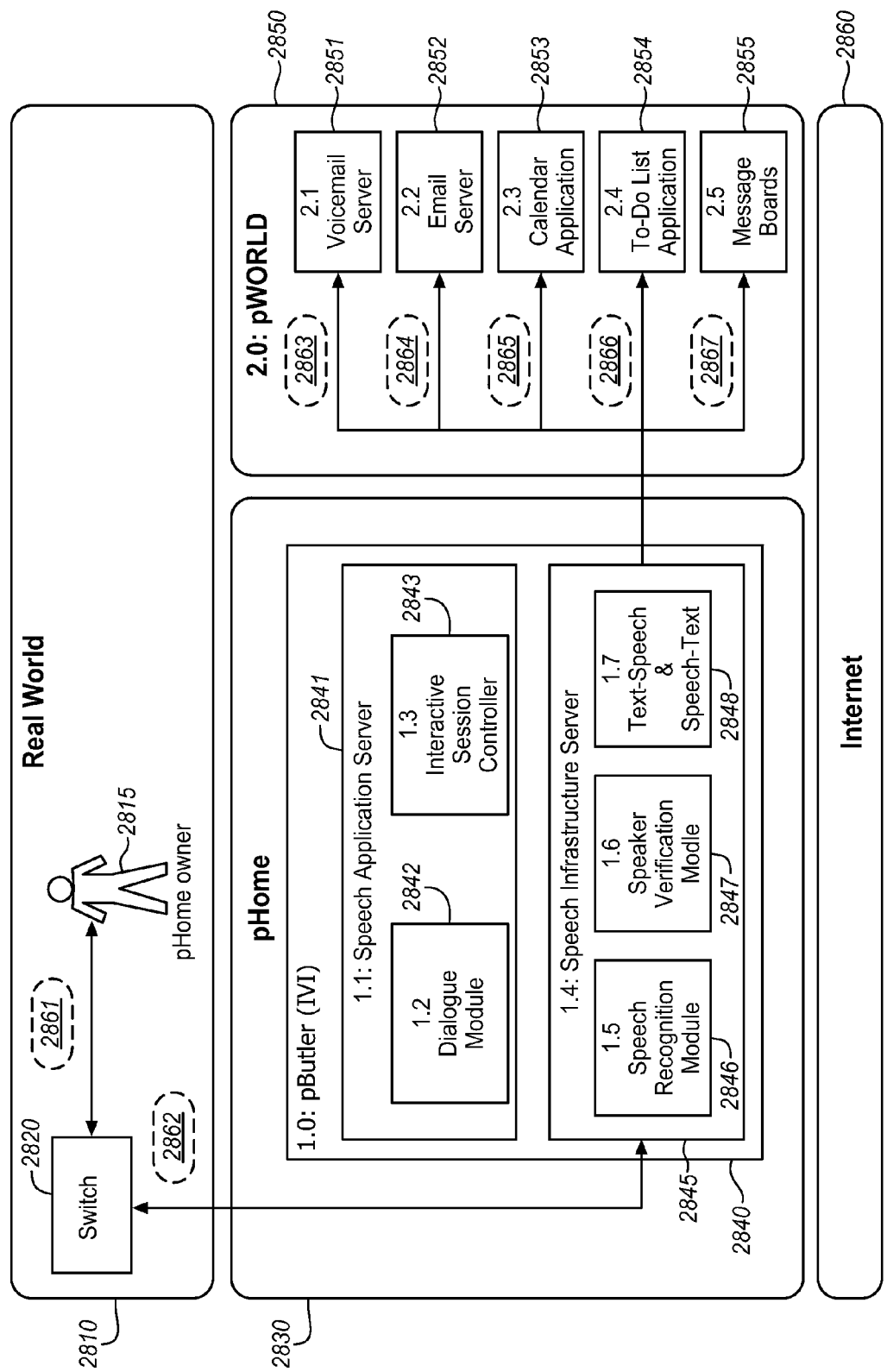
FIG. 28 is a component and deployment diagram of one embodiment of pHome.

FIG. 28 shows an embodiment of pButler and its interaction with the Real World 2810. pHome Owner 2815 through switch 2820 interacts with pHome 2830 through the pButler 2840 interface. The table below provides the descriptions of the logical components identified in the logical architecture diagram as shown in FIG. 28.

| WBS ID | Component, part number | Description |
|---|---|---|
| 1.1 | Speech Application Server 2841 | The execution environment that hosts the speech application modules. |
| 1.2 | Dialogue Module 2842 | Software that implements the building blocks of the call flows (prompts and responses). |
| 1.3 | Interactive Session Controller 2843 | A software component implementing the pButler(IVI) call flows/application logic. |
| 1.4 | Speech Infrastructure Server 2845 | The execution environment hosting the speech infrastructure modules. |

-continued

| WBS ID | Component, part number | Description |
|---|---|---|
| 1.5 | Speech Recognition Module 2846 | A software component capable of recognizing and responding to speech questions and commands that vary in complexity from simple words such as "yes" and "no" to identifying single items within lists of over one million items (e.g., as directory services). |
| 1.6 | Speaker Verification Module 2847 | A software component capable of matching the caller's password with the caller's voiceprint of the password to confirm who is speaking with pButler. |
| 1.7 | Speech-to-Text and Text-to-Speech Module 2848 (Speech Server) | A software component enabling pButler Owners and Guests to: Talk directly to applications such as email, a to-do list, or calendar without human intervention. Hear information from online, text-based applications without human intervention. |

Participating Systems/Data Sources

The table below provides the descriptions of the data sources identified in the logical architecture diagram. The data sources primarily reside in pWorld 2850.

| WBS ID | System/Data Source | Description |
|---|---|---|
| 2.1 | Voicemail Server 2851 | pWorld voicemail server. |
| 2.2 | Email Server 2852 | pWorld email server. |
| 2.3 | Calendar Application 2853 | pWorld calendar application. |
| 2.4 | To-Do List Application 2854 | pWorld to-do/task management application. |
| 2.5 | Message Board Application 2855 | pWorld message boards. |

Interface Descriptions

The table below provides the descriptions of the interfaces between the components identified in the logical architecture diagram.

| Part Number | Description |
|---|---|
| 2861 | Two-way voice communications interface between the Owner's handset and the service provider's switch. |
| 2862 | Two-way external voice communications interface between the service provider's Switch and the pButler. |
| 2863 | Two-way messaging interface between the pButler(IVI) speech server and the pWorld voicemail server. This interface implements a handoff to the voicemail system. |
| 2864 | Two-way messaging interface between the pButler(IVI) speech server and the pWorld email server. The interface supports the following interactions: |
| | Check email
Save email
Respond to email
Delete email
This interface implements the API of the email server. |
| 2865 | Two-way messaging interface between the pButler(IVI) speech server and the pWorld calendar application. The interface supports the following interactions for calendar appointments: |
| | Retrieve reminders
Save
Delete
Reschedule
This interface implements the API of the calendar application. |
| 2866 | Two-way messaging interface between the pButler(IVI) speech server and the pWorld to-do list application. The interface supports the following interactions for to-do list management: |
| | Create
Mark as complete
Save
Delete
This interface implements the API of the to-do list application. |

| Part Number | Description |
|---|---|
| 2867 | Two-way messaging interface between the pButler(IVI) speech server and the pWorld message boards. The interface supports the following interactions for using message boards:<br><br>Check messages (alerts)<br>Save messages<br>Post a message response<br>Delete message<br>This interface implements the API of the message board application. |

3. Filtering Information—Content to Content-of-Interest

The purpose of making a non-call is to satisfy a notion. Notions are not satisfied (or "resolved") by content but by "content-of-interest", a particular form of content that receivers have paid for and senders have paid to have delivered.

People are hungry for more and more information. What they are looking for is content-of-interest. This ongoing pursuit of content-of-interest is the force behind the growth of bookstores, libraries, schools and universities, newspapers, magazines, trade shows, much of sports and entertainment pursuits, weather, news, traffic, and educational TV, email, Internet searches, downloading and online chat, hobbies, do-it-yourself projects, phone calls, mobile phones, and text messaging.

The urge to know, share, and exchange content-of-interest is filling up the infosphere where digital devices, processors, and routers help keep us connected to the information we increasingly depend on in order to live, work, and learn. The described system is a way to accelerate the acquisition of content-of-interest. It is an inexpensive and practical way to maximize and manage information flows.

Content-of-interest (COI) is digital content which has been specifically requested or solicited and/or pre-delivered as "default" information that data analytics software has determined likely to be of interest to an augmented phone service subscriber. COI is the inventory provided by addressees and addressors which is processed by the system into appropriate multimedia feedback (what people want to see, hear, and know).

For any system/method to turn content into content-of-interest, three broad requirements must be met. The entire system and its processes are:
  intrinsic—that is, all rules, procedures and behavior of the system for handling the conversion process must be deduced from the system itself,
  procedural—that is, the method of converting content to content-of-interest is done through consistent application of general rules and procedures that shape the internal order of the system—its inputs and outputs; and
  contextual—that is, that the process used to generate, identify, and deliver content-of-interest is fair (rule-based), transparent, and consistent.

Following these broad specifications, the systems and methods generate and deliver content-of-interest in the augmented phone services layer of the telesphere, an area above the ISP layer that offers an automated self-designed portal for hosting, message addressing, and delivery which can be linked by the customer's telephone number, reached by mobile and landline telephones, paid by fee, monthly subscription, annual registration, and delivery charges while relying on alliance partners for billing, infrastructure, and customer acquisition.

V. Profiling/Tendencies

Tendencies are actions, choices, or preferences that a user makes most often. They might be what blogs are read daily, sites visited, most-often called friends, pizza most often ordered, or the type or genre of music listened to. The idea behind understanding tendencies is to be better able to serve individual users with action, activities, and/or content that is desired by the user. The BIG IDEA is to be constantly presenting the user with interesting and useful content ("content of interest") so that their experience of the pWorld environment is dynamic, vibrant, and pleasantly surprising (fun).

Tendencies or preferences are gathered in a number of ways. When the users sign-up for a pHome, they are given the option of running through a series of surveys to help the system "better understand" the kinds of likes and dislikes the person has. If there are a number of people at a pHome (i.e., family members), each person would have different sets of tendencies. Information about tendencies is also inferred by the choices the individuals make. If a person orders pizza without onions, we might infer they don't like onions. Ordering clothes with certain colors yields other preferences. If the clothing sizes of a person is known, then offers that don't include those sizes can be dismissed (unless they are actively searched for, as in the case of gifts). Actions or operations that are repeated often then are dynamically arranged so that most-often performed/requested outcomes are presented in highly accessible fashions or used as "default" values. Data from public sources is also used to better understand the users. This could include census data, data from county and state records, and Internet searches.

The tendencies of individuals over time yield a "digital persona" that can also be used to predict what they may like or dislike based on similar tendencies of others. Grouping or classifying tendencies is important to be able to bound predictions to limit over-generalization. A number of machine-learning technologies exist for classifying, including Neural Networks, Support Vector Machines, and Bayesian classifiers. Privacy of personal information is very important. Individual preferences are kept encoded and usable only to pWorld proprietary algorithms. This information is also kept on machines that are not directly accessible by the Internet. Information is also never sold to outside sources. If an outside agency desires to reach a particular demographic, the content is accepted by pWorld/pHome and made available to users only if their preferences indicate potential interest. If the user responds to an offer, marketing success can be directly tracked, and the customer relationships can be monitored for potential abuse. Of course, users can always alert pWorld support to undesired market advances, which helps maintain high quality relationships with providers (since their access to pHome customers can be terminated).

In all cases of the above-described embodiments, the results of any of the transformations of data described may be realized by outputting the results by transforming any physical or electronic medium available into another state or thing. Such output includes, but is not limited to, producing hardcopy (paper), sounds, visual display (as in the case of monitors, projectors, etc.), tactile display, changes in electronic medium, etc. The foregoing description of the embodiments of the systems and methods has been presented only for the purpose of illustration and description and is not intended to be exhaustive or to limit the systems and methods to the precise forms disclosed. Numerous modifications and adaptations are apparent to those skilled in the art without departing from the spirit and scope of the systems and methods.

Certain terminology is used herein for convenience only and is not to be taken as a limitation on the embodiments of the present invention. In the drawings, the same reference letters are employed for designating the same elements throughout the several figures.

Unified Modeling Language ("UML") can be used to model and/or describe methods and systems and provide the basis for better understanding their functionality and internal operation as well as describing interfaces with external components, systems, and people using standardized notation. When used herein, UML diagrams including, but not limited to, use case diagrams, class diagrams, sequence diagrams, and activity diagrams, are meant to serve as an aid in describing the embodiments of the present invention but do not constrain implementation thereof to any particular hardware or software embodiments. Unless otherwise noted, the notation used with respect to the UML diagrams contained herein is consistent with the UML 2.0 specification or variants thereof and is understood by those skilled in the art.

The embodiments of the systems and methods can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

I claim:

1. A network switching system comprising:

a switch having an input terminal, a first output terminal connected to a first network system, and a second output terminal connected to a second network system;

a signal analysis circuit connected to said input terminal for analyzing a coded input signal and providing a first driver signal when said coded input signal includes a # signal or a * signal interspersed between two alphanumeric signals corresponding to an alphanumeric telephone number symbols, and for providing a second driver signal when said coded input signal does not include a # signal or a * signal interspersed between two alphanumeric signals corresponding to alphanumeric telephone number symbols;

a switch driver circuit connected to said signal analysis circuit for setting said switch to connect said input terminal to said first output terminal responsive to said first driver signal and for setting said switch to connect said input terminal to said second output terminal responsive to said second driver signal, wherein:

said second network system is a public switched telephone network (PSTN); and said first network system comprises:

a plurality of electronic storage nodes, each storage node being a personalized node of a user for hosting an Internet web site of said user, said Internet web site being accessible via a web browser connected to said Internet and having an address on said Internet consisting essentially of an alphanumeric telephone number of said user; and a two-way speech interface for providing two-way voice interactions between said user and said Internet web site via a telephone without human intervention allowing said user to store content on said web site via spoken communications and permitting said user to have voice communications to and from said web site via said telephone.

* * * * *